US012643974B2

(12) United States Patent
Hattori et al.

(10) Patent No.: US 12,643,974 B2
(45) Date of Patent: Jun. 2, 2026

(54) HYDROGENATED COPOLYMER, RESIN COMPOSITION, MOLDED ARTICLE, AND ADHESIVE FILM

(71) Applicant: Asahi Kasei Kabushiki Kaisha, Tokyo (JP)

(72) Inventors: Goki Hattori, Tokyo (JP); Yasuhiro Kusanose, Tokyo (JP); Hiroyuki Ichino, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 748 days.

(21) Appl. No.: 18/011,398

(22) PCT Filed: Jun. 8, 2021

(86) PCT No.: PCT/JP2021/021717
§ 371 (c)(1),
(2) Date: Dec. 19, 2022

(87) PCT Pub. No.: WO2021/261241
PCT Pub. Date: Dec. 30, 2021

(65) Prior Publication Data
US 2023/0303752 A1 Sep. 28, 2023

(30) Foreign Application Priority Data
Jun. 22, 2020 (JP) ................................. 2020-107264

(51) Int. Cl.
| | |
|---|---|
| *C08F 297/04* | (2006.01) |
| *C08L 53/02* | (2006.01) |
| *C09J 7/30* | (2018.01) |

(52) U.S. Cl.
CPC .......... *C08F 297/04* (2013.01); *C08L 53/025* (2013.01); *C09J 7/30* (2018.01)

(58) Field of Classification Search
CPC .... C08L 2205/025; C08L 9/06; C08F 236/06; C08F 212/08; C08F 8/04
See application file for complete search history.

(56) References Cited

U.S. PATENT DOCUMENTS

| | | | | |
|---|---|---|---|---|
| 5,034,465 A | * | 7/1991 | Yagi ........................ | C08L 15/00 |
| | | | | 525/236 |
| 5,432,232 A | | 7/1995 | Hattori et al. | |
| 5,585,442 A | | 12/1996 | Knoll et al. | |
| 10,351,475 B2 | | 7/2019 | Araki | |
| 2004/0077795 A1 | | 4/2004 | Hashizume et al. | |
| 2004/0116635 A1 | * | 6/2004 | Halasa .................. | C08F 236/14 |
| | | | | 526/260 |
| 2004/0143061 A1 | | 7/2004 | Nakagawa et al. | |
| 2005/0215723 A1 | | 9/2005 | Knoll et al. | |
| 2005/0234193 A1 | | 10/2005 | Sasagawa et al. | |

| | | | | |
|---|---|---|---|---|
| 2008/0161485 A1 | | 7/2008 | Suzuki et al. | |
| 2011/0015333 A1 | | 1/2011 | Fujiwara et al. | |
| 2015/0175855 A1 | | 6/2015 | Nakajima et al. | |
| 2016/0049324 A1 | * | 2/2016 | Yamaguchi ......... | H01L 21/6835 |
| | | | | 525/216 |
| 2017/0197879 A1 | | 7/2017 | Araki | |
| 2018/0258276 A1 | | 9/2018 | Chang et al. | |
| 2019/0016842 A1 | | 1/2019 | Kamei et al. | |
| 2019/0375918 A1 | | 12/2019 | Valenti et al. | |
| 2020/0071505 A1 | | 3/2020 | Ebert et al. | |

FOREIGN PATENT DOCUMENTS

| | | | | |
|---|---|---|---|---|
| CN | 104945559 A | | 9/2015 | |
| CN | 106232730 A | | 12/2016 | |
| EP | 4035905 A1 | * | 8/2022 | ............. C08K 5/548 |
| JP | H01-197541 A | | 8/1989 | |
| JP | H05-093176 A | | 4/1993 | |
| JP | H06-065419 A | | 3/1994 | |
| JP | 2001-019829 A | | 1/2001 | |
| KR | 10-2018-0095011 A | | 8/2018 | |
| WO | 02/059173 A1 | | 8/2002 | |
| WO | 02/094936 A1 | | 11/2002 | |
| WO | 2004/003027 A1 | | 1/2004 | |
| WO | 2009/119592 A1 | | 10/2009 | |
| WO | 2014/017380 A1 | | 1/2014 | |
| WO | 2015/182649 A1 | | 12/2015 | |
| WO | WO-2021079676 A1 | * | 4/2021 | ............... C08K 3/36 |

OTHER PUBLICATIONS

European Search Report issued in European Patent Application No. 21828414.9 dated Nov. 27, 2023.
International Search Report (with partial translation) and Written Opinion dated Aug. 17, 2021, for corresponding International Patent Application No. PCT/JP2021/021717.
International Preliminary Report on Patentability and Written Opinion issued in corresponding International Patent Application No. PCT/JP2021/021717 dated Jan. 5, 2023.

* cited by examiner

*Primary Examiner* — Mark S Kaucher
(74) *Attorney, Agent, or Firm* — Morgan, Lewis & Bockius LLP

(57) ABSTRACT

Provided is a hydrogenated copolymer (X) comprising: a hydrogenated copolymer (A); and a hydrogenated copolymer (B), wherein the hydrogenated copolymer (X) satisfies: (1): the hydrogenated copolymer (A) has a random copolymer structure comprising a conjugated diene monomer unit and a vinyl aromatic monomer unit, and content of the vinyl aromatic monomer unit in (A) is 10 to 80 mass %; (2): the hydrogenated copolymer (B) has a random copolymer structure comprising a conjugated diene monomer unit and a vinyl aromatic monomer unit, and content of the vinyl aromatic monomer unit in (B) is 10 to 80 mass %; (3): a ratio (Mn1/Mn2) of (Mn1) of the hydrogenated copolymer (A) to (Mn2) of the hydrogenated copolymer (B) is less than 0.25, and $1000 \leq Mn1 \leq 40000$; and (4): a mass ratio (A)/(B) of a content of the hydrogenated copolymer (A) to a content of the hydrogenated copolymer (B) is 5/95 to 50/50.

12 Claims, No Drawings

HYDROGENATED COPOLYMER, RESIN COMPOSITION, MOLDED ARTICLE, AND ADHESIVE FILM

TECHNICAL FIELD

The present invention relates to a hydrogenated copolymer, a resin composition, a molded article, and an adhesive film.

BACKGROUND ART

Hydrogenated copolymers of a conjugated diene monomer unit and a vinyl aromatic monomer unit have elasticity similar to that of natural rubbers or synthetic rubbers at ordinary temperature, also have processability similar to that of thermoplastic resins at high temperatures, and furthermore, are excellent in weather resistance and heat resistance. For these reasons, the hydrogenated copolymers have heretofore been used in a wide range of fields such as plastic modifiers, automobile parts, medical molded products, asphalt modifiers, footwear, molded products such as food containers, packaging materials, adhesive sheets, and home appliances or industrial parts.

For example, Patent Literature 1 discloses a hydrogenated copolymer which is a hydrogenated block copolymer having a random copolymer structure of a conjugated diene monomer unit and a vinyl aromatic monomer unit, and a resin composition comprising the hydrogenated copolymer.

Since this resin composition is excellent in mechanical characteristics and abrasion resistance, its utilization in automobile interior materials or the like is underway.

CITATION LIST

Patent Literature

Patent Literature 1: International Publication No. WO 2004/003027

SUMMARY OF INVENTION

Technical Problem

Unfortunately, a resin composition comprising a hydrogenated copolymer disclosed in Patent Literature 1 has high shear viscosity and cannot obtain practically sufficient moldability.

In recent years, improved design and efficient molding process have been demanded for purposes such as automobile interior materials. In such a case, injection molding is more suitable than conventional slush molding. However, injection molding compared with slush molding might deteriorate moldability and cause poor appearance unless a resin composition used as a material has low viscosity. Hence, there is a demand for a hydrogenated copolymer that yields a resin composition having practically sufficient abrasion resistance and sufficiently low shear viscosity.

Accordingly, in light of the problems of the conventional techniques mentioned above, a first object of the present invention is to provide a hydrogenated copolymer that can yield a resin composition having practically sufficient abrasion resistance, low shear viscosity, and excellent moldability and can yield a molded article having favorable appearance.

On the other hand, a hydrogenated copolymer designed to have low shear viscosity can also be expected to have high adhesion. A adhesive agent is generally produced by mixing a hydrogenated copolymer with an adhesive in order to obtain sufficient adhesion. The hydrogenated copolymer itself is designed to have high adhesion and can thereby decrease the amount of an adhesive added or eliminate the need of the adhesive. It can thus be expected that for the production of an adhesive agent, the cost of the adhesive is reduced or the step of mixing the hydrogenated copolymer with the adhesive is omitted or shortened in a hydrogenation process.

Accordingly, a second object of the present invention is to provide a hydrogenated copolymer having high adhesion.

Solution to Problem

The present inventors have conducted diligent studies to solve the problems of the conventional techniques mentioned above and consequently completed the present invention by finding that the first and second objects mentioned above can be attained by a hydrogenated copolymer (X) comprising a hydrogenated copolymer (A) and a hydrogenated copolymer (B), each of which is a hydrogenated copolymer having a random copolymer structure comprising a conjugated diene monomer unit and a vinyl aromatic monomer unit, wherein the ratio between the number-average molecular weights of the hydrogenated copolymer (A) and the hydrogenated copolymer (B) falls within a predetermined numerical range, the number-average molecular weight of the hydrogenated copolymer (A) falls within a predetermined numerical range, and the mass ratio between the contents of the hydrogenated copolymer (A) and the hydrogenated copolymer (B) falls within a predetermined numerical range.

Specifically, the present invention is as follows.

[1]

A hydrogenated copolymer (X) comprising:

a hydrogenated copolymer (A) which is a hydrogenated copolymer of a vinyl aromatic monomer unit and a conjugated diene monomer unit; and a hydrogenated copolymer (B) which is a hydrogenated copolymer of a vinyl aromatic monomer unit and a conjugated diene monomer unit, wherein the hydrogenated copolymer (X) satisfies the following requirements (1) to (4):

(1): the hydrogenated copolymer (A) has a random copolymer structure comprising a conjugated diene monomer unit and a vinyl aromatic monomer unit, and a content of the vinyl aromatic monomer unit in the hydrogenated copolymer (A) is 10 mass % or more and 80 mass % or less;

(2): the hydrogenated copolymer (B) has a random copolymer structure comprising a conjugated diene monomer unit and a vinyl aromatic monomer unit, and a content of the vinyl aromatic monomer unit in the hydrogenated copolymer (B) is 10 mass % or more and 80 mass % or less;

(3): a ratio (Mn1/Mn2) of a number-average molecular weight (Mn1) of the hydrogenated copolymer (A) to a number-average molecular weight (Mn2) of the hydrogenated copolymer (B) is less than 0.25, and $1000 \leq Mn1 \leq 40000$; and (4): a mass ratio (A)/(B) of a content of the hydrogenated copolymer (A) to a content of the hydrogenated copolymer (B) is 5/95 to 50/50.

[2]

The hydrogenated copolymer (X) according to [1], wherein the hydrogenated copolymer (B) has at least one polymer block mainly comprising a vinyl aromatic monomer unit.

[3]

The hydrogenated copolymer (X) according to [1] or [2], wherein the hydrogenated copolymer (A) has at least one polymer block mainly comprising a vinyl aromatic monomer unit.

[4]

The hydrogenated copolymer (X) according to any one of [1] to [3], wherein the number-average molecular weight (Mn2) of the hydrogenated copolymer (B) is 120,000 or more.

[5]

The hydrogenated copolymer (X) according to any one of [1] to [4], wherein a hydrogenation rate of double bonds derived from the conjugated diene monomer unit in each of the hydrogenated copolymer (A) and the hydrogenated copolymer (B) is 40% or more.

[6]

The hydrogenated copolymer (X) according to any one of [1] to [5], wherein at least one tan δ peak is present in a range of –20° C. or higher and 40° C. or lower in a viscoelasticity measurement (1 Hz) chart.

[7]

The hydrogenated copolymer (X) according to any one of [1] to [6], wherein a ratio (RS1/RS2) of a vinyl aromatic monomer unit content (RS1) in the random copolymer structure of the hydrogenated copolymer (A) to a vinyl aromatic monomer unit content (RS2) in the random copolymer structure of the hydrogenated copolymer (B) is 0.8 to 1.2.

[8]

The hydrogenated copolymer (X) according to any one of [1] to [7], wherein a ratio (Mw2/Mn2) of a weight-average molecular weight (Mw2) to the number-average molecular weight (Mn2) of the hydrogenated copolymer (B) is less than 1.15.

[9]

The hydrogenated copolymer (X) according to any one of [1] to [8], wherein the ratio (Mn1/Mn2) of the number-average molecular weight (Mn1) of the hydrogenated copolymer (A) to the number-average molecular weight (Mn2) of the hydrogenated copolymer (B) is less than 0.12.

[10]

The hydrogenated copolymer (X) according to any one of [1] to [9], wherein the hydrogenated copolymer (A) has a polymer block mainly comprising a vinyl aromatic monomer unit, and a ratio (MnS1/MnS2) of a molecular weight (MnS1) of the polymer block mainly comprising a vinyl aromatic monomer unit in the hydrogenated copolymer (A) to a molecular weight (MnS2) of a polymer block mainly comprising a vinyl aromatic monomer unit in the hydrogenated copolymer (B) is 0.9 or less, wherein MnS1 and MnS2 are calculated by the following method:

$$MnS1 = Mn1 \times BS1, \text{ and}$$

$$MnS2 = Mn2 \times BS2/f$$

BS1: a content of the polymer block mainly comprising a vinyl aromatic monomer unit in the hydrogenated copolymer (A) determined by proton nuclear magnetic resonance (1H-NMR), BS2: a content of the polymer block mainly comprising a vinyl aromatic monomer unit in the hydrogenated copolymer (B) determined by proton nuclear magnetic resonance (1H-NMR), f: a degree of branching of the hydrogenated copolymer (B) determined by a GPC-light scattering measurement method with a viscosity detector;

Mn1: the number-average molecular weight of the hydrogenated copolymer (A); and

Mn2: the number-average molecular weight of the hydrogenated copolymer (B).

[11]

A resin composition comprising the hydrogenated copolymer (X) according to any one of [1] to [10], wherein a content of the vinyl aromatic monomer unit in each of the hydrogenated copolymers (A) and (B) is 30 mass % or more and 80 mass % or less, and a thermoplastic resin other than the hydrogenated copolymer (X) and/or a rubber-like polymer other than the hydrogenated copolymer (X).

[12]

A molded article of the resin composition according to [11].

[13]

An adhesive film having a base material layer and an adhesive layer on the base material layer, wherein the adhesive layer contains the hydrogenated copolymer (X) according to any one of [1] to [10], wherein a content of the vinyl aromatic monomer unit in each of the hydrogenated copolymers (A) and (B) constituting the hydrogenated copolymer (X) is 10 mass % or more and 60 mass % or less.

Advantageous Effects of Invention

The present invention can provide, as a first advantageous effect, a hydrogenated copolymer that can yield a resin composition excellent in abrasion resistance and moldability and can yield a molded article having favorable appearance. The present invention can also provide, as a second advantageous effect, a hydrogenated copolymer having high adhesion, which can be used as a material for an adhesive film.

DESCRIPTION OF EMBODIMENTS

Hereinafter, the mode for carrying out the present invention (hereinafter, simply referred to as the "present embodiment") will be described in detail. However, the embodiment given below is an illustration for describing the present invention and does not intend to limit the present invention by the contents given below. The present invention can be carried out with various changes or modifications made therein without departing from the spirit of the present invention.

[Hydrogenated Copolymer (X)]

The hydrogenated copolymer (X) of the present embodiment comprises:

a hydrogenated copolymer (A) which is a hydrogenated copolymer of a vinyl aromatic monomer unit and a conjugated diene monomer unit; and

a hydrogenated copolymer (B) which is a hydrogenated copolymer of a vinyl aromatic monomer unit and a conjugated diene monomer unit, wherein the hydrogenated copolymer (X) satisfies the following requirements (1) to (4):

(1): the hydrogenated copolymer (A) has a random copolymer structure comprising a conjugated diene monomer unit and a vinyl aromatic monomer unit, and a content of the vinyl aromatic monomer unit in the hydrogenated copolymer (A) is 10 mass % or more and 80 mass % or less;

(2): the hydrogenated copolymer (B) has a random copolymer structure comprising a conjugated diene monomer unit and a vinyl aromatic monomer unit, and a content of the vinyl aromatic monomer unit in the hydrogenated copolymer (B) is 10 mass % or more and 80 mass % or less;

(3): a ratio (Mn1/Mn2) of a number-average molecular weight (Mn1) of the hydrogenated copolymer (A) to a number-average molecular weight (Mn2) of the hydrogenated copolymer (B) is less than 0.25, and $1000 \leq Mn1 \leq 40000$; and (4): a mass ratio (A)/(B) of a content of the hydrogenated copolymer (A) to a content of the hydrogenated copolymer (B) is 5/95 to 50/50.

The hydrogenated copolymer (X) of the present embodiment is substantially a mixture of the hydrogenated copolymer (A) and the hydrogenated copolymer (B). The mixture is meant to include not only a form in which plural types of copolymers are mixed, but a mixed form of plural types of copolymers obtained by producing plural types of polymers in one reactor. Namely, the mixture includes a form in which plural types of copolymers are produced through one reaction.

As a first advantageous effect, the hydrogenated copolymer (X) of the present embodiment thus configured can yield a resin composition excellent in abrasion resistance and moldability and can yield a molded article having favorable appearance. As a second advantageous effect, the hydrogenated copolymer (X) of the present embodiment can be obtained as a hydrogenated copolymer having high adhesion and can be used as a material for an adhesive film.

(Hydrogenated Copolymer (A))

The hydrogenated copolymer (X) of the present embodiment contains a hydrogenated copolymer (A).

The hydrogenated copolymer (A) is a hydrogenated copolymer which is a hydrogenated copolymer of a vinyl aromatic monomer unit and a conjugated diene monomer unit, and has a random copolymer structure comprising a vinyl aromatic monomer unit and a conjugated diene monomer unit.

The content of the vinyl aromatic monomer unit in the hydrogenated copolymer (A) is 10 mass % or more and 80 mass % or less, and the number-average molecular weight (Mn1) of the hydrogenated copolymer (A) is 1000 to 40000.

In the hydrogenated copolymer (X) of the present embodiment, the hydrogenated copolymer (A), and the hydrogenated copolymer (B), a vinyl aromatic monomer unit incorporated in a polymer assumes the form of a monomer unit constituting the polymer and in such a case, is also referred to as a "vinyl aromatic monomer unit" in the present specification.

Likewise, a conjugated diene monomer unit incorporated in a polymer assumes the form of a monomer unit constituting the polymer and in such a case, is also referred to as a "conjugated diene monomer unit" in the present specification.

6

<Vinyl Aromatic Monomer Unit>

Examples of the vinyl aromatic monomer unit constituting the hydrogenated copolymer (A) include, but are not limited to, vinyl aromatic monomer units such as styrene, α-methylstyrene, p-methylstyrene, divinylbenzene, 1,1-diphenylethylene, N,N-dimethyl-p-aminoethylstyrene, and N,N-diethyl-p-aminoethylstyrene.

Among them, styrene, α-methylstyrene, and 4-methylstyrene are preferred from the viewpoint of availability and productivity.

Only one of these vinyl aromatic monomer units may be used, or two or more thereof may be used in combination.

<Conjugated Diene Monomer Unit>

The conjugated diene monomer unit constituting the hydrogenated copolymer (A) can be diolefin having conjugated double bonds. Examples thereof include, but are not limited to, 1,3-butadiene, 2-methyl-1,3-butadiene (isoprene), 2,3-dimethyl-1,3-butadiene, 1,3-pentadiene, 2-methyl-1,3-pentadiene, 1,3-hexadiene, and farnesene.

Among them, 1,3-butadiene and isoprene are preferred from the viewpoint of availability and productivity. One of these conjugated diene monomer units may be used alone, or two or more thereof may be used in combination.

The hydrogenated copolymer (A) has a random copolymer structure comprising a vinyl aromatic monomer unit and a conjugated diene monomer unit.

<Preferred Form of Hydrogenated Copolymer (A) when Hydrogenated Copolymer (X) of Present Embodiment is Used in Resin Composition>

In the case of using the hydrogenated copolymer (X) of the present embodiment in a resin composition, the vinyl aromatic monomer unit content (RS1) in the random copolymer structure of the hydrogenated copolymer (A) is preferably in the range of 30 mass % to 80 mass %, more preferably in the range of 35 mass % to 75 mass %, further preferably in the range of 40 mass % to 70 mass %.

When the vinyl aromatic monomer unit content (RS1) falls within the range described above, the hydrogenated copolymer (X) of the present embodiment applied to a resin composition tends to exert favorable abrasion resistance.

<Preferred Form of Hydrogenated Copolymer (A) when Hydrogenated Copolymer (X) of Present Embodiment is Used as Material for Adhesive Film>

In the case of using the hydrogenated copolymer (X) of the present embodiment as a material for an adhesive film, the vinyl aromatic monomer unit content (RS1) in the random copolymer structure of the hydrogenated copolymer (A) (hereinafter, also referred to as a styrene content in a random structure or a random styrene content when styrene is used) is preferably in the range of 10 mass % to 60 mass %, more preferably in the range of 15 mass % to 50 mass %, further preferably in the range of 20 mass % to 45 mass %.

When the vinyl aromatic monomer unit content (RS1) falls within the range described above, the hydrogenated copolymer (X) of the present embodiment applied to a material for an adhesive film tends to exert favorable balance between adhesiveness and feedability.

The content of the vinyl aromatic monomer unit contained in the random copolymer structure of the hydrogenated copolymer (A) can be measured by nuclear magnetic resonance (NMR). Specifically, the content can be measured by a method described in Examples mentioned later.

The content of the vinyl aromatic monomer unit in the random copolymer structure of the hydrogenated copolymer (A) can be controlled within the numerical range described above by adjusting the amount of the vinyl aromatic monomer unit added or the timing of addition thereof in a polymerization step.

<Preferred Form of Hydrogenated Copolymer (A) when Hydrogenated Copolymer (X) of Present Embodiment is Used in Resin Composition>

In the case of using the hydrogenated copolymer (X) of the present embodiment in a resin composition, the content of the vinyl aromatic monomer unit in the hydrogenated copolymer (A) is 10 mass % to 80 mass %, preferably in the range of 30 mass % to 80 mass %, more preferably in the range of 35 mass % to 75 mass %, further preferably in the range of 40 mass % to 70 mass %.

When the content of the vinyl aromatic monomer unit in the hydrogenated copolymer (A) is 80 mass % or less, the hydrogenated copolymer (X) of the present embodiment tends to have low hardness. When the content is 10 mass % or more, the hydrogenated copolymer (X) of the present embodiment tends to exert excellent pellet blocking resistance.

When the content of the vinyl aromatic monomer unit in the hydrogenated copolymer (A) falls within the range of 10 mass % to 80 mass %, the hydrogenated copolymer (X) of the present embodiment applied to a resin composition tends to exert favorable abrasion resistance.

<Preferred Form of Hydrogenated Copolymer (A) when Hydrogenated Copolymer (X) of Present Embodiment is Used as Material for Adhesive Film>

In the case of using the hydrogenated copolymer (X) of the present embodiment as a material for an adhesive film, the content of the vinyl aromatic monomer unit in the hydrogenated copolymer (A) is 10 mass % to 80 mass %, preferably in the range of 10 mass % to 60 mass %, more preferably in the range of 20 mass % to 55 mass %, further preferably in the range of 25 mass % to 50 mass %.

When the content of the vinyl aromatic monomer unit in the hydrogenated copolymer (A) is 80 mass % or less, the hydrogenated copolymer (X) of the present embodiment tends to have high adhesion. When the content is 10 mass % or more, the hydrogenated copolymer (X) of the present embodiment tends to exert excellent pellet blocking resistance.

When the content of the vinyl aromatic monomer unit in the hydrogenated copolymer (A) falls within the range of 10 mass % to 80 mass %, the hydrogenated copolymer (X) of the present embodiment applied to a material for an adhesive film tends to exert favorable balance between adhesiveness and feedability.

The content of the vinyl aromatic monomer unit in the hydrogenated copolymer (A) can be measured by a proton nuclear magnetic resonance (1H-NMR) method. Specifically, the content can be measured by a method described in Examples mentioned later.

The content of the vinyl aromatic monomer unit in the hydrogenated copolymer (A) can be controlled within the numerical range described above by adjusting the amount of the vinyl aromatic monomer unit added in a polymerization step.

The number-average molecular weight (Mn1) of the hydrogenated copolymer (A) is 1000 to 40000, preferably 10000 to 40000, more preferably 10000 to 30000.

When the number-average molecular weight of the hydrogenated copolymer (A) is 40000 or less, the hydrogenated copolymer (X) of the present embodiment tends to have low shear viscosity and the hydrogenated copolymer (X) of the present embodiment applied to a resin composition tends to be able to prevent a flow mark during injection molding.

The number-average molecular weight (Mn1) of the hydrogenated copolymer (A) is 1000 or more from the viewpoint of productivity. When the number-average molecular weight is 1000 or more, the hydrogenated copolymer (X) of the present embodiment applied to a resin composition is less likely to cause sprue break during injection molding and tends to be excellent in mold releasability.

The number-average molecular weight (Mn1) of the hydrogenated copolymer (A) can be measured by gel permeation chromatography (hereinafter, referred to as GPC) using a calibration curve based on standard polystyrene. Specifically, the number-average molecular weight can be measured by a method described in Examples mentioned later.

The number-average molecular weight (Mn1) of the hydrogenated copolymer (A) can be controlled within the numerical range described above by adjusting conditions such as the amount of a monomer added or the amount of a polymerization initiator added in a polymerization step.

Hydrogenation rate of aliphatic double bonds derived from the conjugated diene monomer unit in the hydrogenated copolymer (A) is preferably 40% or more, more preferably 60% or more, further preferably 80% or more.

When the hydrogenation rate in the hydrogenated copolymer (A) is 40% or more, the thermal deterioration (oxidative deterioration) of the hydrogenated copolymer (X) of the present embodiment can be suppressed. In addition, pellet blocking resistance also tends to be favorable.

The hydrogenation rate of aliphatic double bonds derived from the conjugated diene monomer unit in the hydrogenated copolymer (A) can be controlled, for example, by adjusting the amount of the catalyst during hydrogenation. The hydrogenation rate can be controlled, for example, by adjusting the amount of the catalyst, the amount of hydrogen fed, pressure and temperature at the time of hydrogenation.

Hydrogenation rate of double bonds derived from the conjugated diene monomer unit in each of the hydrogenated copolymer (A) and the hydrogenated copolymer (B) mentioned later can be measured with a nuclear magnetic resonance apparatus (NMR).

The vinyl bond content before hydrogenation in the conjugated diene monomer unit of the hydrogenated copolymer (A) is preferably 5 mol % to 80 mol %, more preferably 7 mol % to 75 mol %, further preferably 10 mol % to 70 mol %.

When the vinyl bond content before hydrogenation in the hydrogenated copolymer (A) is 5 mol % or more, the hydrogenated copolymer (X) of the present embodiment tends to have low hardness. When the vinyl bond content before hydrogenation in the hydrogenated copolymer (A) is 80 mol % or less, the hydrogenated copolymer (X) of the present embodiment tends to exert favorable pellet blocking resistance.

In the present embodiment, the vinyl bond content refers to the total content of a 1,2-vinyl bond content (for conjugated diene incorporated in a polymer by a 1,2-bond) and a 3,4-vinyl bond content (for conjugated diene incorporated in a polymer by a 3,4-bond) based on total conjugated diene (wherein the vinyl bond content refers to a 1,2-vinyl bond content when 1,3-butadiene is used as conjugated diene, and a 3,4-vinyl bond content when isoprene is used as conjugated diene).

The vinyl bond content can be measured using a nuclear magnetic resonance apparatus (NMR). A microstructure (ratios of cis, trans, and vinyl bonds) derived from the conjugated diene monomer unit in the hydrogenated copolymer (A) can be arbitrarily controlled by use of a polar compound or the like mentioned later.

The hydrogenated copolymer (A) is not limited as long as its structure comprises a random copolymer structure. The hydrogenated copolymer (A) preferably has, for example, a structure as represented by any of the following general formulas.

c $(a\text{--}c)_n$ $a\text{--}c\text{--}a$ $b\text{--}c$ $a\text{--}b\text{--}c$ $a\text{--}c\text{--}b$ $(c)_m\text{--}Z$ $(a\text{--}c)_m\text{--}Z$ $(a\text{--}b\text{--}c)_m\text{--}Z$ $(a\text{--}c\text{--}b)_m\text{--}Z$ In the formulas, a, b, and c represent polymer blocks (a), (b), and (c), respectively.

c or a–c is preferred from the viewpoint of productivity.

Alternatively, the hydrogenated copolymer (A) may be a mixture having plural types of the structures described above at an arbitrary ratio.

In each general formula mentioned above which represents the hydrogenated copolymer (A), (a) is a polymer block mainly comprising a vinyl aromatic monomer unit, (b) is a polymer block mainly comprising a conjugated diene monomer unit, and (c) is a random copolymer block comprising a vinyl aromatic monomer unit and a conjugated diene monomer unit.

n is an integer of 1 or more, preferably an integer of 1 to 10, more preferably an integer of 1 to 5.

m is an integer of 2 or more, preferably an integer of 2 to 11, more preferably an integer of 2 to 8.

Z represents a coupling agent residue. In this context, the coupling agent residue means a residue after coupling by a coupling agent for use in coupling between polymer blocks (b) and between polymer blocks (c).

Examples of the coupling agent include, but are not limited to, polyhalogen compounds and acid esters mentioned later.

The hydrogenated copolymer (A) preferably has a polymer block mainly comprising a vinyl aromatic monomer unit. When the hydrogenated copolymer (A) has a polymer block mainly comprising a vinyl aromatic monomer unit, the hydrogenated copolymer (X) of the present embodiment used in a resin composition tends to improve abrasion resistance. Also, the hydrogenated copolymer (X) of the present embodiment used as a material for an adhesive film tends to reduce adhesive residues and also tends to obtain excellent low increase in adhesive.

In the present specification, the phrase "mainly comprise" means that the polymer block concerned contains more than 70 mass % and 100 mass % or less, preferably 80 mass % or more and 100 mass % or less, more preferably 90 mass % or more and 100 mass % or less, of the monomer unit concerned.

The vinyl aromatic monomer unit in the polymer block (c) may be uniformly distributed or may be distributed in a tapered pattern. The vinyl aromatic monomer unit may exist as a plurality of uniformly distributed moieties and/or a plurality of moieties distributed in a tapered pattern. In the polymer block (c), a plurality of moieties differing in the content of the vinyl aromatic monomer unit may coexist with each other.

(Hydrogenated Copolymer (B))

The hydrogenated copolymer (X) of the present embodiment contains a hydrogenated copolymer (B).

The hydrogenated copolymer (B) is a hydrogenated copolymer which is a hydrogenated copolymer of a vinyl aromatic monomer unit and a conjugated diene monomer unit, and has a random copolymer structure comprising a vinyl aromatic monomer unit and a conjugated diene monomer unit.

The content of the vinyl aromatic monomer unit in the hydrogenated copolymer (B) is 10 mass % or more and 80 mass % or less.

<Vinyl Aromatic Monomer Unit>

Examples of the vinyl aromatic monomer unit constituting the hydrogenated copolymer (B) include, but are not limited to, vinyl aromatic monomer units such as styrene, α-methylstyrene, p-methylstyrene, divinylbenzene, 1,1-diphenylethylene, N,N-dimethyl-p-aminoethylstyrene, and N,N-diethyl-p-aminoethylstyrene.

Among them, styrene, α-methylstyrene, and 4-methylstyrene are preferred from the viewpoint of availability and productivity.

Only one of these vinyl aromatic monomer units may be used, or two or more thereof may be used in combination.

<Conjugated Diene Monomer Unit>

The conjugated diene monomer unit constituting the hydrogenated copolymer (B) can be diolefin having conjugated double bonds. Examples thereof include, but are not limited to, 1,3-butadiene, 2-methyl-1,3-butadiene (isoprene), 2,3-dimethyl-1,3-butadiene, 1,3-pentadiene, 2-methyl-1,3-pentadiene, 1,3-hexadiene, and farnesene.

Among them, 1,3-butadiene and/or isoprene are preferred from the viewpoint of availability and productivity. One of these conjugated diene monomer units may be used alone, or two or more thereof may be used in combination.

The hydrogenated copolymer (B) has a random copolymer structure comprising a vinyl aromatic monomer unit and a conjugated diene monomer unit.

<Preferred Form of Hydrogenated Copolymer (B) when Hydrogenated Copolymer (X) is Used in Resin Composition>

The vinyl aromatic monomer unit content (RS2) in the random copolymer structure of the hydrogenated copolymer (B) is preferably in the range of 30 mass % to 80 mass %, more preferably in the range of 35 mass % to 75 mass %, further preferably in the range of 40 mass % to 70 mass %.

When the vinyl aromatic monomer unit content (RS2) falls within the range described above, the hydrogenated copolymer (X) of the present embodiment applied to a resin composition tends to exert favorable abrasion resistance.

<Preferred Form of Hydrogenated Copolymer (B) when Hydrogenated Copolymer (X) is Used as Material for Adhesive Film>

The vinyl aromatic monomer unit content (RS2) in the random copolymer structure of the hydrogenated copolymer (B) (hereinafter, also referred to as a styrene content in a random structure or a random styrene content when styrene is used) is preferably in the range of 10 mass % to 60 mass %, more preferably in the range of 15 mass % to 50 mass %, further preferably in the range of 20 mass % to 45 mass %.

When the vinyl aromatic monomer unit content (RS2) falls within the range described above, the hydrogenated copolymer (X) of the present embodiment applied to a material for an adhesive film tends to exert favorable balance between adhesiveness and feedability.

The vinyl aromatic monomer unit content in the random copolymer structure of the hydrogenated copolymer (B) can be measured by nuclear magnetic resonance (NMR). Specifically, the vinyl aromatic monomer unit content can be measured by a method described in Examples mentioned later. The vinyl aromatic monomer unit content in the random copolymer structure of the hydrogenated copolymer (B) can be controlled within the numerical range described above by adjusting the amount of the vinyl aromatic monomer unit added or the timing of addition thereof in a polymerization step.

<Preferred Form of Hydrogenated Copolymer (B) when Hydrogenated Copolymer (X) is Used in Resin Composition>

The content of the vinyl aromatic monomer unit in the hydrogenated copolymer (B) is 10 mass % to 80 mass %, preferably in the range of 30 mass % to 80 mass %, more preferably in the range of 35 mass % to 75 mass %, further preferably in the range of 40 mass % to 70 mass %.

When the content of the vinyl aromatic monomer unit in the hydrogenated copolymer (B) is 80 mass % or less, the hydrogenated copolymer (X) of the present embodiment tends to have low hardness. When the content is 10 mass % or more, the hydrogenated copolymer (X) of the present embodiment tends to exert excellent pellet blocking resistance.

When the content of the vinyl aromatic monomer unit in the hydrogenated copolymer (B) falls within the range of 10 mass % to 80 mass %, the hydrogenated copolymer (X) of the present embodiment applied to a resin composition tends to exert favorable abrasion resistance.

<Preferred Form of Hydrogenated Copolymer (B) when Hydrogenated Copolymer (X) is Used as Material for Adhesive Film>

The content of the vinyl aromatic monomer unit in the hydrogenated copolymer (B) is 10 mass % to 80 mass %, preferably in the range of 10 mass % to 60 mass %, more preferably in the range of 20 mass % to 55 mass %, further preferably in the range of 25 mass % to 50 mass %.

When the content of the vinyl aromatic monomer unit in the hydrogenated copolymer (B) is 80 mass % or less, the hydrogenated copolymer (X) of the present embodiment tends to have high adhesion. When the content is 10 mass % or more, the hydrogenated copolymer (X) of the present embodiment tends to exert excellent pellet blocking resistance.

When the content of the vinyl aromatic monomer unit in the hydrogenated copolymer (B) falls within the range of 10 mass % to 80 mass %, the hydrogenated copolymer (X) of the present embodiment applied to a material for an adhesive film tends to exert favorable balance between adhesiveness and feedability.

The content of the vinyl aromatic monomer unit in the hydrogenated copolymer (B) can be measured by a proton nuclear magnetic resonance method (hereinafter, referred to as $^1$H-NMR). Specifically, the content can be measured by a method described in Examples mentioned later.

The content of the vinyl aromatic monomer unit in the hydrogenated copolymer (B) can be controlled within the numerical range described above by adjusting the amount of the vinyl aromatic monomer unit added in a polymerization step.

The hydrogenated copolymer (B) has a random copolymer structure comprising a vinyl aromatic monomer unit and a conjugated diene monomer unit.

The hydrogenated copolymer (B) preferably has at least one polymer block mainly comprising a vinyl aromatic monomer unit, in addition thereto.

The hydrogenated copolymer (B) preferably has, for example, but not limited to, a structure as represented by any of the following general formulas.

$$(d-e)_o$$
$$d-e-d$$
$$d-e-f$$
$$d-f-e$$
$$d-e-f-d$$
$$d-e-f-e$$
$$d-f-d-e$$
$$d-f-e-f$$
$$d-e-f-e-d$$
$$d-f-e-f-d$$
$$[(d-f)_o]p-Z$$
$$(d-e-f)_p-Z$$
$$(d-f-e)_p-Z$$
$$(d-e-f-e)_p-Z$$
$$(d-f-e-f)_p-Z$$

In the formulas, d, e, and f represent polymer blocks (d), (e), and (f), respectively.

The hydrogenated copolymer (B) more preferably has two or more polymer blocks (d) from the viewpoint of the mechanical strength of the hydrogenated copolymer (X) of the present embodiment.

Alternatively, the hydrogenated copolymer (B) may be a mixture containing plural types of polymers having the structures described above at an arbitrary ratio.

In each general formula mentioned above which represents the hydrogenated copolymer (B), (d) is a polymer block mainly comprising a vinyl aromatic monomer unit, (e) is a polymer block mainly comprising a conjugated diene monomer unit, and (f) is a random copolymer block comprising a vinyl aromatic monomer unit and a conjugated diene monomer unit.

o is an integer of 1 or more, preferably an integer of 1 to 10, more preferably an integer of 1 to 5.

p is an integer of 2 or more, preferably an integer of 2 to 11, more preferably an integer of 2 to 8.

Z represents a coupling agent residue. In this context, the coupling agent residue means a residue after coupling by a coupling agent for use in coupling between polymer blocks (e) and between polymer blocks (f).

Examples of the coupling agent include, but are not limited to, polyhalogen compounds and acid esters mentioned later.

The hydrogenated copolymer (B) is preferably obtained by sequential polymerization from the viewpoint of strength. The phrase "obtained by sequential polymerization" means that a final target polymer structure is obtained by sequential polymerization from one end to the other end, and refers to polymerization without the use of coupling reaction.

The hydrogenated copolymer (B) preferably contains no coupling agent residue from the viewpoint of strength. This can prevent contamination with an unintended uncoupled polymer or the like.

The vinyl aromatic monomer unit in the polymer block (f) may be uniformly distributed or may be distributed in a tapered pattern. Th vinyl aromatic monomer unit may exist as a plurality of uniformly distributed moieties and/or a plurality of moieties distributed in a tapered pattern. In the polymer block (f), a plurality of moieties differing in the content of the vinyl aromatic monomer unit may coexist with each other.

The lower limit of the number-average molecular weight (Mn2) of the hydrogenated copolymer (B) is preferably 120,000 or more, more preferably 150,000 or more, further preferably 160,000 or more.

When the number-average molecular weight (Mn2) of the hydrogenated copolymer (B) is 120,000 or more, mechanical strength tends to be improved because of increased entanglement of polymers. Furthermore, favorable pellet blocking resistance tends to be exerted.

The upper limit of the number-average molecular weight (Mn2) of the hydrogenated copolymer (B) is preferably 1,000,000 or less, more preferably 800,000 or less, further preferably 500,000 or less, furthermore preferably 200,000 or less.

When the number-average molecular weight (Mn2) of the hydrogenated copolymer (B) is 1,000,000 or less, the hydrogenated copolymer (X) of the present embodiment tends to have low shear viscosity and also tends to have low hardness.

When the number-average molecular weight (Mn2) of the hydrogenated copolymer (B) is 200,000 or less, a resin composition comprising the hydrogenated copolymer (X) of the present embodiment is favorably kneaded and tends to have favorable abrasion resistance, without being influenced by the viscosity of a thermoplastic resin other than the hydrogenated copolymer (X) and/or a rubber-like polymer other than the hydrogenated copolymer (X) constituting the resin composition.

The number-average molecular weight (Mn2) of the hydrogenated copolymer (B) can be measured by GPC.

The number-average molecular weight (Mn2) of the hydrogenated copolymer (B) can be controlled within the numerical range described above by adjusting conditions such as the amount of a monomer added or the amount of a polymerization initiator added in a polymerization step.

The ratio (Mw2/Mn2) of a weight-average molecular weight (Mw2) to the number-average molecular weight (Mn2) of the hydrogenated copolymer (B) is preferably less than 1.15, more preferably 1.14 or less, further preferably 1.13 or less.

When the ratio (Mw2/Mn2) is less than 1.15, mechanical strength tends to be improved. A polymer having (Mw2/Mn2) of less than 1.15 tends to be able to be easily produced by sequential polymerization.

Hydrogenation rate of aliphatic double bonds derived from the conjugated diene monomer unit in the hydrogenated copolymer (B) is preferably 40% or more, more preferably 60% or more, further preferably 80% or more.

When the hydrogenation rate in the hydrogenated copolymer (B) is 40% or more, the thermal deterioration (oxidative deterioration) of the hydrogenated copolymer (X) of the present embodiment can be suppressed. In addition, pellet blocking resistance also tends to be favorable.

The hydrogenation rate can be controlled, for example, by the amount of the catalyst during hydrogenation. The hydrogenation rate can be controlled, for example, by the amount of the catalyst, the amount of hydrogen fed, pressure and temperature at the time of hydrogenation.

Hydrogenation rate can be measured using NMR.

The vinyl bond content before hydrogenation in the conjugated diene monomer unit of the hydrogenated copolymer (B) is preferably 5 mol % to 80 mol %, more preferably 7 mol % to 75 mol %, further preferably 10 mol % to 70 mol %.

When the vinyl bond content before hydrogenation in the hydrogenated copolymer (B) is 5 mol % or more, the hydrogenated copolymer (X) of the present embodiment tends to have low hardness. When the vinyl bond content before hydrogenation in the hydrogenated copolymer (B) is 80 mol % or less, the hydrogenated copolymer (X) of the present embodiment tends to exert favorable pellet blocking resistance.

(Classification Between Hydrogenated Copolymer (A) and Hydrogenated Copolymer (B))

The hydrogenated copolymer (X) of the present embodiment comprises the hydrogenated copolymer (A) and the hydrogenated copolymer (B) and therefore has two or more peaks in a GPC chart. Among them, the hydrogenated copolymer (A) refers to every component having a number-average molecular weight of 40000 or less, or a component having the lowest molecular weight among the peaks in a GPC chart in the absence of a component having a number-average molecular weight of 40000 or less.

(Relationship Between Number-Average Molecular Weights of Hydrogenated Copolymers (A) and (B))

The ratio (Mn1/Mn2) of the number-average molecular weight (Mn1) of the hydrogenated copolymer (A) to the number-average molecular weight (Mn2) of the hydrogenated copolymer (B) is less than 0.25, preferably less than 0.20, more preferably less than 0.17, further preferably less than 0.12.

When the ratio (Mn1/Mn2) is less than 0.25, the hydrogenated copolymer (X) of the present embodiment has good processability and, when applied to a resin composition, tends to prevent flow mark during injection molding and tends to exert favorable abrasion resistance.

(Mass Ratio Between Hydrogenated Copolymer (A) and Hydrogenated Copolymer (B))

In the hydrogenated copolymer (X) of the present embodiment, the mass ratio (A)/(B) of the content of the hydrogenated copolymer (A) to the content of the hydrogenated copolymer (B) is 5/95 to 50/50, preferably 10/90 to 50/50, more preferably 30/70 to 50/50, from the viewpoint of the balance among shear viscosity, pellet blocking resistance, and the abrasion resistance of a resin composition.

When the hydrogenated copolymer (X) of the present embodiment contains 5 mass % or more of the hydrogenated copolymer (A), the hydrogenated copolymer (X) tends to exhibit favorable processability and, when applied to a resin composition, tends to prevent flow mark during injection molding. When the hydrogenated copolymer (X) contains 50 mass % or less of the hydrogenated copolymer (A), the hydrogenated copolymer (X) applied to a resin composition tends to suppress sprue break during injection molding and tends to improve mold releasability.

The hydrogenated copolymer (A) used alone causes cold flow. Thus, the shape of a molded article is difficult to maintain.

(Tan δ Peak in Viscoelasticity Measurement of Hydrogenated Copolymer (X))

In the case of using the hydrogenated copolymer (X) of the present embodiment in a resin composition, the hydrogenated copolymer (X) preferably has at least one tan δ peak in the range of −20° C. to 40° C., more preferably has a tan δ peak in the range of −10° C. to 30° C., and further preferably has a tan δ peak in the range of 0° C. to 20° C., in viscoelasticity measurement (1 Hz).

When the hydrogenated copolymer (X) of the present embodiment has a tan δ peak in the range of −20° C. to 40° C., the hydrogenated copolymer (X) of the present embodiment used in a resin composition attains low hardness and tends to improve abrasion resistance.

In the case of using the hydrogenated copolymer (X) of the present embodiment in an adhesive film, the hydrogenated copolymer (X) preferably has at least one tan δ peak in the range of −20° C. to 40° C., more preferably has a tan δ peak in the range of −20° C. to 25° C., and further preferably has a tan δ peak in the range of −20° C. to 10° C., in viscoelasticity measurement (1 Hz).

When the hydrogenated copolymer (X) of the present embodiment has a tan δ peak in the range of −20° C. to 40° C., the hydrogenated copolymer (X) attains low hardness and tends to improve adhesion.

The tan δ peak temperature of the hydrogenated copolymer (X) can be controlled by adjusting the structures of the hydrogenated copolymer (A) and the hydrogenated copolymer (B), and their contents.

The tan δ peak temperature of the hydrogenated copolymer (X) tends to be elevated with increase in the vinyl aromatic monomer unit content (RS1) in the random copolymer structure of the hydrogenated copolymer (A).

The tan δ peak temperature of the hydrogenated copolymer (X) tends to be elevated with increase in the vinyl aromatic monomer unit content (RS2) in the random copolymer structure of the hydrogenated copolymer (B).

When the tan δ peak temperature of the hydrogenated copolymer (A) is lower than that of the hydrogenated copolymer (B), the tan δ peak temperature of the hydrogenated copolymer (X) tends to be lowered with increase in the content of the hydrogenated copolymer (A). When the tan δ peak temperature of the hydrogenated copolymer (A) is higher than that of the hydrogenated copolymer (B), the tan δ peak temperature of the hydrogenated copolymer (X) tends to be elevated with increase in the content of the hydrogenated copolymer (A).

(Relationship Between Vinyl Aromatic Monomer Unit Contents in Random Copolymer Structures of Hydrogenated Copolymers (A) and (B))

The ratio (RS1/RS2) of the vinyl aromatic monomer unit content (RS1) in the random copolymer structure of the hydrogenated copolymer (A) to the vinyl aromatic monomer unit content (RS2) in the random copolymer structure of the hydrogenated copolymer (B) is preferably in the range of 0.80 to 1.20, more preferably in the range of 0.82 to 1.18, further preferably 0.85 to 1.15.

When the ratio (RS1/RS2) falls within the range of 0.80 to 1.20, pellet blocking resistance tends to be improved because of high compatibility between the hydrogenated copolymer (A) and the hydrogenated copolymer (B).

The vinyl aromatic monomer unit content in each of the random copolymer structures of the hydrogenated copolymer (A) and the hydrogenated copolymer (B) can be controlled within the numerical range described above by adjusting the amount of the vinyl aromatic monomer unit fed during polymerization, and can be measured by NMR.

(Relationship Between Molecular Weights of Blocks Mainly Comprising Vinyl Aromatic Monomer Unit in Hydrogenated Copolymers (A) and (B))

When both the hydrogenated copolymer (A) and the hydrogenated copolymer (B) have a polymer block mainly comprising a vinyl aromatic monomer unit, the ratio (MnS1/MnS2) of the molecular weight (MnS1) of the polymer block mainly comprising a vinyl aromatic monomer unit in the hydrogenated copolymer (A) to the molecular weight (MnS2) of the polymer block mainly comprising a vinyl aromatic monomer unit in the hydrogenated copolymer (B) is preferably 0.9 or less, more preferably 0.8 or less, further preferably 0.7 or less.

When the ratio (MnS1/MnS2) is 0.9 or less, the hydrogenated copolymer (X) of the present embodiment tends to have low hardness.

The molecular weights (MnS1) and (MnS2) can be adjusted by the amount of a monomer added during polymerization.

MnS1 and MnS2 are calculated by the following method.

$$MnS1 = Mn1 \times BS1$$

$$MnS2 = Mn2 \times BS2/f$$

BS1: the content of the polymer block mainly comprising a vinyl aromatic monomer unit in the hydrogenated copolymer (A) determined by proton nuclear magnetic resonance ($^1$H-NMR)

BS2: the content of the polymer block mainly comprising a vinyl aromatic monomer unit in the hydrogenated copolymer (B) determined by proton nuclear magnetic resonance ($^1$H-NMR)

f: the degree of branching of the hydrogenated copolymer (B) determined by a GPC-light scattering measurement method with a viscosity detector Mn1: the number-average molecular weight of the hydrogenated copolymer (A)

Mn2: the number-average molecular weight of the hydrogenated copolymer (B)

The number-average molecular weights (Mn1) and (Mn2) can be measured by GPC using a calibration curve based on standard polystyrene.

The contents (BS1) and (BS2) can be measured by NMR.

The degree of branching (f) can be measured by a GPC-light scattering measurement method with a viscosity detector.

Specific measurement methods will be mentioned later.

Methods for measuring the vinyl aromatic monomer unit contents (RS1) and (RS2) in the random copolymer structures, and the contents (BS1) and (BS2) of the polymer blocks mainly comprising a vinyl aromatic monomer unit will be specifically described by taking, as an example, the case of using NMR and using styrene as a vinyl aromatic monomer unit and 1,3-butadiene as a conjugated diene monomer unit.

$^1$H-NMR was measured using samples of 30 mg each of the hydrogenated copolymer (A) and the hydrogenated copolymer (B) dissolved in 1 g of deuterated chloroform. The content (BS) of a block polymer structure mainly comprising a vinyl aromatic monomer unit (in this case, a polystyrene block) was determined from the ratio of the integrated value of chemical shifts 6.9 ppm to 6.3 ppm to the total integrated value.

Block styrene intensity (*b-St* intensity)=(Integrated value of 6.9 ppm to 6.3 ppm)/2

Random styrene intensity (*r-St* intensity)=(Integrated value of 7.5 ppm to 6.9 ppm)−3×(*b-St*)

Ethylene-butylene intensity (EB intensity)=Total integrated value−3×{(*b-St* intensity)+(*r-St* intensity)}/8

Polystyrene block content (BS)=104×(b-St intensity)/
[104×{(b-St intensity)+(r-St intensity)}+56×(EB
intensity)]

Styrene content (RS) in the random copolymer struc-
ture=104×(r-St intensity)/{104×(r-St intensity)+
56×(EB intensity)}

(Degree of Branching (f) of Hydrogenated Copolymer (B))

The degree of branching (f) of the hydrogenated copolymer (B) can be measured by a GPC-light scattering measurement method with a viscosity detector.

GPC-light scattering measurement with a viscosity detector is carried out using the hydrogenated copolymer (B) as a sample. Based on standard polystyrene, an absolute molecular weight (M) is determined from results obtained using a light scattering detector and a RI detector, and intrinsic viscosity ([n]) is determined from results obtained using the RI detector and the viscosity detector.

Subsequently, reference intrinsic viscosity (No) is calculated according to the following expression.

$$[\eta]_0 = a \times M^b$$

$a=-0.788+0.421\times$(Vinyl aromatic monomer unit content of the hydrogenated copolymer ($B$))

$-0.342\times$(RS2)$-0.197\times$(BS2)

$b=1.601-0.081\times$(Vinyl aromatic monomer unit content of the hydrogenated copolymer ($B$))+

$0.064\times$(RS2)$+0.039\times$(BS2)

RS2: the vinyl aromatic monomer unit content in the random copolymer structure of the hydrogenated copolymer (B)
BS2: the content of the polymer block mainly comprising a vinyl aromatic monomer unit in the hydrogenated copolymer (B) determined by proton nuclear magnetic resonance (1H-NMR)
M: the absolute molecular weight of the hydrogenated copolymer (B)

Subsequently, shrinkage factor g is calculated as the ratio of the intrinsic viscosity ([η]) of the hydrogenated copolymer (B) to the reference intrinsic viscosity ([η]$_0$).

Shrinkage factor $(g)=[\eta]/[\eta]_0$

Then, the degree of branching (f) defined as g=f/{(f+1)(f+2)}(f≥2) is calculated using the obtained shrinkage factor (g).
(Methods for Producing Hydrogenated Copolymer (A) and Hydrogenated Copolymer (B))

Examples of the methods for producing the hydrogenated copolymer (A) and the hydrogenated copolymer (B) include, but are not limited to, methods described in Japanese Patent Publication No. S36-19286, Japanese Patent Publication No. S43-17979, Japanese Patent Publication No. S46-32415, Japanese Patent Publication No. S49-36957, Japanese Patent Publication No. S48-2423, Japanese Patent Publication No. S48-4106, Japanese Patent Publication No. S51-49567, and Japanese Patent Laid-Open No. S59-166518.

The pre-hydrogenated copolymer is obtained by, for example, but not limited to, a method of performing living anion polymerization using a polymerization initiator such as an organic alkali metal compound and using predetermined monomers in a hydrocarbon solvent.

Examples of the hydrocarbon solvent include, but are not particularly limited to: aliphatic hydrocarbons such as n-butane, isobutane, n-pentane, n-hexane, n-heptane, and n-octane, alicyclic hydrocarbons such as cyclohexane, cycloheptane, and methylcycloheptane, and aromatic hydrocarbons such as benzene, toluene, xylene, and ethylbenzene.

An organic alkali metal compound generally known to have anion polymerization activity against the conjugated diene monomer unit and the vinyl aromatic monomer unit can be used as the polymerization initiator.

Examples thereof include aliphatic hydrocarbon alkali metal compounds having 1 to 20 carbon atoms, aromatic hydrocarbon alkali metal compounds having 1 to 20 carbon atoms, and organic amino alkali metal compounds having 1 to 20 carbon atoms.

Examples of the alkali metal contained in the polymerization initiator include, but are not limited to, lithium, sodium, and potassium.

One or two or more alkali metals may be contained in one molecule of the organic alkali metal compound.

Examples of the polymerization initiator include, but are not limited to, n-propyllithium, n-butyllithium, sec-butyllithium, tert-butyllithium, n-pentyllithium, n-hexyllithium, benzyllithium, phenyllithium, tolyllithium, reaction products of diisopropenylbenzene and sec-butyllithium, and reaction products of divinylbenzene, sec-butyllithium, and a small amount of 1,3-butadiene.

Alternatively, siloxy group-containing alkyllithiums such as 1-(t-butoxy)propyllithium disclosed in U.S. Pat. No. 5,708,092 and a lithium compound obtained by inserting one to several molecules of an isoprene monomer for improvement in solubility thereof, and 1-(t-butyldimethylsiloxy) hexyllithium disclosed in U.K. Patent No. 2,241,239, amino group-containing alkyllithiums disclosed in U.S. Pat. No. 5,527,753, and aminolithiums such as lithium diisopropylamide and lithium hexamethyldisilazide may be used.

The amount of the lithium compound used as the polymerization initiator depends on the molecular weight of the copolymer of interest and is preferably 0.005 to 6.4 phm (parts by mass per 100 parts by mass of monomers), more preferably 0.005 to 1.3 phr.

In the copolymerization of the conjugated diene monomer unit and the vinyl aromatic monomer unit with the organic alkali metal compound as a polymerization initiator, a tertiary amine compound or an ether compound can be added in order to adjust the content of a vinyl bond (1,2-bond or 3,4-bond) attributed to the conjugated diene monomer unit to be incorporated in the copolymer or to adjust the random copolymerizability of the conjugated diene monomer unit and the vinyl aromatic monomer unit.

Examples of the tertiary amine compound include, but are not particularly limited to, compounds represented by the following formula:

R1R2R3N wherein each of R1, R2, and R3 is a hydrocarbon group having 1 to 20 carbon atoms or a hydrocarbon group having a tertiary amino group.

Examples of such a tertiary amine compound include, but are not limited to, trimethylamine, triethylamine, tributylamine, N,N-dimethylaniline, N-ethylpiperidine, N-methylpyrrolidine, N,N,N',N'-tetramethylethylenediamine, N,N,N',N'-tetraethylethylenediamine, 1,2-dipiperidinoethane, trimethylaminoethylpiperazine, N,N,N',N'',N''-pentamethylethylenetriamine, and N,N'-dioctyl-p-phenylenediamine. Among them, N,N,N',N'-tetramethylethylenediamine is preferred.

A linear ether compound, a cyclic ether compound, or the like can be used as the ether compound.

Examples of the linear ether compound include dimethyl ether, diethyl ether, diphenyl ether, dialkyl ether compounds of ethylene glycol such as ethylene glycol dimethyl ether, ethylene glycol diethyl ether, and ethylene glycol dibutyl ether, and dialkyl ether compounds of diethylene glycol such as diethylene glycol dimethyl ether, diethylene glycol diethyl ether, and diethylene glycol dibutyl ether.

Examples of the cyclic ether compound include tetrahydrofuran, dioxane, 2,5-dimethyloxolane, 2,2,5,5-tetramethyloxolane, 2,2-bis(2-oxolanyl)propane, and alkyl ether of furfuryl alcohol.

The amount of the tertiary amine compound or the ether compound used is preferably 0.1 to 4 (mol/mol of alkali metal), more preferably 0.2 to 3 (mol/mol of alkali metal), based on the polymerization initiator of the organic alkali metal compound.

In the production process of the hydrogenated copolymer (A) or (B), sodium alkoxide may be allowed to coexist for the copolymerization of the conjugated diene monomer unit and the vinyl aromatic monomer unit.

The sodium alkoxide is, for example, but not limited to, a compound represented by the formula given below. Particularly, sodium alkoxide having an alkyl group having 3 to 6 carbon atoms is preferred, and sodium t-butoxide and sodium t-pentoxide are more preferred.

NaOR wherein R is an alkyl group having 2 to 12 carbon atoms.

The amount of the sodium alkoxide used in the polymerization step for the hydrogenated copolymer (A) or (B) is preferably 0.01 or more and less than 0.1 (molar ratio), more preferably 0.01 or more and less than 0.08 (molar ratio), further preferably 0.03 or more and less than 0.08 (molar ratio), furthermore preferably 0.04 or more and less than 0.06 (molar ratio), based on the vinyl bond content adjuster (tertiary amine compound or ether compound).

When the amount of the sodium alkoxide falls within this range, a copolymer that has a copolymer block comprising a conjugated diene monomer unit having a high vinyl bond content, and a polymer block mainly comprising a vinyl aromatic monomer unit having a narrow molecular weight distribution, and has a narrow molecular weight distribution tends to be able to be produced at a high rate of production.

The method for copolymerizing the conjugated diene monomer unit and the vinyl aromatic monomer unit with the organic alkali metal compound as a polymerization initiator is not particularly limited and may be batch polymerization, continuous polymerization, or a combination thereof.

The polymerization temperature is not particularly limited and is usually 0 to 180° C., preferably 30 to 150° C.

The time required for polymerization differs depending on conditions and is usually within 48 hours, preferably 0.1 to 10 hours.

The polymerization is preferably performed in an inert gas (e.g., nitrogen gas) atmosphere.

The polymerization pressure is not particularly limited as long as the pressure can fall within a range sufficient for maintaining the monomers and a solvent in a liquid phase in the polymerization temperature range described above.

Coupling reaction may be further performed by adding a necessary amount of a di- or higher functional coupling agent at the completion of polymerization.

The di- or higher functional coupling agent is not particularly limited, and a coupling agent known in the art can be used.

Examples of the difunctional coupling agent include, but are not limited to: dihalogen compounds such as dimethyldichlorosilane and dimethyldibromosilane; and acid esters such as methyl benzoate, ethyl benzoate, phenyl benzoate, and phthalic acid esters.

Examples of the tri- or higher multifunctional coupling agents include, but are not limited to: 1,1,1,2,2-pentachloroethane; perchloroethane; pentachlorobenzene; perchlorobenzene; octabromodiphenyl ether; decabromodiphenyl ether; tri- or higher hydric polyalcohols; polyvalent epoxy compounds such as epoxidized soybean oil and diglycidyl bisphenol A; di- to hexafunctional epoxy group-containing compounds; carboxylic acid ester; polyvinyl compounds such as divinylbenzene; silicon halide compounds represented by the formula R1(4-n)SiX$_n$ (wherein R1 represents a hydrocarbon group having 1 to 20 carbon atoms, X represents halogen, and n represents an integer of 3 or 4); and tin halide compounds.

Examples of the silicon halide compounds include, but are not limited to, methylsilyl trichloride, t-butylsilyl trichloride, silicon tetrachloride, and bromides thereof.

Examples of the tin halide compounds include, but are not limited to, polyvalent halogen compounds such as methyltin trichloride, t-butyltin trichloride, and tin tetrachloride. Alternatively dimethyl carbonate, diethyl carbonate, or the like may be used.

The hydrogenated copolymer (A) or (B) may be obtained through the addition reaction of a modifying agent that forms a functional group-containing atomic group to the living end of the block copolymer obtained by the method as mentioned above.

Examples of the functional group-containing atomic group include, but are not limited to, atomic groups containing at least one functional group selected from the group consisting of a hydroxy group, a carbonyl group, a thiocarbonyl group, an acid halide group, an acid anhydride group, a carboxyl group, a thiocarboxylic acid group, an aldehyde group, a thioaldehyde group, a carboxylic acid ester group, an amide group, a sulfonic acid group, a sulfonic acid ester group, a phosphoric acid group, a phosphoric acid ester group, an amino group, an imino group, a nitrile group, a pyridyl group, a quinoline group, an epoxy group, a thioepoxy group, a sulfide group, an isocyanate group, an isothiocyanate group, a silicon halide group, a silanol group, an alkoxysilicon group, a tin halide group, an alkoxytin group, and a phenyltin group.

Examples of the modifying agent having each functional group-containing atomic group mentioned above include, but are not limited to, tetraglycidyl-m-xylenediamine, tetraglycidyl-1,3-bisaminomethylcyclohexane, ε-caprolactone, δ-valerolactone, 4-methoxybenzophenone, glycidoxyethyltrimethoxysilane, γ-glycidoxypropyltrimethoxysilane, glycidoxypropyldimethylphenoxysilane, bis(γ-glycidoxypropyl)methylpropoxysilane, 1,3-dimethyl-2-imidazolidinone, 1,3-diethyl-2-imidazolidinone, N,N'-dimethylpropyleneurea, and N-methylpyrrolidone.

The amount of the modifying agent added is preferably 0.01 to 20 parts by mass, more preferably 0.1 to 15 parts by mass, further preferably 0.3 to 10 parts by mass, per 100 parts by mass of the copolymer before modification.

The addition reaction temperature of the modifying agent is preferably 0 to 150° C., more preferably 20 to 120° C.

The time required for modification reaction differs depending on modification reaction conditions and is preferably within 24 hours, more preferably 0.1 to 10 hours.

The hydrogenated copolymer (A) or (B) constituting the hydrogenated copolymer (X) of the present embodiment is produced through a hydrogenation step after the polymerization step mentioned above or after the modification step mentioned above.

The hydrogenation catalyst for use in the production of the hydrogenated copolymer (A) or (B) is not particularly limited, and, for example, a hydrogenation catalyst described in Japanese Patent Publication No. S42-8704, Japanese Patent Publication No. S43-6636, Japanese Patent Publication No. S63-4841, Japanese Patent Publication No. H1-37970, Japanese Patent Publication No. H1-53851, or Japanese Patent Publication No. H2-9041 can be used.

Preferred examples of the hydrogenation catalyst include titanocene compounds and/or mixtures with reducing organometallic compounds.

Examples of the titanocene compound include, but are not particularly limited to, compounds described in Japanese Patent Laid-Open No. H8-109219 and specifically include compounds having at least one or more ligands having a (substituted) cyclopentadienyl structure (e.g., bis(cyclopentadienyl)titanium dichloride and mono(pentamethylcyclopentadienyl)titanium trichloride), an indenyl structure, or a fluorenyl structure.

Examples of the reducing organometallic compounds include, but are not particularly limited to, organic alkali metal compounds such as organolithium, organomagnesium compounds, organoaluminum compounds, organoboron compounds, and organozinc compounds.

The reaction temperature of the hydrogenation reaction is usually 0 to 200° C., preferably 30 to 150° C.

The pressure of hydrogen for use in the hydrogenation reaction is preferably 0.1 to 15 MPa, more preferably 0.2 to 10 MPa, further preferably 0.3 to 5 MPa.

The reaction time of the hydrogenation reaction is usually 3 minutes to 10 hours, preferably 10 minutes to 5 hours.

The hydrogenation reaction can employ a batch process or a continuous process, or a combination thereof.

If necessary, catalyst residues may be removed from the reaction solution after the hydrogenation step.

Examples of the method for separating the hydrogenated copolymer from a solvent include, but are not limited to, a method of precipitating and recovering the hydrogenated copolymer by the addition of a polar solvent, such as acetone or an alcohol, which serves as a poor solvent to the hydrogenated copolymer, to the solution of the hydrogenated copolymer, a method of adding the solution of the hydrogenated copolymer into hot water with stirring and removing the solvent by steam stripping to recover the hydrogenated copolymer, and a method of distilling off the solvent by directly heating the solution of the hydrogenated copolymer.

The hydrogenated copolymer (X) of the present embodiment may contain an antioxidant on the surface and/or in the inside thereof, for example, by the addition of the antioxidant given below during production.

The resin composition of the present embodiment mentioned later may also be supplemented with the antioxidant given below.

Examples of the antioxidant include, but are not limited to, phenol antioxidants, phosphorus antioxidants, sulfur antioxidants, and amine antioxidants.

Specific examples thereof include 2,6-di-t-butyl-4-methylphenol, n-octadecyl-3-(4'-hydroxy-3',5'-di-t-butyl-phenyl) propionate, tetrakis-[methylene-3-(3',5'-di-t-butyl-4'-hydroxyphenyl)propionate]methane], tris-(3,5-di-t-butyl-4-hydroxybenzyl)isocyanurate, 4,4'-butylidene-bis-(3-methyl-6-t-butylphenol), 3,9-bis[2-{3-(3-t-butyl-4-hydroxy-5-methylphenyl)propionyloxy}-1,1-dimethylethyl]-2,4,8,10-tetraoxaspiro[5,5]undecane, triethylene glycol-bis[3-(3-t-butyl-5-methyl-4-hydroxyphenyl)propionate], 1,6-hexanediol-bis-[3-(3,5-di-t-butyl-4-hydroxyphenyl) propionate], 2,4-bis-(n-octylthio)-6-(4-hydroxy-3,5-di-t-butylanilino)1,3,5-triazine, pentaerythritil-tetrakis[3-(3,5-di-t-butyl-4-hydroxyphenyl)propionate], 2,2-thiodiethylenebis[3-(3,5-di-t-butyl-4-hydroxyphenyl) propionate], N, N'-hexamethylenebis(3,5-di-t-butyl-4-hydroxy-hydrocinnamide), 3,5-di-t-butyl-4-hydroxybenzyl phosphonate-diethyl ester, 1,3,5-trimethyl-2,4,6-tris(3,5-di-t-butyl-4-hydroxybenzyl)benzene, a mixture of calcium bis (ethyl 3,5-di-t-butyl-4-hydroxybenzylphosphonate) and polyethylene wax (50%), octylated diphenylamine, 2,4-bis [(octylthio)methyl]-o-cresol, isooctyl-3-(3,5-di-t-butyl-4-hydroxyphenyl)propionate, butyric acid, 3,3-bis(3-t-butyl-4-hydroxyphenyl)ethylene ester, 1,1,3-tris-(2-methyl-4-hydroxy-5-t-butylphenyl)butane, 1,3,5-tris(4-t-butyl-3-hydroxy-2,6-dimethylbenzyl)isocyanurate, 2-t-butyl-6-(3'-t-butyl-5'-methyl-2'-hydroxybenzyl)-4-methyl phenyl-acrylate, and 2-[1-(2-hydroxy-3,5-di-t-pentylphenyl)-ethyl]-4,6-di-t-pentylphenyl acrylate.

(Method for Producing Hydrogenated Copolymer (X))

Examples of the method for producing the hydrogenated copolymer (X) include, but are not particularly limited to, (1) a method of producing each of the hydrogenated copolymer (A) and the hydrogenated copolymer (B) by polymerization, and mixing the hydrogenated copolymers before recovery from a production solvent, (2) a method of mixing the hydrogenated copolymer (A) and the hydrogenated copolymer (B) after solvent removal and catalyst removal from each of them, (3) a method of adding a polymerization initiator at two divided stages during polymerization reaction, (4) a method of terminating the reaction of some living ends by the addition of the modifying agent for living ends or a protic reagent (e.g., an alcohol) as a polymerization terminator during polymerization reaction, (5) a method of terminating the reaction of all living ends by the addition of the modifying agent for living ends or a protic reagent (e.g., an alcohol) as a polymerization terminator after polymerization reaction, and then adding a fresh polymerization initiator and monomers to the solution for polymerization, and (6) a method of adding the hydrogenated copolymer (A) in a liquid state to the hydrogenated copolymer (B) during extrusion kneading.

In the method (1), a method of mixing the polymer solutions before hydrogenation reaction of the hydrogenated copolymer (A) and the hydrogenated copolymer (B), followed by hydrogenation reaction, or a method of subjecting each of the hydrogenated copolymer (A) and the hydrogenated copolymer (B) to hydrogenation reaction, and then mixing the respective solutions may be carried out. The mixing ratio between the hydrogenated copolymer (A) and the hydrogenated copolymer (B) can be controlled by adjusting the concentrations of their respective polymer solutions and the amounts of the solutions mixed.

In the method (3), the mixing ratio between the hydrogenated copolymer (A) and the hydrogenated copolymer (B) can be arbitrarily controlled by adjusting the feed rates of the vinyl aromatic monomer unit and the conjugated diene monomer unit, the amounts of the polymerization initiator added at two stages, the timing of addition of the polymerization initiator at the second stage, etc.

In the method (4), the mixing ratio between the hydrogenated copolymer (A) and the hydrogenated copolymer (B) can be arbitrarily controlled by adjusting the feed rates of the vinyl aromatic monomer unit and the conjugated diene monomer unit, the amount of the modifying agent or the polymerization initiator added during the process, the timing of addition thereof, etc.

The hydrogenated copolymer (A) is a low-molecular-weight form and has small molecular entanglement. Hence, mixing thereof before solvent removal, as in the methods (1), (3), (4) and (5), enables solvent removal and finishing steps to be performed at high rates.

The methods (3), (4) and (5) can produce the hydrogenated copolymer (A) and the hydrogenated copolymer (B) at the same time, and can decrease the number of production steps as compared with the case of separately producing the hydrogenated copolymer (A) and the hydrogenated copolymer (B) and can therefore improve production efficiency.

Examples of the polymerization terminator include, but are not particularly limited to, water and alcohols such as methanol, ethanol, isopropanol, 2-ethylhexanol, heptanol, and mixtures thereof.

The hydrogenated copolymer (X) of the present embodiment may be pelletized.

Examples of the pelletization method include: a method of extruding the hydrogenated copolymer (X) into strands from a single- or twin-screw extruder, and cutting the strands in water with a rotary blade installed on the foreside of a die portion (underwater cut); a method of extruding the hydrogenated copolymer into strands from a single- or twin-screw extruder, and water-cooling or air-cooling the strands, followed by cutting with a strand cutter; and a method of melt-kneading the hydrogenated copolymer using an open roll or a Banbury mixer, then molding the melt-kneaded product into sheets using a roll, and further cutting the sheets into strips, followed by cutting into cubic pellets with a pelletizer.

The size or shape of the pellets of the hydrogenated copolymer (X) is not particularly limited.

If necessary, the pellets of the hydrogenated copolymer (X) may be blended with a pellet anti-blocking agent for the purpose of preventing pellet blocking.

Examples of the pellet anti-blocking agent include, but are not limited to, calcium stearate, magnesium stearate, zinc stearate, polyethylene, polypropylene, ethylenebisstearyl-amide, talc, and amorphous silica.

The amount of the pellet anti-blocking agent blended is preferably 500 to 6000 ppm, more preferably 1000 to 5000 ppm, based on the hydrogenated copolymers (X). The pellet anti-blocking agent is preferably blended so as to be attached to pellet surface, and may be contained inside the pellets to some extent.

(Molecular Weight Distribution of Hydrogenated Copolymer (A) or (B))

The molecular weight distribution (Mw/Mn) of the hydrogenated copolymer (A) is preferably 1.01 to 8.0, more preferably 1.01 to 6.0, further preferably 1.01 to 5.0. When the molecular weight distribution falls within the range described above, more favorable molding processability tends to be obtained.

The shape of the molecular weight distribution of the hydrogenated copolymer (A) measured by GPC is not particularly limited and may have a polymodal molecular weight distribution with two or more peaks or may have a monomodal molecular weight distribution with one peak.

The weight-average molecular weight (Mw) and molecular weight distribution [Mw/Mn; ratio of the weight-average molecular weight (Mw) to the number-average molecular weight (Mn)] of the hydrogenated copolymer (A) can be determined by a method described in Examples mentioned later on the basis of the molecular weight of a chromatogram peak in GPC measurement using a calibration curve determined from the measurement of commercially available standard polystyrene (created by using the peak molecular weight of standard polystyrene).

The molecular weight distribution (Mw/Mn) of the hydrogenated copolymer (B) is preferably 1.01 to 8.0, more preferably 1.01 to 6.0, further preferably 1.01 to 5.0. When the molecular weight distribution falls within the range described above, more favorable molding processability tends to be obtained.

The shape of the molecular weight distribution of the hydrogenated copolymer (B) measured by GPC is not particularly limited and may have a polymodal molecular weight distribution with two or more peaks or may have a monomodal molecular weight distribution with one peak.

The weight-average molecular weight (Mw) and molecular weight distribution [Mw/Mn; ratio of the weight-average molecular weight (Mw) to the number-average molecular weight (Mn)] of the hydrogenated copolymer (B) can be determined by a method described in Examples mentioned later on the basis of the molecular weight of a chromatogram peak in GPC measurement using a calibration curve determined from the measurement of commercially available standard polystyrene (created by using the peak molecular weight of standard polystyrene).

[Resin Composition]

The resin composition of the present embodiment comprises the hydrogenated copolymer (X) of the present embodiment, wherein the content of the vinyl aromatic monomer unit in each of the hydrogenated copolymers (A) and (B) is 30 mass % or more and 80 mass % or less, and a thermoplastic resin other than the hydrogenated copolymer (X) and/or a rubber-like polymer other than the hydrogenated copolymer (X).

A resin composition suitable for each molding material can be obtained by combining the hydrogenated copolymer (X) of the present embodiment with a thermoplastic resin other than the hydrogenated copolymer (X) and/or a rubber-like polymer other than the copolymer.

The blending ratio between the hydrogenated copolymer (X) and the thermoplastic resin and/or the rubber-like polymer in the resin composition of the present embodiment is preferably hydrogenated copolymer (X)/(thermoplastic resin and/or rubber-like polymer) mass ratio=1/99 to 99/1, more preferably 2/98 to 90/10, further preferably 5/95 to 80/20.

In the case of mixing the hydrogenated copolymer (X) of the present embodiment with the thermoplastic resin and/or the rubber-like polymer other than the hydrogenated copolymer (X), the obtained resin composition is excellent in impact resistance and molding processability.

Examples of the thermoplastic resin other than the hydrogenated copolymer (X) of the present embodiment for use in the resin composition of the present embodiment include, but are not limited to: polymers of the vinyl aromatic monomer unit described above; copolymer resins of the vinyl aromatic monomer unit described above with other vinyl monomer units (e.g., ethylene, propylene, butylene, vinyl chloride, vinylidene chloride, vinyl acetate, acrylic acid and acrylic acid ester such as methyl acrylate, methacrylic acid and methacrylic acid ester such as methyl methacrylate, acrylonitrile, and methacrylonitrile); rubber-modified styrene resin (HIPS); acrylonitrile-butadiene-styrene copolymer resin (ABS); methacrylic acid ester-butadiene-styrene copolymer resin (MBS); polyethylene; copolymers that consist of ethylene and other copolymerizable monomers and have an ethylene content of 50 mass % or more, such as ethylene-propylene copolymers, ethylene-butylene copolymers, ethylene-hexene copolymers, ethylene-octene copolymers, ethylene-vinyl acetate copolymers and hydrolysates thereof; polyethylene resins such as ethylene-acrylic acid ionomers and chlorinated polyethylene; polypropylene; copolymers that consist of propylene and other copolymerizable monomers and have a propylene content of 50 mass % or more, such as propylene-ethylene copolymers, propylene-ethyl acrylate copolymers, polypropylene resins such as chlorinated polypropylene, cyclic olefin resins such as ethylene-norbornene resin, polybutene resins, polyvinyl chloride resins, polyvinyl acetate resins and hydrolysates thereof; polymers of acrylic acid and its ester or amide; polyacrylate resins; polymers of acrylonitrile and/or methacrylonitrile; nitrile resins which are copolymers that consist of an acrylonitrile monomer and other copolymerizable monomers and have an acrylonitrile monomer content of 50 mass % or more; polyamide resins such as nylon-46, nylon-6, nylon-66, nylon-610, nylon-11, nylon-12, and nylon-6-nylon-12 copolymers; polyester resins; thermoplastic polyurethane resins; polycarbonate polymers such as poly-4,4'-dioxydiphenyl-2,2'-propane carbonate; thermoplastic polysulfone such as polyethersulfone and polyallylsulfone; polyoxymethylene resins; polyphenylene ether resins such as poly(2,6-dimethyl-1,4-phenylene) ether; polyphenylene sulfide resins such as polyphenylene sulfide and poly-4,4'-diphenylene sulfide; polyarylate resins; polyether ketone polymers or copolymers; polyketone resins; fluorine resins; polyoxybenzoyl polymers; polyimide resins; and polybutadiene resins such as 1,2-polybutadiene and trans-polybutadiene.

A polar group-containing atomic group such as a hydroxy group, an epoxy group, an amino group, a carboxylic acid group, or an acid anhydride group may be bonded to these thermoplastic resins.

The number-average molecular weight of the thermoplastic resin for use in the resin composition of the present embodiment is preferably 1,000 or more, more preferably 5,000 to 5,000,000, further preferably 10,000 to 1,000,000.

The number-average molecular weight of the thermoplastic resin can be measured by GPC in the same manner as in the measurement of the molecular weight of the hydrogenated copolymer (X) of the present embodiment described above.

The thermoplastic resin for use in the resin composition of the present embodiment is preferably a polyolefin resin, more preferably a polypropylene resin, from the viewpoint of moldability, lightweight properties, and abrasion resistance.

If necessary, two or more of these thermoplastic resins and/or rubber-like polymers can be used in combination in the resin composition of the present embodiment mentioned above.

In the case of using two or more thereof in combination, two or more thermoplastic resins or two or more rubber-like polymers may be used, or the thermoplastic resin(s) and the rubber-like polymer(s) may be used in combination.

Specifically, the rubber-like polymers may be used in combination in order to enhance the impact resistance of a resin-like composition (i.e., a composition mostly occupied by a resin) or reduce the hardness thereof, and resins may be used in combination in order to enhance the strength or heat resistance of a rubber-like composition (i.e., a composition mostly occupied by a rubber-like polymer).

If necessary, an arbitrary additive may be blended into the hydrogenated copolymer (X) and the resin composition of the present embodiment.

The additive is not particularly limited as long as the additive can generally be blended into thermoplastic resins or rubber-like polymers. Examples thereof include those described in "Compounding Ingredients for Rubbers and Plastics" (edited by Rubber Digest, Japan).

Specific examples of the additive that can be used include: reinforcing fillers or inorganic fillers such as calcium sulfate and barium sulfate; pigments such as carbon black and iron oxide; lubricants such as stearic acid, behenic acid, zinc stearate, calcium stearate, magnesium stearate, and ethylene bis(stearamide); anti-blocking agents such as stearamide, erucamide, oleamide, monoglyceride stearate, stearyl alcohol, petroleum waxes (e.g., microcrystalline wax) and low-molecular-weight vinyl aromatic resins; mold release agents; plasticizers such as organic polysiloxane and mineral oil; antioxidants such as hindered phenol antioxidants and phosphorus heat stabilizers; hindered amine light stabilizers and benzotriazole ultraviolet absorbers; flame retardants; antistatic agents; reinforcing agents such as organic fiber, glass fiber, carbon fiber, and metal whisker; colorants; and mixtures thereof.

(Method for Producing Resin Composition)

The method for producing the resin composition of the present embodiment is not particularly limited, and the resin composition can be produced by a conventional method known in the art.

For example, a melt kneading method using a general mixing machine such as a pressure kneader, a Banbury mixer, an internal mixer, Labo Plastomill, Mix Labo, a single-screw extruder, a twin-screw extruder, a co-kneader, or a multi-screw extruder, or a method of dissolving or dispersing each component, mixing the components, and removing a solvent by heating, is used.

Examples of the shape of the resin composition of the present embodiment can include, but are not particularly limited to, pellets, sheets, strands, and chips.

After melt kneading, a molded article may be prepared directly.

[Molded Article Obtained Using Resin Composition]

The molded article of the present embodiment is a molded article of the resin composition of the present embodiment mentioned above.

The resin composition of the present embodiment can be processed into a practically useful molded article by, for example, but not particularly limited to, extrusion molding, injection molding, two-color injection molding, sandwich molding, hollow molding, compression molding, vacuum molding, rotational molding, powder slush molding, foam molding, lamination molding, calendar molding, or blow molding.

Examples of the molded article of the present embodiment include, but are not particularly limited to, a wide variety of molded articles such as sheets, films, injection-molded articles having various shapes, hollow-molded articles, compressed air-molded articles, vacuum-molded articles, extrusion-molded articles, foam-molded articles, nonwoven fabric or fiber molded articles, and synthetic leather.

Such a molded article can be used in, for example, automobile parts, food packaging materials, medical equipment, home appliance members, electronic device members, building materials, industrial parts, household products, materials for toys and games, materials for footwear, and fiber materials.

Examples of the automobile parts include, but are not limited to, side moldings, grommets, shift knobs, weather strips, reveals and sealing materials therefor, arm rests, assist grips, door grips, door trims, handle grips, console boxes, head rests, instrument panels, bumpers, spoilers, and airbag covers.

Examples of the medical equipment include, but are not limited to, medical tubes, medical hoses, catheters, blood bags, infusion bags, platelet preservation bags, and bags for dialysis.

Examples of the building materials include, but are not limited to, wall materials and floor materials.

Other examples thereof include, but are not particularly limited to, industrial hoses, hoses for foods, cleaner hoses, electric cooling packings, various covering materials for electric wires and others, covering agents for grips, and soft dolls.

Examples of the fiber materials include sound absorbing materials, clothing members, nonwoven fabrics for filters, and hygiene products.

The molded article of the present embodiment may be appropriately processed by foaming, powdering, drawing, adhesion, printing, painting, plating, or the like.

In recent years, autonomous driving or mobility service has received attention as a new direction of automobiles. This trend is producing a change in performance required for automobile interior materials.

For example, autonomous driving is expected to make automobiles more significant as a living space. Hence, the upscaling of interiors or the diversification of interior design is underway in order to create a more comfortable space for people on board. Resin compositions serving as materials for automobile interior materials are thereby required to have more favorable processability that allows finer design to be shaped as well as better texture (lower hardness) and appearance than ever.

From the viewpoint of mobility service, it is considered the long service life and cleanliness of automobiles are required as carsharing becomes widespread. Hence, automobile interior materials are cleaned more times than ever, and resin compositions serving as materials for automobile interior materials need to have higher abrasion resistance.

As described above, in recent years, hydrogenated copolymers serving as materials for resin compositions have been required to have more favorable processability, better texture and appearance, and higher abrasion resistance than those of conventional products as autonomous driving or mobility service has become widespread.

However, in general, processability and texture (low hardness) are physical properties that tend to be exerted by a polymer structure contradicting abrasion resistance.

For example, a hydrogenated copolymer tends to have improved fluidity and increased processability by decreasing the molecular weight of a polymer. On the other hand, its abrasion resistance tends to be reduced.

A hydrogenated copolymer tends to have better texture (lower hardness) by decreasing the content of a vinyl aromatic monomer unit contained therein. On the other hand, its abrasion resistance tends to be reduced.

In light of the change in performance required for automobile interior materials and the challenges of hydrogenated copolymers as mentioned above, the resin composition containing the hydrogenated copolymer (X) of the present embodiment has been conceived with the aims of (1) having favorable processability and also imparting excellent appearance characteristics to a molded product, and (2) exerting high abrasion resistance while having good texture (low hardness).

The resin composition having the hydrogenated copolymer (X) of the present embodiment can be processed by thin-wall molding or the like because of low shear viscosity, and does not cause poor appearance such as flow marks in a molded article. Furthermore, the resin composition has high abrasion resistance, despite low hardness, and can therefore endure long-term use.

[Adhesive Film]

The adhesive film of the present embodiment has a base material layer and an adhesive layer disposed on the base material layer, the adhesive layer comprising the hydrogenated copolymer (X) of the present embodiment. The content of the vinyl aromatic monomer unit in each of the hydrogenated copolymers (A) and (B) constituting the hydrogenated copolymer (X) contained in the adhesive layer is 10 mass % or more and 60 mass % or less from the viewpoint of the balance between adhesion and feedability. The content is preferably 20 to 55 mass %, more preferably 25 to 50 mass %.

The adhesive layer of the adhesive film of the present embodiment may optionally contain an adhesive.

The adhesive is not particularly limited as long as the adhesive is a resin capable of imparting viscosity to the adhesive layer. Examples thereof include adhesives known in the art such as hydrogenated terpene resin, rosin terpene resin, hydrogenated rosin terpene resin, aromatic modified hydrogenated terpene resin, coumarone resin, phenol resin, terpene phenol resin, hydrogenated terpene phenol resin, aromatic hydrocarbon resin, and aliphatic hydrocarbon resin.

Particularly, hydrogenated terpene resin, aromatic modified hydrogenated terpene resin, hydrogenated terpene phenol resin, and terpene phenol resin are preferred.

Only one of these adhesives may be used alone, or two or more types thereof may be mixed for use.

As a specific example, an adhesive described in "Compounding Ingredients for Rubbers and Plastics" (edited by Rubber Digest) can also be used. Use of the adhesive improves adhesion.

The content of the adhesive in the adhesive layer is preferably 0 to 50 mass % in the adhesive layer, and is more preferably 0 to 20 mass %, further preferably 0 to 10 mass %, for effectively preventing increase in adhesive and further reducing the amount of adhesive residues upon peeling. The content is more preferably 5 to 50 mass %, further preferably 10 to 30 mass %, for obtaining moderately low increase in adhesive, moderately reduced adhesive residues, and larger adhesion.

(Base Material Layer)

The material of the base material layer is not particularly limited, and any of nonpolar resins and polar resins can be used.

Preferred examples of the nonpolar resin can include polyethylene, and homo and block polypropylenes, from the viewpoint of performance, price, etc. Preferred examples of the polar resin can include polyester resin such as polyethylene terephthalate and polybutylene terephthalate, polyamide resin, ethylene-vinyl acetate copolymers and hydrolysates thereof.

The thickness of the base material layer is preferably 1 mm or less, more preferably 300 μm or less, further preferably 10 to 200 μm.

When the thickness of the base material layer is 10 μm or more, an adherend can be sufficiently protected. When the thickness of the base material layer is 1 mm or less, a practically favorable elastic modulus is obtained and favorable irregularity following properties are obtained. Thus, raising or peeling can be effectively prevented.

(Adhesive Layer)

The adhesive layer comprises the hydrogenated copolymer (X) of the present embodiment. The adhesive layer may optionally contain an adhesive and may contain an additional hydrogenated copolymer other than the hydrogenated copolymer (X) of the present embodiment.

The thickness of the adhesive layer is preferably 1 to 100 μm, more preferably 2 to 50 μm, further preferably 5 to 25 μm.

When the thickness of the adhesive layer is 1 μm or more, adhesion to an adherend can be sufficiently performed. When the thickness of the adhesive layer is 100 μm or less, a film having a more uniform thickness is obtained and a favorable film having few adhesive residues upon peeling is obtained by effectively preventing increase in adhesive.

(Method for Producing Resin Material Constituting Adhesive Layer of Adhesive Film)

The resin material constituting the adhesive layer of the adhesive film of the present embodiment can be produced by, for example, a method of dry-blending the hydrogenated copolymer (X) and other components to be optionally added, or a method of preparing the resin material with an apparatus that is applied to the mixing of usual polymer substances.

Examples of the mixing apparatus include, but are not particularly limited to, kneading apparatuses such as Banbury mixers, Labo Plastomill, single-screw extruders, and twin-screw extruders. Production with a melt kneading method using an extruder is preferred from the viewpoint of productivity and good kneadability.

Particularly, in the case of blending an adhesive into the material constituting the adhesive layer, the dry blending method described above may be used, or a master batch may be prepared by kneading the adhesive into the hydrogenated copolymer (X) described above in advance because the adhesive has strong stickiness, is in a flake form, and is therefore poorly handleable.

The melting temperature at the time of kneading of the material constituting the adhesive layer can be appropriately set and is usually in the range of 130 to 300° C., preferably in the range of 150 to 250° C.

The adhesive layer comprising the hydrogenated copolymer (X) of the present embodiment contains the low molecular hydrogenated copolymer (A) and is thus capable of effectively achieving high adhesion if the adhesive layer contains no adhesive or a small amount of the adhesive. Therefore, particularly, when the adhesive layer contains no adhesive, all the steps for the adhesive layer containing the adhesive do not have to be performed. When the adhesive layer contains a small amount of the adhesive, the adhesive film can be produced by mere dry blending at the time of adhesive film production. This is advantageous because the production process is simplified and cost can be reduced.

The resin material constituting the adhesive layer constituting the adhesive film of the present embodiment may be subjected to foaming treatment in order to achieve reduction in weight, flexibility and an effect of improving adhesion.

Examples of the foaming treatment method include, but are not limited to, chemical methods, physical methods, and use of thermally expansive microballoons. Air bubbles can be distributed inside the material, for example, by the addition of a chemical foaming agent such as an inorganic foaming agent or an organic foaming agent, a physical foaming agent, or a thermally expansive microballoon. Reduction in weight, flexibility and improvement in adhesion may be achieved by the addition of a hollow filler (already expanded balloon).

(Method for Producing Adhesive Film)

The adhesive film of the present embodiment has a adhesive layer comprising the hydrogenated copolymer (X) on the base material layer.

Examples of the method for producing the adhesive film of the present embodiment include, but are not particularly limited to, a method of coating a predetermined film constituting the base material layer with a solution or a melted product of the resin material constituting the adhesive layer, and a method of laminating the base material layer with the adhesive layer using a film extruder.

In this context, in the case of using a solution or a melted product of the resin material constituting the adhesive layer, a resin composition may be prepared and then prepared into a solution or a melted product, or predetermined materials may be mixed with a solution or a melted product of the hydrogenated copolymer (X) to obtain a resin composition.

Examples of the coating method with a solution of the resin material constituting the adhesive layer include, but are not limited to, a method of dissolving the resin material in a solvent capable of dissolving it, coating a film constituting the base material layer with the solution using a coater or the like, and drying off the solvent by heating.

Examples of the method for melting the resin material constituting the adhesive layer, followed by coating include, but are not limited to, a method of coating a film constituting the base material layer with a melted resin material using a hot melt coater or the like. In this case, various films having a higher glass transition temperature, higher melting point or higher softening point than the coating temperature are preferably used as the base material layer.

Examples of the method for obtaining the adhesive film using a film extruder include, but are not limited to, a production method of creating two flows of adhesive layer components including the resin material, and components (e.g., thermoplastic resin) capable of constituting the base material layer in a melt co-extruder, i.e., combining a fluid for adhesive layer formation and a fluid for base material layer formation in a die opening to form a single fluid, which is then extruded to prepare an adhesive layer combined with a base material layer.

The method for obtaining the adhesive film using a film extruder is a method excellent in productivity because the resin material that forms the adhesive layer can also be produced by dry-blending components for the adhesive layer in advance. The adhesive film prepared by extrusion molding using a film extruder tends to be excellent, particularly, in adhesion and adhesion strength.

The adhesive film of the present embodiment can be used as an anti-scratch or anti-stain protective film at the time of processing, delivery or storage of optical molded articles (e.g., light guide plates and prism sheets), synthetic resin plates, metal plates, decorated plywood, painted steel plates, various nameplates, and the like by temporal attachment to the surface of these adherends.

[Purpose of Hydrogenated Copolymer (X), Resin Composition, or Molded Article]

The hydrogenated copolymer (X) or the resin composition of the present embodiment can be used for various purposes, if necessary, by blending various additives thereinto.

Examples of the purpose of the molded article of the present embodiment include building materials, damping and soundproof materials, electric wire covering materials, high-frequency fusion compositions, slush molding material, adhesive compositions, asphalt compositions, automobile interior materials, automobile exterior materials, medical appliance materials, various containers such as food packaging containers, home appliances, industrial parts, and toys and games.

EXAMPLES

Hereinafter, the present invention will be described in detail with reference to specific Examples and Comparative Examples. However, the present invention is not limited by Examples given below.

First, evaluation methods and methods for measuring physical properties applied to Examples and Comparative Examples will be given below.

[Methods for Identifying Structures of Hydrogenated Copolymer (A) and Hydrogenated Copolymer (B) and Methods for Measuring Physical Properties]

((1) Vinyl aromatic monomer unit contents (RS) in random copolymer structures of hydrogenated copolymer (A) and hydrogenated copolymer (B), and contents (BS) of polymer blocks mainly comprising vinyl aromatic monomer unit)

The following definitions are given.

BS1: a content of the polymer block mainly comprising a vinyl aromatic monomer unit in the hydrogenated copolymer (A)

BS2: a content of the polymer block mainly comprising a vinyl aromatic monomer unit in the hydrogenated copolymer (B)

RS1: vinyl aromatic monomer unit content in the random copolymer structure of the hydrogenated copolymer (A)

RS2: vinyl aromatic monomer unit content in the random copolymer structure of the hydrogenated copolymer (B)

The hydrogenated copolymer (A) and the hydrogenated copolymer (B) were each used as a measurement sample. A vinyl aromatic monomer unit derived from the "polymer block mainly comprising a vinyl aromatic monomer unit" and a vinyl aromatic monomer unit derived from the "random copolymer structure comprising a vinyl aromatic monomer unit and a conjugated diene monomer unit" were discriminated from each other by the proton nuclear magnetic resonance method (1H-NMR, ECS400 manufactured by JEOL RESONANCE Inc.).

Measurement was performed using deuterated chloroform as a solvent under conditions involving a sample concentration of 50 mg/mL, an observation frequency of 400 MHz, tetramethylsilane used as a chemical shift reference, a pulse delay of 2.904 seconds, the number of scans of 256, and a measurement temperature of 23° C.

Random and block styrene contents were calculated from the integrated intensity of signals attributed to aromaticity and the integrated value per $^1$H of each bond. Then, the total styrene content was calculated, and the styrene content (RS1) or (RS2) in the random copolymer structure (hereinafter, referred to as a random styrene content) and the styrene block content (BS1) or (BS2) in the hydrogenated copolymer were calculated. The calculation method is as follows.

Block styrene intensity (*b-St* intensity)=(Integrated value of 6.9 ppm to 6.3 ppm)/2

Random styrene intensity (*r-St* intensity)=(Integrated value of 7.5 ppm to 6.9 ppm)−3×(*b-St*)

Ethylene-butylene intensity (EB intensity)=Total integrated value−3×{(*b-St* intensity)+(*r-St* intensity)}/8

Polystyrene block content (BS)=104×(*b-St* intensity)/ [104×{(*b-St* intensity)+(*r-St* intensity)}+56×(EB intensity)]

Styrene content (RS) in the random copolymer structure=104×(*r-St* intensity)/{104×(*r-St* intensity)+ 56×(EB intensity)}

((2) Number-Average Molecular Weights (Mn) of Hydrogenated Copolymer (A) and Hydrogenated Copolymer (B))

Measurement was performed using GPC [apparatus: Tosoh HLC8220, column: TSKgel SuperH-RC×2].

Tetrahydrofuran was used as a solvent.

Measurement conditions involved a temperature of 35° C. A number-average molecular weight based on polystyrene was determined using a calibration curve prepared using commercially available standard polystyrene having a known number-average molecular weight.

In this context, the number-average molecular weight of the hydrogenated copolymer (A) is referred to as (Mn1), and the number-average molecular weight of the hydrogenated copolymer (B) is referred to as (Mn2).

((3) Contents of Hydrogenated Copolymer (A) and Hydrogenated Copolymer (B) in Hydrogenated Copolymer (X))

Measurement was performed using GPC [apparatus: Tosoh HLC8220, column: TSKgel SuperH-RC×2]. Tetrahydrofuran was used as a solvent.

Measurement conditions involved a temperature of 35° C. The contents of the hydrogenated copolymer (A) and the hydrogenated copolymer (B) contained in the hydrogenated copolymer (X) were calculated from the area ratios of peaks derived from the hydrogenated copolymer (A) and the hydrogenated copolymer (B).

The content of the hydrogenated copolymer (B) is defined as 100−Content of the hydrogenated copolymer (A).

((4) Degrees of Hydrogenation of Double Bonds in Hydrogenated Copolymer (A) and Hydrogenated Copolymer (B))

Hydrogenation rate of each hydrogenated copolymer was measured with a nuclear magnetic resonance apparatus (manufactured by Bruker Corp., DPX-400).

Measurement was performed by proton nuclear magnetic resonance (1H-NMR) using the hydrogenated copolymer serving as a post-hydrogenated copolymer.

Specifically, integrated values of signals derived from residual double bonds at 4.5 to 5.5 ppm and signals derived from hydrogenated conjugated diene were calculated, and the ratio therebetween was calculated.

((5) Degree of Branching (f) of Hydrogenated Copolymer (B))

The degree of branching (f) of the hydrogenated copolymer (B) was measured by the GPC-light scattering measurement method with a viscosity detector.

The hydrogenated copolymer (B) was used as a sample. Measurement was performed using GPC (Malvern Panalytical Ltd., GPCmax VE-2001, column: Tosoh Corp., "TSKgel G4000HXL", "TSKgel G5000HXL", "TSKgel G6000HXL") and using three detectors, i.e., a light scattering detector, a RI detector, and a viscosity detector (trade name "TDA305" manufactured by Malvern Panalytical Ltd.) connected in this order. Based on standard polystyrene, an absolute molecular weight (M) was determined from results obtained using the light scattering detector and the RI detector, and intrinsic viscosity ([η]) was determined from results obtained using the RI detector and the viscosity detector.

Subsequently, reference intrinsic viscosity ([η]$_0$) was calculated according to the following expression.

$$[\eta]_0 = a \times M^b$$

$a = -0.788 + 0.421 \times$(Vinyl aromatic monomer unit content of the hydrogenated copolymer (B))

$$-0.342 \times (\text{RS2}) - 0.197 \times (\text{BS2})$$

$$b = 1.601 - 0.081 \times (\text{Vinyl aromatic monomer unit content of the hydrogenated copolymer } (B)) +$$

$$0.064 \times (\text{RS2}) + 0.039 \times (\text{BS2})$$

RS2: the vinyl aromatic monomer unit content in the random copolymer structure of the hydrogenated copolymer (B)
BS2: the content of the polymer block mainly comprising a vinyl aromatic monomer unit in the hydrogenated copolymer (B) determined by proton nuclear magnetic resonance (1H-NMR)
M: the absolute molecular weight of the hydrogenated copolymer (B)

Subsequently, shrinkage factor g was calculated as the ratio of the intrinsic viscosity ($[\eta]$) of the hydrogenated copolymer (B) to the reference intrinsic viscosity ($[\eta]_0$).

$$\text{Shrinkage factor } (g) = [\eta][\eta]_0$$

Then, the degree of branching (f) defined as $g = f / \{(f+1)(f+2)\} (f \geq 2)$ was calculated using the obtained shrinkage factor (g).

Tetrahydrofuran (hereinafter, also referred to as "THF") containing 5 mmol/L triethylamine was used as a solvent.

100 µL of the measurement solution was injected to the GPC measurement apparatus and measured under conditions involving an oven temperature of 40° C. and a THF flow rate of 1 mL/min.

(Calculation of Block Styrene Molecular Weights (MnS) of Hydrogenated Copolymer (A) and Hydrogenated Copolymer (B))

The block styrene molecular weights (MnS1) and (MnS2) of the hydrogenated copolymer (A) and the hydrogenated copolymer (B) were calculated according to the following expressions using the measurement values (Mn1), (Mn2), (BS1), (BS2), and (f) obtained in the measurements (1) and (2) and (5).

The calculation results were rounded off to the 100, and 500 or less was regarded as 0.

$$\text{MnS1} = \text{Mn1} \times \text{BS1}$$

$$\text{MnS2} = \text{Mn2} \times \text{BS2}/f$$

(Separation of Components (A) and (B) Constituting Hydrogenated Copolymer (X23) and Hydrogenated Copolymer (X31) Given Below)

The hydrogenated copolymer (X23) and the hydrogenated copolymer (X31) were each fractionated into a low-molecular component (A) and a high-molecular component (B) using GPC [apparatus: ACQUITY UPLC H-Class from Waters Corp., column: ACQUITY APC XT900 (2.5 µm, 4.6×150 mm) from Waters Corp., ACQUITY APC XT200 (2.5 µm, 4.6×75 mm) from Waters Corp., ACQUITY APC XT125 (2.5 mm, 4.6×75 mm) from Waters Corp., connected in series].

Chloroform was used as a solvent.

Based on the GPC measurement charts of the hydrogenated copolymer (X23) and the hydrogenated copolymer (X31), the respective components of low-molecular and high-molecular peaks were separated.

[Methods for Measuring Physical Properties and Characteristics of Hydrogenated Copolymer (X)]

((1) Viscoelasticity Measurement (Tan δ Peak) of Hydrogenated Copolymer (X))

Dynamic viscoelastic spectra were measured by the following method, and the peak temperature of loss coefficient tan δ (tan δ peak temperature) was obtained.

First, hydrogenated copolymer (X) was molded into a sheet having a thickness of 2 mm and then cut into a size of 10 mm in width and 35 mm in length to prepare a sample for measurement.

The sample for measurement was loaded in the twist-type geometry of apparatus ARES (manufactured by TA Instruments, Inc., trade name). Measurement was performed under conditions involving an effective measurement length of 25 mm, a strain of 0.5%, a frequency of 1 Hz, a measurement temperature range from –100° C. to 100° C., and a heating rate of 3° C./min.

((2) Hardness of Hydrogenated Copolymer (X))

A value after 10 seconds (10-s hardness) was measured in a durometer type A in accordance with JIS K6253.

A lower value of hardness was determined as offering better texture of a molded article, and the following evaluation was made.

⊚: The value of 10-s hardness was less than 60.
○: The value of 10-s hardness was 60 or more and less than 70.
Δ: The value of 10-s hardness was 70 or more and less than 80.
x: The value of 10-s hardness was 80 or more.

((3) Shear Viscosity of Hydrogenated Copolymer (X))

The shear viscosity of the hydrogenated copolymer (X) was measured by the following method.

30 g of pellets of the hydrogenated copolymer was added to the barrel of Capilograph (Toyo Seiki Seisakusho Co., Ltd., Capilograph 1D PMD-C, barrel diameter=9.55 mm, barrel length=350 mm, orifice diameter=1 mm), and the sample was heated at 180° C. for 5 minutes. Then, the shear viscosity was measured at a measurement temperature of 180° C. at a piston speed of 50 mm/min.

A lower value of shear viscosity was determined as being more preferred from the viewpoint of processability, and evaluation was made according to the following criteria.

⊚: The shear viscosity was less than 300 Pas. ○: The shear viscosity was 300 Pas or more and less than 450 Pas.
Δ: The shear viscosity was 450 Pas or more and less than 600 Pas.
x: The shear viscosity was 600 Pas or more.

((4) Blocking Resistance of Pellet)

Blocking resistance was measured by the following method.

60 g of sample pellets comprising the hydrogenated copolymer (X) and having the same shape (cylindrical shape of approximately 3 mm in diameter×3 mm) was placed in a metal cylinder having a diameter of 5 cm, and a 1160 g weight was put thereon.

In this state, the sample was warmed for 20 hours in a gear oven warmed to 42° C., followed by the observation of the attached state of the pellets in the cylinder.

Specifically, the masses of the pellets taken out of the cylinder collapse (however, the masses do not collapse if blocking resistance is poor). Therefore, the weight of the mass comprising three or more pellets was measured after collapse of the masses, and the ratio (%) of the weight of the pellet mass to the total weight (60 g) of the pellets was determined.

Good or poor blocking resistance was evaluated on the basis of the criteria given below.

The evaluation was conducted after addition of calcium stearate corresponding to 2000 ppm to each pellet sample.

⊚: Less than 5% of the pellet mass comprising three or more pellets
○: 5% or more and less than 30% of the pellet mass comprising three or more pellets Δ: 30% or more and less than 60% of the pellet mass comprising three or more pellets x: 60% or more of the pellet mass comprising three or more pellets

[Production of Hydrogenated Copolymer]

(Preparation of Hydrogenation Catalyst)

The hydrogenation catalyst used in the hydrogenation reaction of a copolymer was prepared by the following method.

To a reaction container purged with nitrogen, 1 L of dried and purified cyclohexane was added, and 100 mmol of bis(cyclopentadienyl)titanium dichloride was added. While the mixture was thoroughly stirred, a n-hexane solution containing 200 mmol of trimethylammonium was added thereto. The resulting mixture was reacted at room temperature for approximately 3 days to obtain a hydrogenation catalyst.

(Hydrogenated Copolymer)

Hydrogenated copolymers (A1) to (A41) in Production Examples 1 to 41, hydrogenated copolymers (B1) to (B22) in Production Examples 42 to 63, a hydrogenated copolymer (X23) in Production Example 64, a hydrogenated copolymer (X61) in Production Example 65, a hydrogenated copolymer (X31) in Production Example 66, hydrogenated copolymers (A42) and (A43) in Production Examples 67 and 68, and hydrogenated copolymers (B23) to (B25) in Production Examples 69 to 71 mentioned later were produced as described below.

Production Example 1: Hydrogenated Copolymer (A1)

Batch polymerization was performed using a vessel-type reactor (internal capacity: 10 L) equipped with a stirring apparatus and a jacket.

First, a cyclohexane solution containing 60 parts by mass of styrene (concentration: 20 mass %), and a cyclohexane solution containing 40 parts by mass of butadiene (concentration: 20 mass %) were added to the reactor.

Next, n-butyllithium at 0.534 parts by mass per 100 parts by mass in total of monomers, and N,N,N',N'-tetramethyl-ethylenediamine at 0.7 mol per mol of n-butyllithium were added thereto, followed by polymerization at 70° C. for 1 hour.

Then, the polymerization reaction was terminated by the addition of methanol.

The copolymer thus obtained had a styrene content of 60 mass %, a random styrene content (RS1) of 60 mass %, a block styrene molecular weight (MnS1) of 0, and a number-average molecular weight (Mn1) of 15000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a hydrogenation rate of 98%.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (A1).

Production Example 2: Hydrogenated Copolymer (A2)

Batch polymerization was performed using a vessel-type reactor (internal capacity: 10 L) equipped with a stirring apparatus and a jacket.

First, a cyclohexane solution containing 35 parts by mass of styrene (concentration: 20 mass %), and a cyclohexane solution containing 65 parts by mass of butadiene (concentration: 20 mass %) were added to the reactor.

Next, n-butyllithium at 0.306 parts by mass per 100 parts by mass in total of monomers, and N,N,N',N'-tetramethyl-ethylenediamine at 0.4 mol per mol of n-butyllithium were added thereto, followed by polymerization at 70° C. for 1 hour.

Then, the polymerization reaction was terminated by the addition of methanol.

The copolymer thus obtained had a styrene content of 35 mass %, a random styrene content (RS1) of 35 mass %, a block styrene molecular weight (MnS1) of 0, and a number-average molecular weight (Mn1) of 30000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a hydrogenation rate of 98%.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (A2).

Production Example 3: Hydrogenated Copolymer (A3)

Batch polymerization was performed using a vessel-type reactor (internal capacity: 10 L) equipped with a stirring apparatus and a jacket.

First, a cyclohexane solution containing 40 parts by mass of styrene (concentration: 20 mass %), and a cyclohexane solution containing 60 parts by mass of butadiene (concentration: 20 mass %) were added to the reactor.

Next, n-butyllithium at 0.299 parts by mass per 100 parts by mass in total of monomers, and N,N,N',N'-tetramethyl-ethylenediamine at 0.5 mol per mol of n-butyllithium were added thereto, followed by polymerization at 70° C. for 1 hour.

Then, the polymerization reaction was terminated by the addition of methanol.

The copolymer thus obtained had a styrene content of 40 mass %, a random styrene content (RS1) of 40 mass %, a block styrene molecular weight (MnS1) of 0, and a number-average molecular weight (Mn1) of 30000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a hydrogenation rate of 98%.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (A3).

Production Example 4: Hydrogenated Copolymer (A4)

Batch polymerization was performed using a vessel-type reactor (internal capacity: 10 L) equipped with a stirring apparatus and a jacket.

First, a cyclohexane solution containing 50 parts by mass of styrene (concentration: 20 mass %), and a cyclohexane solution containing 50 parts by mass of butadiene (concentration: 20 mass %) were added to the reactor.

Next, n-butyllithium at 0.282 parts by mass per 100 parts by mass in total of monomers, and N,N,N',N'-tetramethylethylenediamine at 0.6 mol per mol of n-butyllithium were added thereto, followed by polymerization at 70° C. for 1 hour.

Then, the polymerization reaction was terminated by the addition of methanol.

The copolymer thus obtained had a styrene content of 50 mass %, a random styrene content (RS1) of 50 mass %, a block styrene molecular weight (MnS1) of 0, and a number-average molecular weight (Mn1) of 30000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a hydrogenation rate of 98%.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (A4).

Production Example 5: Hydrogenated Copolymer (A5)

Batch polymerization was performed using a vessel-type reactor (internal capacity: 10 L) equipped with a stirring apparatus and a jacket.

First, a cyclohexane solution containing 70 parts by mass of styrene (concentration: 20 mass %), and a cyclohexane solution containing 30 parts by mass of butadiene (concentration: 20 mass %) were added to the reactor.

Next, n-butyllithium at 0.251 parts by mass per 100 parts by mass in total of monomers, and N,N,N',N'-tetramethylethylenediamine at 0.8 mol per mol of n-butyllithium were added thereto, followed by polymerization at 70° C. for 1 hour.

Then, the polymerization reaction was terminated by the addition of methanol.

The copolymer thus obtained had a styrene content of 70 mass %, a random styrene content (RS1) of 70 mass %, a block styrene molecular weight (MnS1) of 0, and a number-average molecular weight (Mn1) of 30000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a hydrogenation rate of 98%.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (A5).

Production Example 6: Hydrogenated Copolymer (A6)

Batch polymerization was performed using a vessel-type reactor (internal capacity: 10 L) equipped with a stirring apparatus and a jacket.

First, a cyclohexane solution containing 77 parts by mass of styrene (concentration: 20 mass %), and a cyclohexane solution containing 23 parts by mass of butadiene (concentration: 20 mass %) were added to the reactor.

Next, n-butyllithium at 0.240 parts by mass per 100 parts by mass in total of monomers, and N,N,N',N'-tetramethylethylenediamine at 0.9 mol per mol of n-butyllithium were added thereto, followed by polymerization at 70° C. for 1 hour.

Then, the polymerization reaction was terminated by the addition of methanol.

The copolymer thus obtained had a styrene content of 77 mass %, a random styrene content (RS1) of 77 mass %, a block styrene molecular weight (MnS1) of 0, and a number-average molecular weight (Mn1) of 30000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a hydrogenation rate of 98%.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (A6).

Production Example 7: Hydrogenated Copolymer (A7)

Batch polymerization was performed using a vessel-type reactor (internal capacity: 10 L) equipped with a stirring apparatus and a jacket.

First, a cyclohexane solution containing 60 parts by mass of styrene (concentration: 20 mass %), and a cyclohexane solution containing 40 parts by mass of butadiene (concentration: 20 mass %) were added to the reactor.

Next, n-butyllithium at 0.264 parts by mass per 100 parts by mass in total of monomers, and N,N,N',N'-tetramethylethylenediamine at 0.7 mol per mol of n-butyllithium were added thereto, followed by polymerization at 70° C. for 1 hour.

Then, the polymerization reaction was terminated by the addition of methanol.

The copolymer thus obtained had a styrene content of 60 mass %, a random styrene content (RS1) of 60 mass %, a block styrene molecular weight (MnS1) of 0, and a number-average molecular weight (Mn1) of 30000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa. Then, the reaction was terminated when the hydrogenation rate reached 25%.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (A7).

Production Example 8: Hydrogenated Copolymer (A8)

Batch polymerization was performed using a vessel-type reactor (internal capacity: 10 L) equipped with a stirring apparatus and a jacket.

First, a cyclohexane solution containing 60 parts by mass of styrene (concentration: 20 mass %), and a cyclohexane solution containing 40 parts by mass of butadiene (concentration: 20 mass %) were added to the reactor.

Next, n-butyllithium at 0.264 parts by mass per 100 parts by mass in total of monomers, and N,N,N',N'-tetramethylethylenediamine at 0.7 mol per mol of n-butyllithium were added thereto, followed by polymerization at 70° C. for 1 hour.

Then, the polymerization reaction was terminated by the addition of methanol.

The copolymer thus obtained had a styrene content of 60 mass %, a random styrene content (RS1) of 60 mass %, a block styrene molecular weight (MnS1) of 0, and a number-average molecular weight (Mn1) of 30000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa. Then, the reaction was terminated when the hydrogenation rate reached 50%.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (A8).

Production Example 9: Hydrogenated Copolymer (A9)

Batch polymerization was performed using a vessel-type reactor (internal capacity: 10 L) equipped with a stirring apparatus and a jacket.

First, a cyclohexane solution containing 60 parts by mass of styrene (concentration: 20 mass %), and a cyclohexane solution containing 40 parts by mass of butadiene (concentration: 20 mass %) were added to the reactor.

Next, n-butyllithium at 0.264 parts by mass per 100 parts by mass in total of monomers, and N,N,N',N'-tetramethylethylenediamine at 0.7 mol per mol of n-butyllithium were added thereto, followed by polymerization at 70° C. for 1 hour.

Then, the polymerization reaction was terminated by the addition of methanol.

The copolymer thus obtained had a styrene content of 60 mass %, a random styrene content (RS1) of 60 mass %, a block styrene molecular weight (MnS1) of 0, and a number-average molecular weight (Mn1) of 30000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a hydrogenation rate of 98%.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (A9).

Production Example 10: Hydrogenated Copolymer (A10)

Batch polymerization was performed using a vessel-type reactor (internal capacity: 10 L) equipped with a stirring apparatus and a jacket.

First, a cyclohexane solution containing 60 parts by mass of styrene (concentration: 20 mass %), and a cyclohexane solution containing 40 parts by mass of butadiene (concentration: 20 mass %) were added to the reactor.

Next, n-butyllithium at 0.232 parts by mass per 100 parts by mass in total of monomers, and N,N,N',N'-tetramethylethylenediamine at 0.7 mol per mol of n-butyllithium were added thereto, followed by polymerization at 70° C. for 1 hour.

Then, the polymerization reaction was terminated by the addition of methanol.

The copolymer thus obtained had a styrene content of 60 mass %, a random styrene content (RS1) of 60 mass %, a block styrene molecular weight (MnS1) of 0, and a number-average molecular weight (Mn1) of 34000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a hydrogenation rate of 98%.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (A10).

Production Example 11: Hydrogenated Copolymer (A11)

Batch polymerization was performed using a vessel-type reactor (internal capacity: 10 L) equipped with a stirring apparatus and a jacket.

First, a cyclohexane solution containing 60 parts by mass of styrene (concentration: 20 mass %), and a cyclohexane solution containing 40 parts by mass of butadiene (concentration: 20 mass %) were added to the reactor.

Next, n-butyllithium at 1.13 parts by mass per 100 parts by mass in total of monomers, and N,N,N',N'-tetramethylethylenediamine at 0.7 mol per mol of n-butyllithium were added thereto, followed by polymerization at 70° C. for 1 hour.

Then, the polymerization reaction was terminated by the addition of methanol.

The copolymer thus obtained had a styrene content of 60 mass %, a random styrene content (RS1) of 60 mass %, a block styrene molecular weight (MnS1) of 0, and a number-average molecular weight (Mn1) of 7000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a hydrogenation rate of 98%.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (A11).

Production Example 12: Hydrogenated Copolymer (A12)

Batch polymerization was performed using a vessel-type reactor (internal capacity: 10 L) equipped with a stirring apparatus and a jacket.

First, a cyclohexane solution containing 60 parts by mass of styrene (concentration: 20 mass %), and a cyclohexane solution containing 40 parts by mass of butadiene (concentration: 20 mass %) were added to the reactor.

Next, n-butyllithium at 0.608 parts by mass per 100 parts by mass in total of monomers, and N,N,N',N'-tetramethylethylenediamine at 0.7 mol per mol of n-butyllithium were added thereto, followed by polymerization at 70° C. for 1 hour.

Then, the polymerization reaction was terminated by the addition of methanol.

The copolymer thus obtained had a styrene content of 60 mass %, a random styrene content (RS1) of 60 mass %, a block styrene molecular weight (MnS1) of 0, and a number-average molecular weight (Mn1) of 13000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a hydrogenation rate of 98%.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (A12).

Production Example 13: Hydrogenated Copolymer
(A13)

Batch polymerization was performed using a vessel-type reactor (internal capacity: 10 L) equipped with a stirring apparatus and a jacket.

First, a cyclohexane solution containing 60 parts by mass of styrene (concentration: 20 mass %), and a cyclohexane solution containing 40 parts by mass of butadiene (concentration: 20 mass %) were added to the reactor.

Next, n-butyllithium at 0.214 parts by mass per 100 parts by mass in total of monomers, and N,N,N',N'-tetramethylethylenediamine at 0.7 mol per mol of n-butyllithium were added thereto, followed by polymerization at 70° C. for 1 hour.

Then, the polymerization reaction was terminated by the addition of methanol.

The copolymer thus obtained had a styrene content of 60 mass %, a random styrene content (RS1) of 60 mass %, a block styrene molecular weight (MnS1) of 0, and a number-average molecular weight (Mn1) of 37000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a hydrogenation rate of 98%.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (A13).

Production Example 14: Hydrogenated Copolymer
(A14)

Batch polymerization was performed using a vessel-type reactor (internal capacity: 10 L) equipped with a stirring apparatus and a jacket.

First, a cyclohexane solution containing 45 parts by mass of styrene (concentration: 20 mass %), and a cyclohexane solution containing 55 parts by mass of butadiene (concentration: 20 mass %) were added to the reactor.

Next, n-butyllithium at 0.293 parts by mass per 100 parts by mass in total of monomers, and N,N,N',N'-tetramethylethylenediamine at 0.5 mol per mol of n-butyllithium were added thereto, followed by polymerization at 70° C. for 1 hour.

Then, the polymerization reaction was terminated by the addition of methanol.

The copolymer thus obtained had a styrene content of 45 mass %, a random styrene content (RS1) of 45 mass %, a block styrene molecular weight (MnS1) of 0, and a number-average molecular weight (Mn1) of 30000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a hydrogenation rate of 98%.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (A14).

Production Example 15: Hydrogenated Copolymer
(A15)

Batch polymerization was performed using a vessel-type reactor (internal capacity: 10 L) equipped with a stirring apparatus and a jacket.

First, a cyclohexane solution containing 75 parts by mass of styrene (concentration: 20 mass %), and a cyclohexane solution containing 25 parts by mass of butadiene (concentration: 20 mass %) were added to the reactor.

Next, n-butyllithium at 0.243 parts by mass per 100 parts by mass in total of monomers, and N,N,N',N'-tetramethylethylenediamine at 0.9 mol per mol of n-butyllithium were added thereto, followed by polymerization at 70° C. for 1 hour.

Then, the polymerization reaction was terminated by the addition of methanol.

The copolymer thus obtained had a styrene content of 75 mass %, a random styrene content (RS1) of 75 mass %, a block styrene molecular weight (MnS1) of 0, and a number-average molecular weight (Mn1) of 30000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a hydrogenation rate of 98%.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (A15).

Production Example 16: Hydrogenated Copolymer
(A16)

Batch polymerization was performed using a vessel-type reactor (internal capacity: 10 L) equipped with a stirring apparatus and a jacket.

First, a cyclohexane solution containing 60 parts by mass of styrene (concentration: 20 mass %), and a cyclohexane solution containing 40 parts by mass of butadiene (concentration: 20 mass %) were added to the reactor.

Next, n-butyllithium at 1.581 parts by mass per 100 parts by mass in total of monomers, and N,N,N',N'-tetramethylethylenediamine at 0.5 mol per mol of n-butyllithium were added thereto, followed by polymerization at 70° C. for 1 hour.

Then, the polymerization reaction was terminated by the addition of methanol.

The copolymer thus obtained had a styrene content of 60 mass %, a random styrene content (RS1) of 60 mass %, a block styrene molecular weight (MnS1) of 0, and a number-average molecular weight (Mn1) of 5000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a hydrogenation rate of 98%.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (A16).

Production Example 17: Hydrogenated Copolymer (A17)

Batch polymerization was performed using a vessel-type reactor (internal capacity: 10 L) equipped with a stirring apparatus and a jacket.

First, cyclohexane containing 40 parts by mass of styrene (concentration: 20 mass %) was added to the reactor.

Next, n-butyllithium at 0.197 parts by mass per 100 parts by mass in total of monomers, and N,N,N',N'-tetramethylethylenediamine at 0.7 mol per mol of n-butyllithium were added thereto, followed by polymerization at 70° C. for 30 minutes.

Next, a cyclohexane solution containing 36 parts by mass of styrene (concentration: 20 mass %), and a cyclohexane solution containing 24 parts by mass of butadiene (concentration: 20 mass %) were added thereto, followed by polymerization for 40 minutes.

Then, the polymerization reaction was terminated by the addition of methanol.

The copolymer thus obtained had a styrene content of 76 mass %, a random styrene content (RS1) of 60 mass %, a block styrene molecular weight (MnS1) of 15200, and a number-average molecular weight (Mn1) of 37000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a hydrogenation rate of 98%.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (A17).

Production Example 18: Hydrogenated Copolymer (A18)

Batch polymerization was performed using a vessel-type reactor (internal capacity: 10 L) equipped with a stirring apparatus and a jacket.

First, cyclohexane containing 50 parts by mass of styrene (concentration: 20 mass %) was added to the reactor.

Next, n-butyllithium at 0.192 parts by mass per 100 parts by mass in total of monomers, and N,N,N',N'-tetramethylethylenediamine at 0.7 mol per mol of n-butyllithium were added thereto, followed by polymerization at 70° C. for 30 minutes.

Next, a cyclohexane solution containing 30 parts by mass of styrene (concentration: 20 mass %), and a cyclohexane solution containing 20 parts by mass of butadiene (concentration: 20 mass %) were added thereto, followed by polymerization for 40 minutes.

Then, the polymerization reaction was terminated by the addition of methanol.

The copolymer thus obtained had a styrene content of 80 mass %, a random styrene content (RS1) of 60 mass %, a block styrene molecular weight (MnS1) of 19600, and a number-average molecular weight (Mn1) of 37000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a hydrogenation rate of 98%.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (A18).

Production Example 19: Hydrogenated Copolymer (A19)

Batch polymerization was performed using a vessel-type reactor (internal capacity: 10 L) equipped with a stirring apparatus and a jacket.

First, a cyclohexane solution containing 60 parts by mass of styrene (concentration: 20 mass %), and a cyclohexane solution containing 40 parts by mass of butadiene (concentration: 20 mass %) were added to the reactor.

Next, n-butyllithium at 0.175 parts by mass per 100 parts by mass in total of monomers, and N,N,N',N'-tetramethylethylenediamine at 0.7 mol per mol of n-butyllithium were added thereto, followed by polymerization at 70° C. for 1 hour.

Then, the polymerization reaction was terminated by the addition of methanol.

The copolymer thus obtained had a styrene content of 60 mass %, a random styrene content (RS1) of 60 mass %, a block styrene molecular weight (MnS1) of 0, and a number-average molecular weight (Mn1) of 45000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a hydrogenation rate of 98%.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (A19).

Production Example 20: Hydrogenated Copolymer (A20)

Batch polymerization was performed using a vessel-type reactor (internal capacity: 10 L) equipped with a stirring apparatus and a jacket.

First, a cyclohexane solution containing 20 parts by mass of styrene (concentration: 20 mass %), and a cyclohexane solution containing 80 parts by mass of butadiene (concentration: 20 mass %) were added to the reactor.

Next, n-butyllithium at 0.351 parts by mass per 100 parts by mass in total of monomers, and N,N,N',N'-tetramethylethylenediamine at 0.3 mol per mol of n-butyllithium were added thereto, followed by polymerization at 70° C. for 1 hour.

Then, the polymerization reaction was terminated by the addition of methanol.

The copolymer thus obtained had a styrene content of 20 mass %, a random styrene content (RS1) of 20 mass %, a block styrene molecular weight (MnS1) of 0, and a number-average molecular weight (Mn1) of 30000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a hydrogenation rate of 98%.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (A20).

Production Example 21: Hydrogenated Copolymer (A21)

Batch polymerization was performed using a vessel-type reactor (internal capacity: 10 L) equipped with a stirring apparatus and a jacket.

First, a cyclohexane solution containing 85 parts by mass of styrene (concentration: 20 mass %), and a cyclohexane solution containing 15 parts by mass of butadiene (concentration: 20 mass %) were added to the reactor.

Next, n-butyllithium at 0.230 parts by mass per 100 parts by mass in total of monomers, and N,N,N',N'-tetramethylethylenediamine at 0.9 mol per mol of n-butyllithium were added thereto, followed by polymerization at 70° C. for 1 hour.

Then, the polymerization reaction was terminated by the addition of methanol.

The copolymer thus obtained had a styrene content of 85 mass %, a random styrene content (RS1) of 85 mass %, a block styrene molecular weight (MnS1) of 0, and a number-average molecular weight (Mn1) of 30000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a hydrogenation rate of 98%.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (A21).

Production Example 22: Hydrogenated Copolymer (A22)

Batch polymerization was performed using a vessel-type reactor (internal capacity: 10 L) equipped with a stirring apparatus and a jacket.

First, a cyclohexane solution containing 100 parts by mass of butadiene (concentration: 20 mass %) were added to the reactor.

Next, n-butyllithium at 0.412 parts by mass per 100 parts by mass in total of monomers, and N,N,N',N'-tetramethylethylenediamine at 0.2 mol per mol of n-butyllithium were added thereto, followed by polymerization at 70° C. for 1 hour.

Then, the polymerization reaction was terminated by the addition of methanol.

The polymer thus obtained had a styrene content of 0 mass %, a random styrene content (RS1) of 0 mass %, a block styrene molecular weight (MnS1) of 0, and a number-average molecular weight (Mn1) of 30000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a hydrogenation rate of 98%.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (A22).

Production Example 23: Copolymer (A23)

Batch polymerization was performed using a vessel-type reactor (internal capacity: 10 L) equipped with a stirring apparatus and a jacket.

First, a cyclohexane solution containing 60 parts by mass of styrene (concentration: 20 mass %), and a cyclohexane solution containing 40 parts by mass of butadiene (concentration: 20 mass %) were added to the reactor.

Next, n-butyllithium at 0.232 parts by mass per 100 parts by mass in total of monomers, and N,N,N',N'-tetramethylethylenediamine at 0.7 mol per mol of n-butyllithium were added thereto, followed by polymerization at 70° C. for 1 hour.

Then, the polymerization reaction was terminated by the addition of methanol.

The copolymer thus obtained had a styrene content of 60 mass %, a random styrene content (RS1) of 60 mass %, a block styrene molecular weight (MnS1) of 0, and a number-average molecular weight (Mn1) of 34000.

Next, octadecyl-3-(3,5-di-t-butyl-4-hydroxyphenyl)propionate was added as a stabilizer at 0.3 parts by mass per 100 parts by mass of the copolymer to obtain a hydrogenated copolymer (A23).

In this Production Example 23, hydrogenation reaction was not carried out. However, the copolymer (A23) is described in the column of the hydrogenated copolymer (A) in Table 3 for the sake of convenience of description.

Production Example 24: Hydrogenated Copolymer (A24)

Batch polymerization was performed using a vessel-type reactor (internal capacity: 10 L) equipped with a stirring apparatus and a jacket.

First, a cyclohexane solution containing 20 parts by mass of styrene (concentration: 20 mass %) was added to the reactor.

Next, n-butyllithium at 0.508 parts by mass per 100 parts by mass in total of monomers, and N,N,N',N'-tetramethylethylenediamine at 0.7 mol per mol of n-butyllithium were added thereto, followed by polymerization at 70° C. for 15 minutes.

Next, a cyclohexane solution containing 48 parts by mass of styrene (concentration: 20 mass %), and a cyclohexane solution containing 32 parts by mass of butadiene (concentration: 20 mass %) were added thereto, followed by polymerization at 70° C. for 45 minutes.

Then, the polymerization reaction was terminated by the addition of methanol.

The copolymer thus obtained had a styrene content of 68 mass %, a random styrene content (RS1) of 60 mass %, a block styrene molecular weight (MnS1) of 3100, and a number-average molecular weight (Mn1) of 15000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a hydrogenation rate of 98%.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (A24).

Production Example 25: Hydrogenated Copolymer (A25)

Batch polymerization was performed using a vessel-type reactor (internal capacity: 10 L) equipped with a stirring apparatus and a jacket.

First, a cyclohexane solution containing 20 parts by mass of styrene (concentration: 20 mass %) was added to the reactor.

Next, n-butyllithium at 0.285 parts by mass per 100 parts by mass in total of monomers, and N,N,N',N'-tetramethyl-ethylenediamine at 0.4 mol per mol of n-butyllithium were added thereto, followed by polymerization at 70° C. for 15 minutes.

Next, a cyclohexane solution containing 28 parts by mass of styrene (concentration: 20 mass %), and a cyclohexane solution containing 52 parts by mass of butadiene (concentration: 20 mass %) were added thereto, followed by polymerization at 70° C. for 45 minutes.

Then, the polymerization reaction was terminated by the addition of methanol.

The copolymer thus obtained had a styrene content of 48 mass %, a random styrene content (RS1) of 35 mass %, a block styrene molecular weight (MnS1) of 6100, and a number-average molecular weight (Mn1) of 30000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a hydrogenation rate of 98%.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (A25).

Production Example 26: Hydrogenated Copolymer (A26)

Batch polymerization was performed using a vessel-type reactor (internal capacity: 10 L) equipped with a stirring apparatus and a jacket.

First, a cyclohexane solution containing 20 parts by mass of styrene (concentration: 20 mass %) was added to the reactor.

Next, n-butyllithium at 0.214 parts by mass per 100 parts by mass in total of monomers, and N,N,N',N'-tetramethyl-ethylenediamine at 0.5 mol per mol of n-butyllithium were added thereto, followed by polymerization at 70° C. for 15 minutes.

Next, a cyclohexane solution containing 32 parts by mass of styrene (concentration: 20 mass %), and a cyclohexane solution containing 48 parts by mass of butadiene (concentration: 20 mass %) were added thereto, followed by polymerization at 70° C. for 45 minutes.

Then, the polymerization reaction was terminated by the addition of methanol.

The copolymer thus obtained had a styrene content of 52 mass %, a random styrene content (RS1) of 40 mass %, a block styrene molecular weight (MnS1) of 6100, and a number-average molecular weight (Mn1) of 30000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a hydrogenation rate of 98%.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (A26).

Production Example 27: Hydrogenated Copolymer (A27)

Batch polymerization was performed using a vessel-type reactor (internal capacity: 10 L) equipped with a stirring apparatus and a jacket.

First, a cyclohexane solution containing 20 parts by mass of styrene (concentration: 20 mass %) was added to the reactor.

Next, n-butyllithium at 0.278 parts by mass per 100 parts by mass in total of monomers, and N,N,N',N'-tetramethyl-ethylenediamine at 0.6 mol per mol of n-butyllithium were added thereto, followed by polymerization at 70° C. for 15 minutes.

Next, a cyclohexane solution containing 40 parts by mass of styrene (concentration: 20 mass %), and a cyclohexane solution containing 40 parts by mass of butadiene (concentration: 20 mass %) were added thereto, followed by polymerization at 70° C. for 45 minutes.

Then, the polymerization reaction was terminated by the addition of methanol.

The copolymer thus obtained had a styrene content of 60 mass %, a random styrene content (RS1) of 50 mass %, a block st molecular weight (MnS1) of 6100, and a number-average molecular weight (Mn1) of 30000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a hydrogenation rate of 98%.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (A27).

Production Example 28: Hydrogenated Copolymer (A28)

Batch polymerization was performed using a vessel-type reactor (internal capacity: 10 L) equipped with a stirring apparatus and a jacket.

First, a cyclohexane solution containing 20 parts by mass of styrene (concentration: 20 mass %) was added to the reactor.

Next, n-butyllithium at 0.243 parts by mass per 100 parts by mass in total of monomers, and N,N,N',N'-tetramethylethylenediamine at 0.8 mol per mol of n-butyllithium were added thereto, followed by polymerization at 70° C. for 15 minutes.

Next, a cyclohexane solution containing 56 parts by mass of styrene (concentration: 20 mass %), and a cyclohexane solution containing 24 parts by mass of butadiene (concentration: 20 mass %) were added thereto, followed by polymerization at 70° C. for 45 minutes.

Then, the polymerization reaction was terminated by the addition of methanol.

The copolymer thus obtained had a styrene content of 76 mass %, a random styrene content (RS1) of 70 mass %, a block styrene molecular weight (MnS1) of 6200, and a number-average molecular weight (Mn1) of 30000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a hydrogenation rate of 98%.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (A28).

Production Example 29: Hydrogenated Copolymer (A29)

Batch polymerization was performed using a vessel-type reactor (internal capacity: 10 L) equipped with a stirring apparatus and a jacket.

First, a cyclohexane solution containing 20 parts by mass of styrene (concentration: 20 mass %) was added to the reactor.

Next, n-butyllithium at 0.254 parts by mass per 100 parts by mass in total of monomers, and N,N,N',N'-tetramethylethylenediamine at 0.7 mol per mol of n-butyllithium were added thereto, followed by polymerization at 70° C. for 15 minutes.

Next, a cyclohexane solution containing 48 parts by mass of styrene (concentration: 20 mass %), and a cyclohexane solution containing 32 parts by mass of butadiene (concentration: 20 mass %) were added thereto, followed by polymerization at 70° C. for 45 minutes.

Then, the polymerization reaction was terminated by the addition of methanol.

The copolymer thus obtained had a styrene content of 68 mass %, a random styrene content (RS1) of 60 mass %, a block styrene molecular weight (MnS1) of 6100, and a number-average molecular weight (Mn1) of 30000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa. Then, the reaction was terminated when the hydrogenation rate reached 25%.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (A29).

Production Example 30: Hydrogenated Copolymer (A30)

Batch polymerization was performed using a vessel-type reactor (internal capacity: 10 L) equipped with a stirring apparatus and a jacket.

First, a cyclohexane solution containing 20 parts by mass of styrene (concentration: 20 mass %) was added to the reactor.

Next, n-butyllithium at 0.252 parts by mass per 100 parts by mass in total of monomers, and N,N,N',N'-tetramethylethylenediamine at 0.7 mol per mol of n-butyllithium were added thereto, followed by polymerization at 70° C. for 15 minutes.

Next, a cyclohexane solution containing 48 parts by mass of styrene, and a cyclohexane solution containing 32 parts by mass of butadiene (concentration: 20 mass %) were added thereto, followed by polymerization at 70° C. for 45 minutes.

Then, the polymerization reaction was terminated by the addition of methanol.

The copolymer thus obtained had a styrene content of 68 mass %, a random styrene content (RS1) of 60 mass %, a block styrene molecular weight (MnS1) of 6100, and a number-average molecular weight (Mn1) of 30000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa. Then, the reaction was terminated when the hydrogenation rate reached 50%.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (A30).

Production Example 31: Hydrogenated Copolymer (A31)

Batch polymerization was performed using a vessel-type reactor (internal capacity: 10 L) equipped with a stirring apparatus and a jacket.

First, a cyclohexane solution containing 20 parts by mass of styrene (concentration: 20 mass %) was added to the reactor.

Next, n-butyllithium at 0.252 parts by mass per 100 parts by mass in total of monomers, and N,N,N',N'-tetramethylethylenediamine at 0.7 mol per mol of n-butyllithium were added thereto, followed by polymerization at 70° C. for 15 minutes.

Next, a cyclohexane solution containing 48 parts by mass of styrene (concentration: 20 mass %), and a cyclohexane solution containing 32 parts by mass of butadiene (concentration: 20 mass %) were added thereto, followed by polymerization at 70° C. for 45 minutes.

Then, the polymerization reaction was terminated by the addition of methanol.

The copolymer thus obtained had a styrene content of 68 mass %, a random styrene content (RS1) of 60 mass %, a block styrene molecular weight (MnS1) of 6100, and a number-average molecular weight (Mn1) of 30000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a hydrogenation rate of 98%.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (A31).

Production Example 32: Hydrogenated Copolymer (A32)

Batch polymerization was performed using a vessel-type reactor (internal capacity: 10 L) equipped with a stirring apparatus and a jacket.

First, a cyclohexane solution containing 20 parts by mass of styrene (concentration: 20 mass %) was added to the reactor.

Next, n-butyllithium at 0.282 parts by mass per 100 parts by mass in total of monomers, and N,N,N',N'-tetramethylethylenediamine at 0.7 mol per mol of n-butyllithium were added thereto, followed by polymerization at 70° C. for 15 minutes.

Next, a cyclohexane solution containing 48 parts by mass of styrene (concentration: 20 mass %), and a cyclohexane solution containing 32 parts by mass of butadiene (concentration: 20 mass %) were added thereto, followed by polymerization at 70° C. for 45 minutes.

Then, the polymerization reaction was terminated by the addition of methanol.

The copolymer thus obtained had a styrene content of 68 mass %, a random styrene content (RS1) of 60 mass %, a block styrene molecular weight (MnS1) of 5500, and a number-average molecular weight (Mn1) of 27000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a hydrogenation rate of 98%.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (A32).

Production Example 33: Hydrogenated Copolymer (A33)

Batch polymerization was performed using a vessel-type reactor (internal capacity: 10 L) equipped with a stirring apparatus and a jacket.

First, a cyclohexane solution containing 20 parts by mass of styrene (concentration: 20 mass %) was added to the reactor.

Next, n-butyllithium at 1.089 parts by mass per 100 parts by mass in total of monomers, and N,N,N',N'-tetramethylethylenediamine at 0.7 mol per mol of n-butyllithium were added thereto, followed by polymerization at 70° C. for 15 minutes.

Next, a cyclohexane solution containing 48 parts by mass of styrene (concentration: 20 mass %), and a cyclohexane solution containing 32 parts by mass of butadiene (concentration: 20 mass %) were added thereto, followed by polymerization at 70° C. for 45 minutes.

Then, the polymerization reaction was terminated by the addition of methanol.

The copolymer thus obtained had a styrene content of 68 mass %, a random styrene content (RS1) of 60 mass %, a block styrene molecular weight (MnS1) of 1400, and a number-average molecular weight (Mn1) of 7000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a hydrogenation rate of 98%.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (A33).

Production Example 34: Hydrogenated Copolymer (A34)

Batch polymerization was performed using a vessel-type reactor (internal capacity: 10 L) equipped with a stirring apparatus and a jacket.

First, a cyclohexane solution containing 20 parts by mass of styrene (concentration: 20 mass %) was added to the reactor.

Next, n-butyllithium at 0.587 parts by mass per 100 parts by mass in total of monomers, and N,N,N',N'-tetramethylethylenediamine at 0.7 mol per mol of n-butyllithium were added thereto, followed by polymerization at 70° C. for 15 minutes.

Next, a cyclohexane solution containing 48 parts by mass of styrene (concentration: 20 mass %), and a cyclohexane solution containing 32 parts by mass of butadiene (concentration: 20 mass %) were added thereto, followed by polymerization at 70° C. for 45 minutes.

Then, the polymerization reaction was terminated by the addition of methanol.

The copolymer thus obtained had a styrene content of 68 mass %, a random styrene content (RS1) of 60 mass %, a block styrene molecular weight (MnS1) of 2700, and a number-average molecular weight (Mn1) of 13000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a hydrogenation rate of 98%.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (A34).

Production Example 35: Hydrogenated Copolymer (A35)

Batch polymerization was performed using a vessel-type reactor (internal capacity: 10 L) equipped with a stirring apparatus and a jacket.

First, a cyclohexane solution containing 20 parts by mass of styrene (concentration: 20 mass %) was added to the reactor.

Next, n-butyllithium at 0.206 parts by mass per 100 parts by mass in total of monomers, and N,N,N',N'-tetramethylethylenediamine at 0.7 mol per mol of n-butyllithium were added thereto, followed by polymerization at 70° C. for 15 minutes.

Next, a cyclohexane solution containing 48 parts by mass of styrene (concentration: 20 mass %), and a cyclohexane solution containing 32 parts by mass of butadiene (concentration: 20 mass %) were added thereto.

Then, the polymerization reaction was terminated by the addition of methanol.

The copolymer thus obtained had a styrene content of 68 mass %, a random styrene content (RS1) of 60 mass %, a block styrene molecular weight (MnS1) of 7700, and a number-average molecular weight (Mn1) of 37000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a hydrogenation rate of 98%.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (A35).

Production Example 36: Hydrogenated Copolymer (A36)

Batch polymerization was performed using a vessel-type reactor (internal capacity: 10 L) equipped with a stirring apparatus and a jacket.

First, a cyclohexane solution containing 20 parts by mass of styrene (concentration: 20 mass %) was added to the reactor.

Next, n-butyllithium at 0.271 parts by mass per 100 parts by mass in total of monomers, and N,N,N',N'-tetramethylethylenediamine at 0.5 mol per mol of n-butyllithium were added thereto, followed by polymerization at 70° C. for 15 minutes.

A cyclohexane solution containing 36 parts by mass of styrene (concentration: 20 mass %), and a cyclohexane solution containing 44 parts by mass of butadiene (concentration: 20 mass %) were added thereto, followed by polymerization at 70° C. for 45 minutes.

Then, the polymerization reaction was terminated by the addition of methanol.

The copolymer thus obtained had a styrene content of 56 mass %, a random styrene content (RS1) of 45 mass %, a block styrene molecular weight (MnS1) of 6100, and a number-average molecular weight (Mn1) of 30000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a hydrogenation rate of 98%.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (A36).

Production Example 37: Hydrogenated Copolymer (A37)

Batch polymerization was performed using a vessel-type reactor (internal capacity: 10 L) equipped with a stirring apparatus and a jacket.

First, a cyclohexane solution containing 20 parts by mass of styrene (concentration: 20 mass %), and a cyclohexane solution containing 25 parts by mass of butadiene (concentration: 20 mass %) were added to the reactor.

Next, n-butyllithium at 0.238 parts by mass per 100 parts by mass in total of monomers, and N,N,N',N'-tetramethylethylenediamine at 0.9 mol per mol of n-butyllithium were added thereto, followed by polymerization at 70° C. for 15 minutes.

Next, a cyclohexane solution containing 60 parts by mass of styrene (concentration: 20 mass %), and a cyclohexane solution containing 20 parts by mass of butadiene (concentration: 20 mass %) were added thereto, followed by polymerization at 70° C. for 45 minutes.

Then, the polymerization reaction was terminated by the addition of methanol.

The copolymer thus obtained had a styrene content of 80 mass %, a random styrene content (RS1) of 75 mass %, a block styrene molecular weight (MnS1) of 6200, and a number-average molecular weight (Mn1) of 30000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a hydrogenation rate of 98%.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (A37).

Production Example 38: Hydrogenated Copolymer (A38)

Batch polymerization was performed using a vessel-type reactor (internal capacity: 10 L) equipped with a stirring apparatus and a jacket.

First, a cyclohexane solution containing 20 parts by mass of styrene (concentration: 20 mass %), and a cyclohexane solution containing 40 parts by mass of butadiene (concentration: 20 mass %) were added to the reactor.

Next, n-butyllithium at 1.525 parts by mass per 100 parts by mass in total of monomers, and N,N,N',N'-tetramethylethylenediamine at 0.5 mol per mol of n-butyllithium were added thereto, followed by polymerization at 70° C. for 15 minutes.

Next, a cyclohexane solution containing 48 parts by mass of styrene (concentration: 20 mass %), and a cyclohexane solution containing 32 parts by mass of butadiene (concentration: 20 mass %) were added thereto, followed by polymerization at 70° C. for 45 minutes.

Then, the polymerization reaction was terminated by the addition of methanol.

The copolymer thus obtained had a styrene content of 68 mass %, a random styrene content (RS1) of 60 mass %, a block styrene molecular weight (MnS1) of 1000, and a number-average molecular weight (Mn1) of 5000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a hydrogenation rate of 98%.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (A38).

Production Example 39: Hydrogenated Copolymer (A39)

Batch polymerization was performed using a vessel-type reactor (internal capacity: 10 L) equipped with a stirring apparatus and a jacket.

First, a cyclohexane solution containing 20 parts by mass of styrene (concentration: 20 mass %) was added to the reactor.

Next, n-butyllithium at 0.381 parts by mass per 100 parts by mass in total of monomers, and N,N,N',N'-tetramethylethylenediamine at 0.7 mol per mol of n-butyllithium were added thereto, followed by polymerization at 70° C. for 15 minutes.

Next, a cyclohexane solution containing 48 parts by mass of styrene (concentration: 20 mass %), and a cyclohexane solution containing 32 parts by mass of butadiene (concentration: 20 mass %) were added thereto, followed by polymerization at 70° C. for 45 minutes.

Then, the polymerization reaction was terminated by the addition of methanol.

The copolymer thus obtained had a styrene content of 68 mass %, a random styrene content (RS1) of 60 mass %, a block styrene molecular weight (MnS1) of 4100, and a number-average molecular weight (Mn1) of 20000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a hydrogenation rate of 98%.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (A39).

Production Example 40: Hydrogenated Copolymer (A40)

Batch polymerization was performed using a vessel-type reactor (internal capacity: 10 L) equipped with a stirring apparatus and a jacket.

First, a cyclohexane solution containing 60 parts by mass of styrene (concentration: 20 mass %), and a cyclohexane solution containing 40 parts by mass of butadiene (concentration: 20 mass %) were added to the reactor.

Next, n-butyllithium at 0.293 parts by mass per 100 parts by mass in total of monomers, and N,N,N',N'-tetramethylethylenediamine at 0.7 mol per mol of n-butyllithium were added thereto, followed by polymerization at 70° C. for 60 minutes.

Then, the polymerization reaction was terminated by the addition of methanol.

The copolymer thus obtained had a styrene content of 60 mass %, a random styrene content (RS1) of 60 mass %, a block styrene molecular weight (MnS1) of 0, and a number-average molecular weight (Mn1) of 27000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a hydrogenation rate of 98%.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (A40).

Production Example 41: Hydrogenated Copolymer (A41)

Batch polymerization was performed using a vessel-type reactor (internal capacity: 10 L) equipped with a stirring apparatus and a jacket.

First, a cyclohexane solution containing 100 parts by mass of butadiene (concentration: 20 mass %) were added to the reactor.

Next, n-butyllithium at 1.76 parts by mass per 100 parts by mass in total of monomers, and N,N,N',N'-tetramethylethylenediamine at 0.5 mol per mol of n-butyllithium were added thereto, followed by polymerization at 70° C. for 60 minutes.

Then, the polymerization reaction was terminated by the addition of methanol.

The polymer thus obtained had a styrene content of 0 mass %, a random styrene content (RS1) of 0 mass %, a block styrene molecular weight (MnS1) of 0, and a number-average molecular weight (Mn1) of 7000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a hydrogenation rate of 98%.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (A41).

Production Example 42: Hydrogenated Copolymer (B1)

Batch polymerization was performed using a vessel-type reactor (internal capacity: 10 L) equipped with a stirring apparatus and a jacket.

First, a cyclohexane solution containing 10 parts by mass of styrene (concentration: 20 mass %) was added to the reactor.

Next, n-butyllithium at 0.038 parts by mass per 100 parts by mass in total of monomers, and N,N,N',N'-tetramethylethylenediamine at 0.7 mol per mol of n-butyllithium were added thereto, followed by polymerization at 70° C. for 20 minutes.

Next, a cyclohexane solution containing 48 parts by mass of styrene (concentration: 20 mass %), and a cyclohexane solution containing 32 parts by mass of butadiene (concentration: 20 mass %) were added thereto, followed by polymerization at 70° C. for 50 minutes.

Next, a cyclohexane solution containing 10 parts by mass of styrene (concentration: 20 mass %) was added thereto, followed by polymerization at 70° C. for 20 minutes.

Then, the polymerization reaction was terminated by the addition of methanol.

The copolymer thus obtained had a styrene content of 68 mass %, a random styrene content (RS2) of 60 mass %, a degree of branching (f) of 2, a block styrene molecular weight (MnS2) of 21000, and a number-average molecular weight (Mn2) of 200000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a hydrogenation rate of 98%.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (B1).

Production Example 43: Hydrogenated Copolymer (B2)

Batch polymerization was performed using a vessel-type reactor (internal capacity: 10 L) equipped with a stirring apparatus and a jacket.

First, a cyclohexane solution containing 5 parts by mass of styrene (concentration: 20 mass %) was added to the reactor.

Next, n-butyllithium at 0.047 parts by mass per 100 parts by mass in total of monomers, and N,N,N',N'-tetramethylethylenediamine at 0.3 mol per mol of n-butyllithium were added thereto, followed by polymerization at 70° C. for 15 minutes.

Next, a cyclohexane solution containing 25 parts by mass of styrene (concentration: 20 mass %), and a cyclohexane solution containing 65 parts by mass of butadiene (concentration: 20 mass %) were added thereto, followed by polymerization at 70° C. for 50 minutes.

Next, a cyclohexane solution containing 5 parts by mass of styrene (concentration: 20 mass %) was added thereto, followed by polymerization at 70° C. for 15 minutes.

Then, the polymerization reaction was terminated by the addition of methanol.

The copolymer thus obtained had a styrene content of 35 mass %, a random styrene content (RS2) of 28 mass %, a degree of branching (f) of 2, a block styrene molecular weight (MnS2) of 10400, and a number-average molecular weight (Mn2) of 200000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a hydrogenation rate of 98%.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (B2).

Production Example 44: Hydrogenated Copolymer (B3)

Batch polymerization was performed using a vessel-type reactor (internal capacity: 10 L) equipped with a stirring apparatus and a jacket.

First, a cyclohexane solution containing 5 parts by mass of styrene (concentration: 20 mass %) was added to the reactor.

Next, n-butyllithium at 0.044 parts by mass per 100 parts by mass in total of monomers, and N,N,N',N'-tetramethylethylenediamine at 0.5 mol per mol of n-butyllithium were added thereto, followed by polymerization at 70° C. for 15 minutes.

Next, a cyclohexane solution containing 35 parts by mass of styrene (concentration: 20 mass %), and a cyclohexane solution containing 55 parts by mass of butadiene (concentration: 20 mass %) were added thereto, followed by polymerization at 70° C. for 50 minutes.

Next, a cyclohexane solution containing 5 parts by mass of styrene (concentration: 20 mass %) was added thereto, followed by polymerization at 70° C. for 15 minutes.

Then, the polymerization reaction was terminated by the addition of methanol.

The copolymer thus obtained had a styrene content of 45 mass %, a random styrene content (RS2) of 39 mass %, a degree of branching (f) of 2, a block styrene molecular weight (MnS2) of 10600, and a number-average molecular weight (Mn2) of 200000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a hydrogenation rate of 98%.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (B3).

Production Example 45: Hydrogenated Copolymer (B4)

Batch polymerization was performed using a vessel-type reactor (internal capacity: 10 L) equipped with a stirring apparatus and a jacket.

First, a cyclohexane solution containing 5 parts by mass of styrene (concentration: 20 mass %) was added to the reactor.

Next, n-butyllithium at 0.041 parts by mass per 100 parts by mass in total of monomers, and N,N,N',N'-tetramethylethylenediamine at 0.6 mol per mol of n-butyllithium were added thereto, followed by polymerization at 70° C. for 15 minutes.

Next, a cyclohexane solution containing 45 parts by mass of styrene (concentration: 20 mass %), and a cyclohexane solution containing 45 parts by mass of butadiene (concentration: 20 mass %) were added thereto, followed by polymerization at 70° C. for 50 minutes.

Next, a cyclohexane solution containing 5 parts by mass of styrene (concentration: 20 mass %) was added thereto, followed by polymerization at 70° C. for 15 minutes.

Then, the polymerization reaction was terminated by the addition of methanol.

The copolymer thus obtained had a styrene content of 55 mass %, a random styrene content (RS2) of 50 mass %, a degree of branching (f) of 2, a block styrene molecular weight (MnS2) of 10800, and a number-average molecular weight (Mn2) of 200000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a hydrogenation rate of 98%.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (B4).

Production Example 46: Hydrogenated Copolymer (B5)

Batch polymerization was performed using a vessel-type reactor (internal capacity: 10 L) equipped with a stirring apparatus and a jacket.

First, a cyclohexane solution containing 5 parts by mass of styrene (concentration: 20 mass %) was added to the reactor.

Next, n-butyllithium at 0.038 parts by mass per 100 parts by mass in total of monomers, and N,N,N',N'-tetramethylethylenediamine at 0.7 mol per mol of n-butyllithium were added thereto, followed by polymerization at 70° C. for 15 minutes.

Next, a cyclohexane solution containing 60 parts by mass of styrene (concentration: 20 mass %), and a cyclohexane solution containing 30 parts by mass of butadiene (concentration: 20 mass %) were added thereto, followed by polymerization at 70° C. for 50 minutes.

Next, a cyclohexane solution containing 5 parts by mass of styrene (concentration: 20 mass %) was added thereto, followed by polymerization at 70° C. for 15 minutes.

Then, the polymerization reaction was terminated by the addition of methanol.

The copolymer thus obtained had a styrene content of 70 mass %, a random styrene content (RS2) of 67 mass %, a degree of branching (f) of 2, a block styrene molecular weight (MnS2) of 11000, and a number-average molecular weight (Mn2) of 200000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a hydrogenation rate of 98%.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (B5).

Production Example 47: Hydrogenated Copolymer (B6)

Batch polymerization was performed using a vessel-type reactor (internal capacity: 10 L) equipped with a stirring apparatus and a jacket.

First, a cyclohexane solution containing 5 parts by mass of styrene (concentration: 20 mass %) was added to the reactor.

Next, n-butyllithium at 0.036 parts by mass per 100 parts by mass in total of monomers, and N,N,N',N'-tetramethylethylenediamine at 0.9 mol per mol of n-butyllithium were added thereto, followed by polymerization at 70° C. for 15 minutes.

Next, a cyclohexane solution containing 69 parts by mass of styrene (concentration: 20 mass %), and a cyclohexane solution containing 21 parts by mass of butadiene (concentration: 20 mass %) were added thereto, followed by polymerization at 70° C. for 50 minutes.

Next, a cyclohexane solution containing 5 parts by mass of styrene (concentration: 20 mass %) was added thereto, followed by polymerization at 70° C. for 15 minutes.

Then, the polymerization reaction was terminated by the addition of methanol.

The copolymer thus obtained had a styrene content of 79 mass %, a random styrene content (RS2) of 77 mass %, a degree of branching (f) of 2, a block styrene molecular weight (MnS2) of 11300, and a number-average molecular weight (Mn2) of 200000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a hydrogenation rate of 98%.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (B6).

Production Example 48: Hydrogenated Copolymer (B7)

Batch polymerization was performed using a vessel-type reactor (internal capacity: 10 L) equipped with a stirring apparatus and a jacket.

First, a cyclohexane solution containing 10 parts by mass of styrene (concentration: 20 mass %) was added to the reactor.

Next, n-butyllithium at 0.038 parts by mass per 100 parts by mass in total of monomers, and N,N,N',N'-tetramethylethylenediamine at 0.7 mol per mol of n-butyllithium were added thereto, followed by polymerization at 70° C. for 20 minutes.

Next, a cyclohexane solution containing 48 parts by mass of styrene (concentration: 20 mass %), and a cyclohexane solution containing 32 parts by mass of butadiene (concentration: 20 mass %) were added thereto, followed by polymerization at 70° C. for 50 minutes.

Next, a cyclohexane solution containing 10 parts by mass of styrene (concentration: 20 mass %) was added thereto, followed by polymerization at 70° C. for 20 minutes.

Then, the polymerization reaction was terminated by the addition of methanol.

The copolymer thus obtained had a styrene content of 68 mass %, a random styrene content (RS2) of 60 mass %, a degree of branching (f) of 2, a block styrene molecular weight (MnS2) of 21000, and a number-average molecular weight (Mn2) of 200000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa. Then, the reaction was terminated when the hydrogenation rate reached 25%.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (B7).

Production Example 49: Hydrogenated Copolymer (B8)

Batch polymerization was performed using a vessel-type reactor (internal capacity: 10 L) equipped with a stirring apparatus and a jacket.

First, a cyclohexane solution containing 10 parts by mass of styrene (concentration: 20 mass %) was added to the reactor.

Next, n-butyllithium at 0.038 parts by mass per 100 parts by mass in total of monomers, and N,N,N',N'-tetramethyl-ethylenediamine at 0.7 mol per mol of n-butyllithium were added thereto, followed by polymerization at 70° C. for 20 minutes.

Next, a cyclohexane solution containing 48 parts by mass of styrene (concentration: 20 mass %), and a cyclohexane solution containing 32 parts by mass of butadiene (concentration: 20 mass %) were added thereto, followed by polymerization at 70° C. for 50 minutes.

Next, a cyclohexane solution containing 10 parts by mass of styrene (concentration: 20 mass %) was added thereto, followed by polymerization at 70° C. for 20 minutes.

Then, the polymerization reaction was terminated by the addition of methanol.

The copolymer thus obtained had a styrene content of 68 mass %, a random styrene content (RS2) of 60 mass %, a degree of branching (f) of 2, a block styrene molecular weight (MnS2) of 21000, and a number-average molecular weight (Mn2) of 200000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa. Then, the reaction was terminated when the hydrogenation rate reached 50%.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (B8).

Production Example 50: Hydrogenated Copolymer (B9)

Batch polymerization was performed using a vessel-type reactor (internal capacity: 10 L) equipped with a stirring apparatus and a jacket.

First, a cyclohexane solution containing 10 parts by mass of styrene (concentration: 20 mass %) was added to the reactor.

Next, n-butyllithium at 0.055 parts by mass per 100 parts by mass in total of monomers, and N,N,N',N'-tetramethyl-ethylenediamine at 0.7 mol per mol of n-butyllithium were added thereto, followed by polymerization at 70° C. for 20 minutes.

Next, a cyclohexane solution containing 48 parts by mass of styrene (concentration: 20 mass %), and a cyclohexane solution containing 32 parts by mass of butadiene (concentration: 20 mass %) were added thereto, followed by polymerization at 70° C. for 50 minutes.

Next, a cyclohexane solution containing 10 parts by mass of styrene (concentration: 20 mass %) was added thereto, followed by polymerization at 70° C. for 20 minutes.

Then, the polymerization reaction was terminated by the addition of methanol.

The copolymer thus obtained had a styrene content of 68 mass %, a random styrene content (RS2) of 60 mass %, a degree of branching (f) of 2, a block styrene molecular weight (MnS2) of 14700, and a number-average molecular weight (Mn2) of 140000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a hydrogenation rate of 98%.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (B9).

Production Example 51: Hydrogenated Copolymer (B10)

Batch polymerization was performed using a vessel-type reactor (internal capacity: 10 L) equipped with a stirring apparatus and a jacket.

First, a cyclohexane solution containing 20 parts by mass of styrene (concentration: 20 mass %) was added to the reactor.

Next, n-butyllithium at 0.076 parts by mass per 100 parts by mass in total of monomers, and N,N,N',N'-tetramethyl-ethylenediamine at 0.7 mol per mol of n-butyllithium were added thereto, followed by polymerization at 70° C. for 25 minutes.

Next, a cyclohexane solution containing 48 parts by mass of styrene (concentration: 20 mass %), and a cyclohexane solution containing 32 parts by mass of butadiene (concentration: 20 mass %) were added thereto, followed by polymerization at 70° C. for 1 hour.

Further, dimethoxydimethylsilane at 0.25 mol per mol of n-butyllithium was added thereto and reacted at 70° C. for 30 minutes.

Then, the polymerization reaction was terminated by the addition of methanol.

The copolymer thus obtained had a styrene content of 68 mass %, a random styrene content (RS2) of 60 mass %, a degree of branching (f) of 2, a block styrene molecular weight (MnS2) of 21000, and a number-average molecular weight (Mn2) of 150000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a hydrogenation rate of 98%.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (B10).

Production Example 52: Hydrogenated Copolymer (B11)

Batch polymerization was performed using a vessel-type reactor (internal capacity: 10 L) equipped with a stirring apparatus and a jacket.

First, a cyclohexane solution containing 60 parts by mass of styrene (concentration: 20 mass %), and a cyclohexane solution containing 40 parts by mass of butadiene (concentration: 20 mass %) were added to the reactor.

Next, n-butyllithium at 0.009 parts by mass per 100 parts by mass in total of monomers, and N,N,N',N'-tetramethyl-ethylenediamine at 0.7 mol per mol of n-butyllithium were added thereto, followed by polymerization at 70° C. for 1.5 hours.

Then, the polymerization reaction was terminated by the addition of methanol.

The copolymer thus obtained had a styrene content of 60 mass %, a random styrene content (RS2) of 60 mass %, a degree of branching (f) of 2, a block styrene molecular weight (MnS2) of 3800, and a number-average molecular weight (Mn2) of 900000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a hydrogenation rate of 98%.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (B11).

Production Example 53: Hydrogenated Copolymer (B12)

Batch polymerization was performed using a vessel-type reactor (internal capacity: 10 L) equipped with a stirring apparatus and a jacket.

First, a cyclohexane solution containing 10 parts by mass of styrene (concentration: 20 mass %) was added to the reactor.

Next, n-butyllithium at 0.037 parts by mass per 100 parts by mass in total of monomers, and N,N,N',N'-tetramethyl-ethylenediamine at 0.7 mol per mol of n-butyllithium were added thereto, followed by polymerization at 70° C. for 20 minutes.

Next, a cyclohexane solution containing 40 parts by mass of butadiene (concentration: 20 mass %) was added thereto, followed by polymerization at 70° C. for 40 minutes.

Next, a cyclohexane solution containing 24 parts by mass of styrene (concentration: 20 mass %), and a cyclohexane solution containing 16 parts by mass of butadiene (concentration: 20 mass %) were added thereto, followed by polymerization at 70° C. for 40 minutes.

Next, a cyclohexane solution containing 10 parts by mass of styrene (concentration: 20 mass %) was added thereto, followed by polymerization at 70° C. for 20 minutes.

Then, the polymerization reaction was terminated by the addition of methanol.

The copolymer thus obtained had a styrene content of 44 mass %, a random styrene content (RS2) of 60 mass %, a degree of branching (f) of 2, a block styrene molecular weight (MnS2) of 24100, and a number-average molecular weight (Mn2) of 240000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a hydrogenation rate of 98%.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (B12).

Production Example 54: Hydrogenated Copolymer (B13)

Batch polymerization was performed using a vessel-type reactor (internal capacity: 10 L) equipped with a stirring apparatus and a jacket.

First, a cyclohexane solution containing 10 parts by mass of styrene (concentration: 20 mass %) was added to the reactor.

Next, n-butyllithium at 0.038 parts by mass per 100 parts by mass in total of monomers, and N,N,N',N'-tetramethyl-ethylenediamine at 0.7 mol per mol of n-butyllithium were added thereto, followed by polymerization at 70° C. for 20 minutes.

Next, a cyclohexane solution containing 42 parts by mass of styrene (concentration: 20 mass %), and a cyclohexane solution containing 28 parts by mass of butadiene (concentration: 20 mass %) were added thereto, followed by polymerization at 70° C. for 50 minutes.

Next, a cyclohexane solution containing 10 parts by mass of styrene (concentration: 20 mass %) was added thereto, followed by polymerization at 70° C. for 20 minutes.

Next, a cyclohexane solution containing 6 parts by mass of styrene (concentration: 20 mass %), and a cyclohexane solution containing 4 parts by mass of butadiene (concentration: 20 mass %) were added thereto, followed by polymerization at 70° C. for 20 minutes.

Then, the polymerization reaction was terminated by the addition of methanol.

The copolymer thus obtained had a styrene content of 68 mass %, a random styrene content (RS2) of 60 mass %, a degree of branching (f) of 2, a block styrene molecular weight (MnS2) of 21000, and a number-average molecular weight (Mn2) of 200000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a hydrogenation rate of 98%.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (B13).

Production Example 55: Hydrogenated Copolymer (B14)

Batch polymerization was performed using a vessel-type reactor (internal capacity: 10 L) equipped with a stirring apparatus and a jacket.

First, a cyclohexane solution containing 10 parts by mass of styrene (concentration: 20 mass %) was added to the reactor.

Next, n-butyllithium at 0.039 parts by mass per 100 parts by mass in total of monomers, and N,N,N',N'-tetramethyl-ethylenediamine at 0.7 mol per mol of n-butyllithium were added thereto, followed by polymerization at 70° C. for 20 minutes.

Next, a cyclohexane solution containing 42 parts by mass of styrene (concentration: 20 mass %), and a cyclohexane solution containing 28 parts by mass of butadiene (concentration: 20 mass %) were added thereto, followed by polymerization at 70° C. for 50 minutes.

Next, a cyclohexane solution containing 10 parts by mass of styrene (concentration: 20 mass %) was added thereto, followed by polymerization at 70° C. for 20 minutes.

Next, a cyclohexane solution containing 10 parts by mass of butadiene (concentration: 20 mass %) were added thereto, followed by polymerization at 70° C. for 20 minutes.

Then, the polymerization reaction was terminated by the addition of methanol.

The copolymer thus obtained had a styrene content of 62 mass %, a random styrene content (RS2) of 60 mass %, a degree of branching (f) of 2, a block styrene molecular weight (MnS2) of 20800, and a number-average molecular weight (Mn2) of 200000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a hydrogenation rate of 98%.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (B14).

Production Example 56: Hydrogenated Copolymer (B15)

Batch polymerization was performed using a vessel-type reactor (internal capacity: 10 L) equipped with a stirring apparatus and a jacket.

First, a cyclohexane solution containing 10 parts by mass of styrene (concentration: 20 mass %) was added to the reactor.

Next, n-butyllithium at 0.039 parts by mass per 100 parts by mass in total of monomers, and N,N,N',N'-tetramethylethylenediamine at 0.7 mol per mol of n-butyllithium were added thereto, followed by polymerization at 70° C. for 20 minutes.

Next, a cyclohexane solution containing 5 parts by mass of butadiene (concentration: 20 mass %) was added thereto, followed by polymerization at 70° C. for 15 minutes.

Next, a cyclohexane solution containing 42 parts by mass of styrene (concentration: 20 mass %), and a cyclohexane solution containing 28 parts by mass of butadiene (concentration: 20 mass %) were added thereto, followed by polymerization at 70° C. for 50 minutes.

Next, a cyclohexane solution containing 5 parts by mass of butadiene (concentration: 20 mass %) was added thereto, followed by polymerization at 70° C. for 15 minutes.

Next, a cyclohexane solution containing 10 parts by mass of styrene (concentration: 20 mass %) was added thereto, followed by polymerization at 70° C. for 20 minutes.

Then, the polymerization reaction was terminated by the addition of methanol.

The copolymer thus obtained had a styrene content of 62 mass %, a random styrene content (RS2) of 60 mass %, a degree of branching (f) of 2, a block styrene molecular weight (MnS2) of 20800, and a number-average molecular weight (Mn2) of 200000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a hydrogenation rate of 98%.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (B15).

Production Example 57: Hydrogenated Copolymer (B16)

Batch polymerization was performed using a vessel-type reactor (internal capacity: 10 L) equipped with a stirring apparatus and a jacket.

First, a cyclohexane solution containing 5 parts by mass of styrene (concentration: 20 mass %) was added to the reactor.

Next, n-butyllithium at 0.05 parts by mass per 100 parts by mass in total of monomers, and N,N,N',N'-tetramethylethylenediamine at 0.3 mol per mol of n-butyllithium were added thereto, followed by polymerization at 70° C. for 15 minutes.

Next, a cyclohexane solution containing 15 parts by mass of styrene (concentration: 20 mass %), and a cyclohexane solution containing 75 parts by mass of butadiene (concentration: 20 mass %) were added thereto, followed by polymerization at 70° C. for 60 minutes.

Next, a cyclohexane solution containing 5 parts by mass of styrene (concentration: 20 mass %) was added thereto, followed by polymerization at 70° C. for 15 minutes.

Then, the polymerization reaction was terminated by the addition of methanol.

The copolymer thus obtained had a styrene content of 25 mass %, a random styrene content (RS2) of 17 mass %, a degree of branching (f) of 2, a block styrene molecular weight (MnS2) of 10200, and a number-average molecular weight (Mn2) of 200000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a hydrogenation rate of 98%.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (B16).

Production Example 58: Hydrogenated Copolymer (B17)

Batch polymerization was performed using a vessel-type reactor (internal capacity: 10 L) equipped with a stirring apparatus and a jacket.

First, a cyclohexane solution containing 15 parts by mass of styrene (concentration: 20 mass %) was added to the reactor.

Next, n-butyllithium at 0.034 parts by mass per 100 parts by mass in total of monomers, and N,N,N',N'-tetramethylethylenediamine at 0.9 mol per mol of n-butyllithium were added thereto, followed by polymerization at 70° C. for 25 minutes.

Next, a cyclohexane solution containing 55 parts by mass of styrene (concentration: 20 mass %), and a cyclohexane solution containing 15 parts by mass of butadiene (concentration: 20 mass %) were added thereto, followed by polymerization at 70° C. for 1 hour.

Next, a cyclohexane solution containing 15 parts by mass of styrene (concentration: 20 mass %) was added thereto, followed by polymerization at 70° C. for 25 minutes.

Then, the polymerization reaction was terminated by the addition of methanol.

The copolymer thus obtained had a styrene content of 85 mass %, a random styrene content (RS2) of 79 mass %, a degree of branching (f) of 2, a block styrene molecular weight (MnS2) of 31500, and a number-average molecular weight (Mn2) of 200000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a hydrogenation rate of 98%.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (B17).

Production Example 59: Hydrogenated Copolymer (B18)

Batch polymerization was performed using a vessel-type reactor (internal capacity: 10 L) equipped with a stirring apparatus and a jacket.

First, a cyclohexane solution containing 15 parts by mass of styrene (concentration: 20 mass %) was added to the reactor.

Next, n-butyllithium at 0.048 parts by mass per 100 parts by mass in total of monomers, and N,N,N',N'-tetramethyl-ethylenediamine at 0.2 mol per mol of n-butyllithium were added thereto, followed by polymerization at 70° C. for 25 minutes.

Next, a cyclohexane solution containing 70 parts by mass of butadiene (concentration: 20 mass %) were added thereto, followed by polymerization at 70° C. for 60 minutes.

Next, a cyclohexane solution containing 15 parts by mass of styrene (concentration: 20 mass %) was added thereto, followed by polymerization at 70° C. for 25 minutes.

Then, the polymerization reaction was terminated by the addition of methanol.

The copolymer thus obtained had a styrene content of 30 mass %, a random styrene content (RS2) of 0 mass %, a degree of branching (f) of 2, a block styrene molecular weight (MnS2) of 30000, and a number-average molecular weight (Mn2) of 200000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a hydrogenation rate of 98%.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (B18).

Production Example 60: Copolymer (B19)

Batch polymerization was performed using a vessel-type reactor (internal capacity: 10 L) equipped with a stirring apparatus and a jacket.

First, a cyclohexane solution containing 10 parts by mass of styrene (concentration: 20 mass %) was added to the reactor.

Next, n-butyllithium at 0.038 parts by mass per 100 parts by mass in total of monomers, and N,N,N',N'-tetramethyl-ethylenediamine at 0.7 mol per mol of n-butyllithium were added thereto, followed by polymerization at 70° C. for 20 minutes.

Next, a cyclohexane solution containing 48 parts by mass of styrene (concentration: 20 mass %), and a cyclohexane solution containing 32 parts by mass of butadiene (concentration: 20 mass %) were added thereto, followed by polymerization at 70° C. for 60 minutes.

Next, a cyclohexane solution containing 10 parts by mass of styrene (concentration: 20 mass %) was added thereto, followed by polymerization at 70° C. for 20 minutes.

Then, the polymerization reaction was terminated by the addition of methanol.

The copolymer thus obtained had a styrene content of 68 mass %, a random styrene content (RS2) of 60 mass %, a degree of branching (f) of 2, a block styrene molecular weight (MnS2) of 21000, and a number-average molecular weight (Mn2) of 200000.

Next, octadecyl-3-(3,5-di-t-butyl-4-hydroxyphenyl)propionate was added as a stabilizer at 0.3 parts by mass per 100 parts by mass of the copolymer to obtain a copolymer (B19).

In this Production Example 60, hydrogenation reaction was not carried out. However, the copolymer (B19) is described in the column of the hydrogenated copolymer (B) in Table 3 for the sake of convenience of description.

Production Example 61: Hydrogenated Copolymer (B20)

Batch polymerization was performed using a vessel-type reactor (internal capacity: 10 L) equipped with a stirring apparatus and a jacket.

First, a cyclohexane solution containing 10 parts by mass of styrene (concentration: 20 mass %) was added to the reactor.

Next, n-butyllithium at 0.061 parts by mass per 100 parts by mass in total of monomers, and N,N,N',N'-tetramethyl-ethylenediamine at 0.7 mol per mol of n-butyllithium were added thereto, followed by polymerization at 70° C. for 20 minutes.

Next, a cyclohexane solution containing 48 parts by mass of styrene (concentration: 20 mass %), and a cyclohexane solution containing 32 parts by mass of butadiene (concentration: 20 mass %) were added thereto, followed by polymerization at 70° C. for 60 minutes.

Next, a cyclohexane solution containing 10 parts by mass of styrene (concentration: 20 mass %) was added thereto, followed by polymerization at 70° C. for 20 minutes.

Then, the polymerization reaction was terminated by the addition of methanol.

The copolymer thus obtained had a styrene content of 68 mass %, a random styrene content (RS2) of 60 mass %, a degree of branching (f) of 2, a block styrene molecular weight (MnS2) of 12800, and a number-average molecular weight (Mn2) of 125000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a hydrogenation rate of 98%.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (B20).

Production Example 62: Hydrogenated Copolymer (B21)

Batch polymerization was performed using a vessel-type reactor (internal capacity: 10 L) equipped with a stirring apparatus and a jacket.

First, a cyclohexane solution containing 10 parts by mass of styrene (concentration: 20 mass %) was added to the reactor.

Next, n-butyllithium at 0.070 parts by mass per 100 parts by mass in total of monomers, and N,N,N',N'-tetramethyl-ethylenediamine at 0.7 mol per mol of n-butyllithium were added thereto, followed by polymerization at 70° C. for 20 minutes.

Next, a cyclohexane solution containing 80 parts by mass of butadiene (concentration: 20 mass %) were added thereto, followed by polymerization at 70° C. for 60 minutes.

Next, a cyclohexane solution containing 10 parts by mass of styrene (concentration: 20 mass %) was added thereto, followed by polymerization at 70° C. for 20 minutes.

Then, the polymerization reaction was terminated by the addition of methanol.

The copolymer thus obtained had a styrene content of 20 mass %, a random styrene content (RS2) of 0 mass %, a degree of branching (f) of 2, a block styrene molecular weight (MnS2) of 15000, and a number-average molecular weight (Mn2) of 150000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a hydrogenation rate of 98%.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (B21).

Production Example 63: Hydrogenated Copolymer (B22)

Batch polymerization was performed using a vessel-type reactor (internal capacity: 10 L) equipped with a stirring apparatus and a jacket.

First, a cyclohexane solution containing 10 parts by mass of styrene (concentration: 20 mass %) was added to the reactor.

Next, n-butyllithium at 0.070 parts by mass per 100 parts by mass in total of monomers, and N,N,N',N'-tetramethyl-ethylenediamine at 0.7 mol per mol of n-butyllithium were added thereto, followed by polymerization at 70° C. for 20 minutes.

Next, a cyclohexane solution containing 48 parts by mass of styrene (concentration: 20 mass %), and a cyclohexane solution containing 32 parts by mass of butadiene (concentration: 20 mass %) were added thereto, followed by polymerization at 70° C. for 50 minutes.

Next, a cyclohexane solution containing 10 parts by mass of styrene (concentration: 20 mass %) was added thereto, followed by polymerization at 70° C. for 20 minutes.

Then, the polymerization reaction was terminated by the addition of methanol.

The copolymer thus obtained had a styrene content of 68 mass %, a random styrene content (RS2) of 60 mass %, a degree of branching (f) of 2, a block styrene molecular weight (MnS2) of 11500, and a number-average molecular weight (Mn2) of 110000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a hydrogenation rate of 98%.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (B22).

Production Example 64: Hydrogenated Copolymer (X23)

Batch polymerization was performed using a vessel-type reactor (internal capacity: 10 L) equipped with a stirring apparatus and a jacket.

First, a cyclohexane solution containing 6 parts by mass of styrene (concentration: 20 mass %) was added to the reactor.

Next, n-butyllithium at 0.023 parts by mass per 100 parts by mass in total of monomers, and N,N,N',N'-tetramethyl-ethylenediamine at 0.7 mol per mol of n-butyllithium were added thereto, followed by polymerization at 70° C. for 20 minutes.

Next, a cyclohexane solution containing 25 parts by mass of styrene (concentration: 20 mass %), and a cyclohexane solution containing 17 parts by mass of butadiene (concentration: 20 mass %) were added thereto, followed by polymerization at 70° C. for 40 minutes.

Next, a cyclohexane solution containing 6 parts by mass of styrene (concentration: 20 mass %) was added thereto, followed by polymerization at 70° C. for 20 minutes.

Next, n-butyllithium at 0.158 parts by mass per 100 parts by mass in total of monomers was added thereto. Then, a cyclohexane solution containing 28 parts by mass of styrene (concentration: 20 mass %), and a cyclohexane solution containing 18 parts by mass of butadiene (concentration: 20 mass %) were added thereto, followed by polymerization at 70° C. for 30 minutes.

Then, the polymerization reaction was terminated by the addition of methanol.

The copolymer thus obtained was fractionated into a low-molecular component (hydrogenated copolymer (A)) and a high-molecular component (hydrogenated copolymer (B)) by chromatography, and these components were each analyzed. As a result, the hydrogenated copolymer (A) had a styrene content of 60 mass %, a random styrene content (RS1) of 60 mass %, a block styrene molecular weight (MnS1) of 100, and a number-average molecular weight (Mn1) of 20000, and the hydrogenated copolymer (B) had a styrene content of 68 mass %, a random styrene content (RS2) of 60 mass %, a block styrene molecular weight (MnS2) of 21000, and a number-average molecular weight (Mn2) of 200000.

The ratio (A)/(B) between the contents of the hydrogenated copolymer (A) and the hydrogenated copolymer (B) was =40/60.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a hydrogenation rate of 98%.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (X23).

Production Example 65: Hydrogenated Copolymer
(X61)

Batch polymerization was performed using a vessel-type reactor (internal capacity: 10 L) equipped with a stirring apparatus and a jacket.

First, a cyclohexane solution containing 20 parts by mass of styrene (concentration: 20 mass %) was added to the reactor.

Next, n-butyllithium at 0.085 parts by mass per 100 parts by mass in total of monomers, and N,N,N',N'-tetramethylethylenediamine at 0.7 mol per mol of n-butyllithium were added thereto, followed by polymerization at 70° C. for 20 minutes.

Next, a cyclohexane solution containing 48 parts by mass of styrene (concentration: 20 mass %), and a cyclohexane solution containing 32 parts by mass of butadiene (concentration: 20 mass %) were added thereto, followed by polymerization at 70° C. for 60 minutes.

Further, 1,3-di{di(3-trimethoxysilylpropyl) amino}propane at 0.08 mol per mol of n-butyllithium was added thereto and reacted at 70° C. for 30 minutes.

Then, the polymerization reaction was terminated by the addition of methanol.

The copolymer thus obtained was fractionated into a low-molecular component (hydrogenated copolymer (A)) and a high-molecular component (hydrogenated copolymer (B)) by chromatography, and these components were each analyzed. As a result, the hydrogenated copolymer (A) had a styrene content of 68 mass %, a random styrene content (RS1) of 60 mass %, a block styrene molecular weight (MnS1) of 5100, and a number-average molecular weight (Mn2) of 25000, and the hydrogenated copolymer (B) had a degree of branching (f) of 8, a styrene content of 68 mass %, a random styrene content (RS2) of 60 mass %, a block styrene molecular weight (MnS2) of 5100, and a number-average molecular weight (Mn2) of 200000.

The ratio (A)/(B) between the contents of the hydrogenated copolymer (A) and the hydrogenated copolymer (B) was =40/60.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a hydrogenation rate of 98%.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (X61).

Production Example 66: Hydrogenated Copolymer
(X31)

Batch polymerization was performed using a vessel-type reactor (internal capacity: 10 L) equipped with a stirring apparatus and a jacket.

First, a cyclohexane solution containing 20 parts by mass of styrene (concentration: 20 mass %) was added to the reactor.

Next, n-butyllithium at 0.305 parts by mass per 100 parts by mass in total of monomers, and N,N,N',N'-tetramethylethylenediamine at 0.7 mol per mol of n-butyllithium were added thereto, followed by polymerization at 70° C. for 20 minutes.

Next, a cyclohexane solution containing 48 parts by mass of styrene (concentration: 20 mass %), and a cyclohexane solution containing 32 parts by mass of butadiene (concentration: 20 mass %) were added thereto, followed by polymerization at 70° C. for 60 minutes.

Further, tetraethoxysilane at 0.20 mol per mol of n-butyllithium was added thereto and reacted at 70° C. for 30 minutes.

Then, the polymerization reaction was terminated by the addition of methanol.

The copolymer thus obtained was fractionated into a low-molecular component (hydrogenated copolymer (A)) and a high-molecular component (hydrogenated copolymer (B)) by chromatography, and these components were each analyzed. As a result, the hydrogenated copolymer (A) had a styrene content of 68 mass %, a random styrene content (RS1) of 60 mass %, a block styrene molecular weight (MnS1) of 19300, and a number-average molecular weight (Mn2) of 90000, and the hydrogenated copolymer (B) had a degree of branching (f) of 3, a styrene content of 68 mass %, a random styrene content (RS2) of 60 mass %, a block styrene molecular weight (MnS2) of 19300, and a number-average molecular weight (Mn2) of 270000.

The ratio (A)/(B) between the contents of the hydrogenated copolymer (A) and the hydrogenated copolymer (B) was =50/50.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a hydrogenation rate of 98%.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (X31).

Production Example 67: Hydrogenated Copolymer
(A42)

Batch polymerization was performed using a vessel-type reactor (internal capacity: 10 L) equipped with a stirring apparatus and a jacket.

First, a cyclohexane solution containing 30 parts by mass of styrene (concentration: 20 mass %) was added to the reactor.

Next, n-butyllithium at 0.493 parts by mass per 100 parts by mass in total of monomers, and N,N,N',N'-tetramethylethylenediamine at 0.5 mol per mol of n-butyllithium were added thereto, followed by polymerization at 70° C. for 15 minutes.

Next, a cyclohexane solution containing 30 parts by mass of styrene (concentration: 20 mass %), and a cyclohexane solution containing 40 parts by mass of butadiene (concentration: 20 mass %) were added thereto, followed by polymerization at 70° C. for 45 minutes.

Then, the polymerization reaction was terminated by the addition of methanol.

The copolymer thus obtained had a styrene content of 60 mass %, a random styrene content (RS1) of 43 mass %, a block styrene molecular weight (MnS1) of 4800, and a number-average molecular weight (Mn1) of 16000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a hydrogenation rate of 98%.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (A42).

Production Example 68: Hydrogenated Copolymer (A43)

Batch polymerization was performed using a vessel-type reactor (internal capacity: 10 L) equipped with a stirring apparatus and a jacket.

First, a cyclohexane solution containing 10 parts by mass of styrene (concentration: 20 mass %) was added to the reactor.

Next, n-butyllithium at 0.375 parts by mass per 100 parts by mass in total of monomers, and N,N,N',N'-tetramethylethylenediamine at 0.2 mol per mol of n-butyllithium were added thereto, followed by polymerization at 70° C. for 10 minutes.

Next, a cyclohexane solution containing 70 parts by mass of butadiene (concentration: 20 mass %) was added thereto, followed by polymerization at 70° C. for 60 minutes.

Next, a cyclohexane solution containing 5 parts by mass of styrene (concentration: 20 mass %), and a cyclohexane solution containing 15 parts by mass of butadiene (concentration: 20 mass %) were added thereto, followed by polymerization at 70° C. for 20 minutes.

Then, the polymerization reaction was terminated by the addition of methanol.

The copolymer thus obtained had a styrene content of 15 mass %, a random styrene content (RS1) of 25 mass %, a block styrene molecular weight (MnS1) of 0, and a number-average molecular weight (Mn1) of 30000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a hydrogenation rate of 98%.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (A43).

Production Example 69: Hydrogenated Copolymer (B23)

Batch polymerization was performed using a vessel-type reactor (internal capacity: 10 L) equipped with a stirring apparatus and a jacket.

First, a cyclohexane solution containing 5 parts by mass of styrene (concentration: 20 mass %) was added to the reactor.

Next, n-butyllithium at 0.052 parts by mass per 100 parts by mass in total of monomers, and N,N,N',N'-tetramethylethylenediamine at 0.3 mol per mol of n-butyllithium were added thereto, followed by polymerization at 70° C. for 10 minutes.

Next, a cyclohexane solution containing 10 parts by mass of styrene (concentration: 20 mass %), and a cyclohexane solution containing 80 parts by mass of butadiene (concentration: 20 mass %) were added thereto, followed by polymerization at 70° C. for 50 minutes.

Next, a cyclohexane solution containing 5 parts by mass of styrene (concentration: 20 mass %) was added thereto, followed by polymerization at 70° C. for 10 minutes.

Then, the polymerization reaction was terminated by the addition of methanol.

The copolymer thus obtained had a styrene content of 20 mass %, a random styrene content (RS2) of 11 mass %, a degree of branching (f) of 2, a block styrene molecular weight (MnS2) of 10000, and a number-average molecular weight (Mn2) of 200000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a hydrogenation rate of 98%.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (B23).

Production Example 70: Hydrogenated Copolymer (B24)

Batch polymerization was performed using a vessel-type reactor (internal capacity: 10 L) equipped with a stirring apparatus and a jacket.

First, a cyclohexane solution containing 7.5 parts by mass of styrene (concentration: 20 mass %) was added to the reactor.

Next, n-butyllithium at 0.063 parts by mass per 100 parts by mass in total of monomers, and N,N,N',N'-tetramethylethylenediamine at 1.3 mol per mol of n-butyllithium were added thereto, followed by polymerization at 70° C. for 30 minutes.

Next, a cyclohexane solution containing 20 parts by mass of styrene (concentration: 20 mass %), and a cyclohexane solution containing 65 parts by mass of butadiene (concentration: 20 mass %) were added thereto, followed by polymerization at 70° C. for 60 minutes.

Next, a cyclohexane solution containing 7.5 parts by mass of styrene (concentration: 20 mass %) was added thereto, followed by polymerization at 70° C. for 30 minutes.

Then, the polymerization reaction was terminated by the addition of methanol.

The copolymer thus obtained had a styrene content of 35 mass %, a random styrene content (RS2) of 24 mass %, a degree of branching (f) of 2, a block styrene molecular weight (MnS2) of 11300, and a number-average molecular weight (Mn2) of 150000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a hydrogenation rate of 98%.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (B24).

Production Example 71: Hydrogenated Copolymer
(B25)

Batch polymerization was performed using a vessel-type reactor (internal capacity: 10 L) equipped with a stirring apparatus and a jacket.

First, a cyclohexane solution containing 7.5 parts by mass of styrene (concentration: 20 mass %) was added to the reactor.

Next, n-butyllithium at 0.057 parts by mass per 100 parts by mass in total of monomers, and N,N,N',N'-tetramethyl-ethylenediamine at 0.5 mol per mol of n-butyllithium were added thereto, followed by polymerization at 70° C. for 10 minutes.

Next, a cyclohexane solution containing 35 parts by mass of styrene (concentration: 20 mass %), and a cyclohexane solution containing 50 parts by mass of butadiene (concentration: 20 mass %) were added thereto, followed by polymerization at 70° C. for 50 minutes.

Next, a cyclohexane solution containing 7.5 parts by mass of styrene (concentration: 20 mass %) was added thereto, followed by polymerization at 70° C. for 10 minutes.

Then, the polymerization reaction was terminated by the addition of methanol.

The copolymer thus obtained had a styrene content of 50 mass %, a random styrene content (RS2) of 41 mass %, a degree of branching (f) of 2, a block styrene molecular weight (MnS2) of 11300, and a number-average molecular weight (Mn2) of 150000.

To the obtained copolymer, the hydrogenation catalyst prepared as described above was added at 100 ppm based on Ti per 100 parts by mass of the copolymer. Hydrogenation reaction was performed at a temperature of 80° C. at a hydrogen pressure of 0.7 MPa.

The obtained hydrogenated copolymer had a hydrogenation rate of 98%.

Next, octadecyl-3-(3,5-di-t-butyl-4-hydroxyphenyl)propionate was added as a stabilizer at 0.3 parts by mass per 100 parts by mass of the hydrogenated copolymer to obtain a hydrogenated copolymer (B25).

[Production of Hydrogenated Copolymer (X)]

The hydrogenated copolymers (X1) to (X22), (X24), (X26) to (X60), and (X62) to (X74) were produced by mixing the hydrogenated copolymers (A1) to (A17) and (A19) to (A43) with the hydrogenated copolymers (B1) to (B25) in a solution state according to Tables 1 to 3, removing the solvent, and shaping the resultant into pellets.

The hydrogenated copolymer (X25) was produced by removing the solvent from each of the hydrogenated copolymer (A18) and the hydrogenated copolymer (B13), and mixing the resultants using an extruder.

The hydrogenated copolymers (X23), (X31), and (X61) were produced in [Production Example 64], [Production Example 66], and [Production Example 65] described above.

The amount of the hydrogenated copolymer (A) blended (parts by mass) in Tables 1 to 3 is a value per 100 parts by mass of the hydrogenated copolymer (X).

[Production of Polypropylene Resin Composition]

Polypropylene resin composition pellets of 80 parts by mass of the hydrogenated copolymer (X) and 20 parts by mass of polypropylene were obtained by melt kneading using a twin-screw extruder ("TEX-30a11" manufactured by The Japan Steel Works, LTD., cylinder aperture: 30 mm) at a set temperature of 220° C.

A molded article of the polypropylene resin composition (thickness: 2.0 mm, with leather grain) was obtained by molding at an injection molding temperature of 220° C. and a mold temperature of 40° C.

The polypropylene resin used was PM801A (PP/manufactured by SunAllomer Ltd.; MFR=15).

The hydrogenated copolymer (X) used was each of the hydrogenated copolymers (X1) to (X63) described above.

[Methods for Measuring Physical Properties of Polypropylene Resin Composition]

((1) Moldability Evaluation)

The polypropylene resin composition of the hydrogenated copolymer (X) was molded into a flat plate (150 mm long, 100 mm wide, 2 mm thick) at an injection molding temperature of 220° C. and a mold temperature of 40° C., and evaluated for its moldability.

The moldability was evaluated as the mold releasability of the polypropylene resin composition of the hydrogenated copolymer (X) in injection molding and the appearance characteristics (sink marks, the presence or absence of flow marks, and shine) of the injection-molded product. The evaluation criteria will be given below.

o: Practically no problem.

Δ: A slight sink mark, flow mark, and/or shine occurred.

x: Mold releasability was markedly poor, and/or a marked problem arose in the appearance characteristics of the injection-molded product.

((2) Abrasion Resistance Evaluation)

[Abrasion Resistance (10000 Times)]

Molded article surface (leather grain processed surface) was frictioned with fiction cotton Kanakin No. 3 cotton under a load of 500 g using Gakushin-Type friction tester (manufactured by Tester Sangyo Co., Ltd., model AB-301), and the amount of decrease in mass of the sample molded article was then measured.

A smaller amount of decrease in mass was determined as indicating higher abrasion resistance of the polypropylene resin composition. Evaluation was made according to the following criteria.

⊚: The amount of decrease in mass was less than 0.015 g after 10000 times of friction.

o: The amount of decrease in mass was 0.015 g or more and less than 0.03 g after 10000 times of friction.

Δ: The amount of decrease in mass was 0.03 g or more and less than 0.05 g after 10000 times of friction.

x: The amount of decrease in mass was 0.05 g or more after 10000 times of friction.

[Abrasion Resistance (Transfer to Cloth after 2500 Times)]

Transfer to cloth may occur in a molded article for abrasive cloth during an abrasion test. Smaller transfer to cloth was determined as indicating higher abrasion resistance of the polypropylene resin composition. The transfer to cloth was evaluated for the molded article contact surface of the abrasive cloth according to the following criteria.

o: The transfer to cloth occurred in less than 10% of the area after 2500 times of friction.

Δ: The transfer to cloth occurred in 10% or more and less than 50% of the area after 2500 times of friction.

x: The transfer to cloth occurred in 50% or more of the area after 2500 times of friction.

[Abrasion Resistance (Change in Gloss after 1000 Times)]

Shine or tear may occur in molded article surface after an abrasion test. Less shine or tear was determined as indicating higher abrasion resistance of the polypropylene resin composition. Change in the molded article surface after the abrasion test was evaluated according to the following criteria.

⊚: No change occurred in the molded article surface after 1000 times of friction.

○: A slight abrasion mark (shine) occurred in the molded article surface after 1000 times of friction.

Δ: A clear abrasion mark (shine) occurred in the molded article surface after 1000 times of friction.

x: Tear occurred in the molded article surface after 1000 times of friction.

((3) Tensile Strength)

Measurement was performed at a crosshead speed of 500 mm/min with No. 3 dumbbell in accordance with JIS K6251.

Tensile strength was evaluated according to the following criteria.

◎: The maximum strength in the tensile test was 18 MPa or more.

○: The maximum strength in the tensile test was 16 MPa or more and less than 18 MPa.

Δ: The maximum strength in the tensile test was 14 MPa or more and less than 16 MPa.

x: The maximum strength in the tensile test was less than 14 MPa.

[Results of Evaluating Hydrogenated Copolymer (X)]

Results of evaluating Examples 1 to 51 (hydrogenated copolymers (X1) to (X62)), Comparative Examples 1 to 4, Reference Example 5, and Comparative Examples 6 to 12 (hydrogenated copolymers (X28) to (X38) and (X63)) are summarized in the tables given below.

Evaluation criteria abided by the methods for measuring the physical properties and characteristics of the hydrogenated copolymer and the methods for measuring the characteristics of the polypropylene resin composition described above.

TABLE 1

| Hydrogenated copolymer (X) | Hydrogenated copolymer (A) | Hydrogenated copolymer (B) | Amount of hydrogenated copolymer (A) blended (parts by mass) |
|---|---|---|---|
| (X1) | A1 | B1 | 10 |
| (X2) | A1 | B1 | 30 |
| (X3) | A1 | B1 | 50 |
| (X4) | A2 | B2 | 40 |
| (X5) | A3 | B3 | 40 |
| (X6) | A4 | B4 | 40 |
| (X7) | A5 | B5 | 40 |
| (X8) | A6 | B6 | 40 |
| (X9) | A7 | B7 | 40 |
| (X10) | A8 | B8 | 40 |
| (X11) | A9 | B1 | 40 |
| (X12) | A10 | B9 | 40 |
| (X13) | A11 | B1 | 40 |
| (X14) | A12 | B1 | 40 |
| (X15) | A13 | B1 | 40 |
| (X16) | A14 | B1 | 40 |
| (X17) | A4 | B1 | 40 |
| (X18) | A5 | B1 | 40 |
| (X19) | A15 | B1 | 40 |
| (X20) | A1 | B10 | 30 |
| (X21) | A16 | B11 | 40 |
| (X22) | A9 | B12 | 50 |
| (X23) | | | 40 |
| (X24) | A17 | B13 | 40 |
| (X25) | A18 | B13 | 40 |

TABLE 2

| Hydrogenated copolymer (X) | Hydrogenated copolymer (A) | Hydrogenated copolymer (B) | Amount of hydrogenated copolymer (A) blended (parts by mass) |
|---|---|---|---|
| (X26) | A9 | B14 | 40 |
| (X27) | A9 | B15 | 40 |
| (X39) | A24 | B1 | 10 |
| (X40) | A24 | B1 | 30 |
| (X41) | A24 | B1 | 50 |
| (X42) | A25 | B2 | 40 |
| (X43) | A26 | B3 | 40 |
| (X44) | A27 | B4 | 40 |
| (X45) | A28 | B5 | 40 |
| (X46) | A29 | B7 | 40 |
| (X47) | A30 | B8 | 40 |
| (X48) | A31 | B1 | 40 |
| (X49) | A32 | B22 | 40 |
| (X50) | A33 | B1 | 40 |
| (X51) | A34 | B1 | 40 |
| (X52) | A35 | B1 | 40 |
| (X53) | A36 | B1 | 40 |
| (X54) | A27 | B1 | 40 |
| (X55) | A28 | B1 | 40 |
| (X56) | A37 | B1 | 40 |
| (X57) | A24 | B10 | 30 |
| (X58) | A38 | B11 | 40 |
| (X59) | A32 | B12 | 50 |
| (X60) | A39 | B1 | 40 |
| (X61) | | | 20 |
| (X62) | A40 | B22 | 40 |

TABLE 3

| Hydrogenated copolymer (X) | Hydrogenated copolymer (A) | Hydrogenated copolymer (B) | Amount of hydrogenated copolymer (A) blended (parts by mass) |
|---|---|---|---|
| (X28) | — | B1 | 0 |
| (X29) | A11 | B1 | 60 |
| (X30) | A19 | B1 | 40 |
| (X31) | | | 50 |
| (X32) | A20 | B1 | 20 |
| (X33) | A21 | B1 | 20 |
| (X34) | A9 | B16 | 20 |
| (X35) | A9 | B17 | 20 |
| (X36) | A22 | B18 | 40 |
| (X37) | A23 | B19 | 40 |
| (X38) | A10 | B20 | 40 |
| (X63) | A41 | B21 | 50 |
| (X64) | A20 | B24 | 10 |
| (X65) | A2 | B24 | 10 |
| (X66) | A14 | B24 | 20 |
| (X67) | A42 | B24 | 20 |
| (X68) | A14 | B25 | 10 |
| (X69) | A14 | B25 | 20 |
| (X70) | A42 | B25 | 10 |
| (X71) | A42 | B25 | 20 |
| (X72) | A42 | B25 | 30 |
| (X73) | A43 | B25 | 20 |
| (X74) | A27 | B23 | 45 |

TABLE 4

| | | Example 1 | Example 2 | Example 3 | Example 4 | Example 5 |
|---|---|---|---|---|---|---|
| | Polymer No. | X1 | X2 | X3 | X4 | X5 |
| Physical properties of hydrogenated copolymer (A) | Number-average molecular weight (Mn1) | 15000 | 15000 | 15000 | 30000 | 30000 |
| | Styrene content in polymer (mass %) | 60 | 60 | 60 | 35 | 40 |
| | Styrene content (RS1) in random structure (mass %) | 60 | 60 | 60 | 35 | 40 |
| | Block styrene molecular weight (MnS1) | 0 | 0 | 0 | 0 | 0 |
| | Hydrogenation rate of double bond (%) | 98 | 98 | 98 | 98 | 98 |
| Physical properties of hydrogenated copolymer (B) | Number-average molecular weight (Mn2) | 200000 | 200000 | 200000 | 200000 | 200000 |
| | Styrene content in polymer (mass %) | 68 | 68 | 68 | 35 | 45 |
| | Styrene content (RS2) in random structure (mass %) | 60 | 60 | 60 | 28 | 39 |
| | Block styrene molecular weight (MnS2) | 21000 | 21000 | 21000 | 10400 | 10600 |
| | Degree of branching (f) | 2 | 2 | 2 | 2 | 2 |
| | Hydrogenation rate of double bond (%) | 98 | 98 | 98 | 98 | 98 |
| Physical properties of hydrogenated copolymer (X) | Content of hydrogenated copolymer (A) (mass %) | 10 | 30 | 50 | 40 | 40 |
| | Mn1/Mn2 | 0.08 | 0.08 | 0.08 | 0.15 | 0.15 |
| | RS1/RS2 | 1.00 | 1.00 | 1.00 | 1.25 | 1.03 |
| | MnS1/MnS2 | 0.0000 | 0.0000 | 0.0000 | 0.0000 | 0.0000 |
| | Tanδ peak temperature (° C.) | 15 | 15 | 15 | −22 | −10 |
| Characteristics of hydrogenated copolymer (X) | 10-s hardness | Δ | ○ | ◎ | ○ | ○ |
| | Shear viscosity | Δ | ○ | ◎ | Δ | ○ |
| | Pellet blocking resistance | ◎ | ○ | ○ | ○ | ○ |
| Characteristics of resin composition | Moldability | Δ | ○ | Δ | Δ | ○ |
| | Tensile strength | ◎ | ○ | Δ | ○ | ○ |
| | Abrasion resistance (change in gloss after 1000 times) | ○ | Δ | Δ | Δ | Δ |
| | Abrasion resistance (transfer to cloth after 2500 times) | ○ | ○ | Δ | Δ | ○ |
| | Abrasion resistance (10000 times) | ◎ | ◎ | ○ | Δ | ○ |

| | | Example 6 | Example 7 | Example 8 | Example 9 |
|---|---|---|---|---|---|
| | Polymer No. | X6 | X7 | X8 | X9 |
| Physical properties of hydrogenated copolymer (A) | Number-average molecular weight (Mn1) | 30000 | 30000 | 30000 | 30000 |
| | Styrene content in polymer (mass %) | 50 | 70 | 77 | 60 |
| | Styrene content (RS1) in random structure (mass %) | 50 | 70 | 77 | 60 |
| | Block styrene molecular weight (MnS1) | 0 | 0 | 0 | 0 |
| | Hydrogenation rate of double bond (%) | 98 | 98 | 98 | 25 |
| Physical properties of hydrogenated copolymer (B) | Number-average molecular weight (Mn2) | 200000 | 200000 | 200000 | 200000 |
| | Styrene content in polymer (mass %) | 55 | 70 | 79 | 68 |
| | Styrene content (RS2) in random structure (mass %) | 50 | 67 | 77 | 60 |
| | Block styrene molecular weight (MnS2) | 10800 | 11000 | 11300 | 21000 |
| | Degree of branching (f) | 2 | 2 | 2 | 2 |
| | Hydrogenation rate of double bond (%) | 98 | 98 | 98 | 25 |
| Physical properties of hydrogenated copolymer (X) | Content of hydrogenated copolymer (A) (mass %) | 40 | 40 | 40 | 40 |
| | Mn1/Mn2 | 0.15 | 0.15 | 0.15 | 0.15 |
| | RS1/RS2 | 1.00 | 1.04 | 1.00 | 1.00 |
| | MnS1/MnS2 | 0.0000 | 0.0000 | 0.0000 | 0.0000 |
| | Tanδ peak temperature (° C.) | 0 | 35 | 43 | 10 |
| Characteristics of hydrogenated copolymer (X) | 10-s hardness | ◎ | ○ | Δ | ◎ |
| | Shear viscosity | ○ | ○ | ○ | ○ |
| | Pellet blocking resistance | ○ | ◎ | ◎ | Δ |
| Characteristics of resin composition | Moldability | ○ | ○ | Δ | Δ |
| | Tensile strength | ○ | ◎ | ◎ | Δ |
| | Abrasion resistance (change in gloss after 1000 times) | Δ | ○ | ○ | Δ |
| | Abrasion resistance (transfer to cloth after 2500 times) | ○ | ○ | ○ | Δ |
| | Abrasion resistance (10000 times) | ○ | ○ | Δ | Δ |

TABLE 5

| | | Example 10 | Example 11 | Example 12 | Example 13 | Example 14 |
|---|---|---|---|---|---|---|
| | Polymer No. | X10 | X11 | X12 | X13 | X14 |
| Physical properties of hydrogenated copolymer (A) | Number-average molecular weight (Mn1) | 30000 | 30000 | 34000 | 7000 | 13000 |
| | Styrene content in polymer (mass %) | 60 | 60 | 60 | 60 | 60 |
| | Styrene content (RS1) in random structure (mass %) | 60 | 60 | 60 | 60 | 60 |
| | Block styrene molecular weight (MnS1) | 0 | 0 | 0 | 0 | 0 |
| | Hydrogenation rate of double bond (%) | 50 | 98 | 98 | 98 | 98 |
| Physical properties of hydrogenated copolymer (B) | Number-average molecular weight (Mn2) | 200000 | 200000 | 140000 | 200000 | 200000 |
| | Styrene content in polymer (mass %) | 68 | 68 | 68 | 68 | 68 |
| | Styrene content (RS2) in random structure (mass %) | 60 | 60 | 60 | 60 | 60 |
| | Block styrene molecular weight (MnS2) | 21000 | 21000 | 14700 | 21000 | 21000 |
| | Degree of branching (f) | 2 | 2 | 2 | 2 | 2 |
| | Hydrogenation rate of double bond (%) | 50 | 98 | 98 | 98 | 98 |

TABLE 5-continued

| | | | | | | |
|---|---|---|---|---|---|---|
| Physical properties of hydrogenated copolymer (X) | Content of hydrogenated copolymer (A) (mass %) | 40 | 40 | 40 | 40 | 40 |
| | Mn1/Mn2 | 0.15 | 0.15 | 0.24 | 0.04 | 0.07 |
| | RS1/RS2 | 1.00 | 1.00 | 1.00 | 1.00 | 1.00 |
| | MnS1/MnS2 | 0.0000 | 0.0000 | 0.0000 | 0.0000 | 0.0000 |
| | Tanδ peak temperature (° C.) | 13 | 15 | 15 | 15 | 15 |
| Characteristics of hydrogenated copolymer (X) | 10-s hardness | ◎ | ◎ | ◎ | ◎ | ◎ |
| | Shear viscosity | ○ | ○ | ◎ | ◎ | ◎ |
| Characteristics of resin composition | Pellet blocking resistance | ○ | ◎ | Δ | Δ | ○ |
| | Moldability | ○ | ○ | Δ | Δ | ○ |
| | Tensile strength | ○ | ◎ | Δ | Δ | Δ |
| | Abrasion resistance (change in gloss after 1000 times) | Δ | ○ | Δ | Δ | Δ |
| | Abrasion resistance (transfer to cloth after 2500 times) | ○ | ○ | Δ | Δ | ○ |
| | Abrasion resistance (10000 times) | ○ | ◎ | Δ | Δ | ○ |

| | | Example 15 | Example 16 | Example 17 | Example 18 |
|---|---|---|---|---|---|
| | Polymer No. | X15 | X16 | X17 | X18 |
| Physical properties of hydrogenated copolymer (A) | Number-average molecular weight (Mn1) | 37000 | 30000 | 30000 | 30000 |
| | Styrene content in polymer (mass %) | 60 | 45 | 50 | 70 |
| | Styrene content (RS1) in random structure (mass %) | 60 | 45 | 50 | 70 |
| | Block styrene molecular weight (MnS1) | 0 | 0 | 0 | 0 |
| | Hydrogenation rate of double bond (%) | 98 | 98 | 98 | 98 |
| Physical properties of hydrogenated copolymer (B) | Number-average molecular weight (Mn2) | 200000 | 200000 | 200000 | 200000 |
| | Styrene content in polymer (mass %) | 68 | 68 | 68 | 68 |
| | Styrene content (RS2) in random structure (mass %) | 60 | 60 | 60 | 60 |
| | Block styrene molecular weight (MnS2) | 21000 | 21000 | 21000 | 21000 |
| | Degree of branching (f) | 2 | 2 | 2 | 2 |
| | Hydrogenation rate of double bond (%) | 98 | 98 | 98 | 98 |
| Physical properties of hydrogenated copolymer (X) | Content of hydrogenated copolymer (A) (mass %) | 40 | 40 | 40 | 40 |
| | Mn1/Mn2 | 0.19 | 0.15 | 0.15 | 0.15 |
| | RS1/RS2 | 1.00 | 0.75 | 0.83 | 1.17 |
| | MnS1/MnS2 | 0.0000 | 0.0000 | 0.0000 | 0.0000 |
| | Tanδ peak temperature (° C.) | 15 | 5 | 10 | 20 |
| Characteristics of hydrogenated copolymer (X) | 10-s hardness | ○ | ◎ | ◎ | ○ |
| | Shear viscosity | Δ | ○ | ○ | ○ |
| Characteristics of resin composition | Pellet blocking resistance | ◎ | Δ | ○ | ○ |
| | Moldability | Δ | Δ | ○ | ○ |
| | Tensile strength | ◎ | Δ | Δ | ◎ |
| | Abrasion resistance (change in gloss after 1000 times) | Δ | Δ | Δ | Δ |
| | Abrasion resistance (transfer to cloth after 2500 times) | ○ | Δ | ○ | ○ |
| | Abrasion resistance (10000 times) | ○ | Δ | ○ | ○ |

TABLE 6

| | | Example 19 | Example 20 | Example 21 | Example 22 | Example 23 |
|---|---|---|---|---|---|---|
| | Polymer No. | X19 | X20 | X21 | X22 | X23 |
| Physical properties of hydrogenated copolymer (A) | Number-average molecular weight (Mn1) | 30000 | 15000 | 5000 | 30000 | 20000 |
| | Styrene content in polymer (mass %) | 75 | 60 | 60 | 60 | 60 |
| | Styrene content (RS1) in random structure (mass %) | 75 | 60 | 60 | 60 | 60 |
| | Block styrene molecular weight (MnS1) | 0 | 0 | 0 | 0 | 0 |
| | Hydrogenation rate of double bond (%) | 98 | 98 | 98 | 98 | 98 |
| Physical properties of hydrogenated copolymer (B) | Number-average molecular weight (Mn2) | 200000 | 150000 | 900000 | 240000 | 200000 |
| | Styrene content in polymer (mass %) | 68 | 68 | 60 | 44 | 68 |
| | Styrene content (RS2) in random structure (mass %) | 60 | 60 | 60 | 60 | 60 |
| | Block styrene molecular weight (MnS2) | 21000 | 21000 | 3800 | 24100 | 21000 |
| | Degree of branching (f) | 2 | 2 | 2 | 2 | 2 |
| | Hydrogenation rate of double bond (%) | 98 | 98 | 98 | 98 | 98 |
| Physical properties of hydrogenated copolymer (X) | Content of hydrogenated copolymer (A) (mass %) | 40 | 30 | 40 | 50 | 40 |
| | Mn1/Mn2 | 0.15 | 0.10 | 0.01 | 0.13 | 0.10 |
| | RS1/RS2 | 1.25 | 1.00 | 1.00 | 1.00 | 1.00 |
| | MnS1/MnS2 | 0.0000 | 0.0000 | 0.0000 | 0.0000 | 0.0000 |
| | Tanδ peak temperature (° C.) | 27 | 12 | 15 | 15 | 15 |
| Characteristics of hydrogenated copolymer (X) | 10-s hardness | Δ | ◎ | ○ | ◎ | ◎ |
| | Shear viscosity | ○ | ◎ | Δ | ○ | ◎ |
| Characteristics of resin composition | Pellet blocking resistance | Δ | ○ | ○ | ◎ | ○ |
| | Moldability | Δ | ○ | Δ | ○ | ○ |
| | Tensile strength | ◎ | Δ | Δ | ○ | ○ |
| | Abrasion resistance (change in gloss after 1000 times) | ○ | ○ | ○ | ○ | ○ |
| | Abrasion resistance (transfer to cloth after 2500 times) | Δ | Δ | Δ | ○ | ○ |
| | Abrasion resistance (10000 times) | Δ | ○ | Δ | ◎ | ○ |

TABLE 6-continued

| | | Example 24 | Example 25 | Example 26 | Example 27 |
|---|---|---|---|---|---|
| | Polymer No. | X24 | X25 | X26 | X27 |
| Physical properties of hydrogenated copolymer (A) | Number-average molecular weight (Mn1) | 37000 | 37000 | 30000 | 30000 |
| | Styrene content in polymer (mass %) | 76 | 80 | 60 | 60 |
| | Styrene content (RS1) in random structure (mass %) | 60 | 60 | 60 | 60 |
| | Block styrene molecular weight (MnS1) | 15200 | 19600 | 0 | 0 |
| | Hydrogenation rate of double bond (%) | 98 | 98 | 98 | 98 |
| Physical properties of hydrogenated copolymer (B) | Number-average molecular weight (Mn2) | 200000 | 200000 | 200000 | 200000 |
| | Styrene content in polymer (mass %) | 68 | 68 | 62 | 62 |
| | Styrene content (RS2) in random structure (mass %) | 60 | 60 | 60 | 60 |
| | Block styrene molecular weight (MnS2) | 21000 | 21000 | 20800 | 20800 |
| | Degree of branching (f) | 2 | 1 | 2 | 2 |
| | Hydrogenation rate of double bond (%) | 98 | 98 | 98 | 98 |
| Physical properties of hydrogenated copolymer (X) | Content of hydrogenated copolymer (A) (mass %) | 40 | 40 | 40 | 40 |
| | Mn1/Mn2 | 0.19 | 0.19 | 0.15 | 0.15 |
| | RS1/RS2 | 1.00 | 1.00 | 1.00 | 1.00 |
| | MnS1/MnS2 | 0.7238 | 0.9333 | 0.0000 | 0.0000 |
| | Tanδ peak temperature (° C.) | 15 | 15 | 15 | 15 |
| Characteristics of hydrogenated copolymer (X) | 10-s hardness | ○ | △ | ◎ | ○ |
| | Shear viscosity | ○ | ○ | ◎ | ○ |
| | Pellet blocking resistance | ○ | ○ | ○ | ◎ |
| Characteristics of resin composition | Moldability | ○ | ○ | ○ | ○ |
| | Tensile strength | ◎ | ◎ | △ | ◎ |
| | Abrasion resistance (change in gloss after 1000 times) | ◎ | ◎ | ○ | ○ |
| | Abrasion resistance (transfer to cloth after 2500 times) | ○ | ○ | △ | ○ |
| | Abrasion resistance (10000 times) | ◎ | ○ | ○ | ◎ |

TABLE 7

| | | Example 28 | Example 29 | Example 30 | Example 31 | Example 32 |
|---|---|---|---|---|---|---|
| | Polymer No. | X39 | X40 | X41 | X42 | X43 |
| Physical properties of hydrogenated copolymer (A) | Number-average molecular weight (Mn1) | 15000 | 15000 | 15000 | 30000 | 30000 |
| | Styrene content in polymer (mass %) | 68 | 68 | 68 | 48 | 52 |
| | Styrene content (RS1) in random structure (mass %) | 60 | 60 | 60 | 35 | 40 |
| | Block styrene molecular weight (MnS1) | 3100 | 3100 | 3100 | 6100 | 6100 |
| | Hydrogenation rate of double bond (%) | 98 | 98 | 98 | 98 | 98 |
| Physical properties of hydrogenated copolymer (B) | Number-average molecular weight (Mn2) | 200000 | 200000 | 200000 | 200000 | 200000 |
| | Styrene content in polymer (mass %) | 68 | 68 | 68 | 35 | 45 |
| | Styrene content (RS2) in random structure (mass %) | 60 | 60 | 60 | 28 | 39 |
| | Block styrene molecular weight (MnS2) | 21000 | 21000 | 21000 | 10400 | 10600 |
| | Degree of branching (f) | 2 | 2 | 2 | 2 | 2 |
| | Hydrogenation rate of double bond (%) | 98 | 98 | 98 | 98 | 98 |
| Physical properties of hydrogenated copolymer (X) | Content of hydrogenated copolymer (A) (mass %) | 10 | 30 | 50 | 40 | 40 |
| | Mn1/Mn2 | 0.08 | 0.08 | 0.08 | 0.15 | 0.15 |
| | RS1/RS2 | 1.00 | 1.00 | 1.00 | 1.25 | 1.03 |
| | MnS1/MnS2 | 0.1476 | 0.1476 | 0.1476 | 0.5865 | 0.5755 |
| | Tanδ peak temperature (° C.) | 15 | 15 | 15 | −22 | −10 |
| Characteristics of hydrogenated copolymer (X) | 10-s hardness | △ | △ | ○ | △ | △ |
| | Shear viscosity | △ | ○ | ◎ | △ | ○ |
| | Pellet blocking resistance | ◎ | ◎ | ◎ | ◎ | ◎ |
| Characteristics of resin composition | Moldability | ○ | ◎ | ○ | ○ | ◎ |
| | Tensile strength | ◎ | ○ | ○ | ○ | ○ |
| | Abrasion resistance (change in gloss after 1000 times) | ◎ | ◎ | ◎ | ◎ | ◎ |
| | Abrasion resistance (transfer to cloth after 2500 times) | ◎ | ◎ | ◎ | ○ | ◎ |
| | Abrasion resistance (10000 times) | ◎ | ◎ | ◎ | ○ | ◎ |

| | | Example 33 | Example 34 | Example 35 | Example 36 |
|---|---|---|---|---|---|
| | Polymer No. | X44 | X45 | X46 | X47 |
| Physical properties of hydrogenated copolymer (A) | Number-average molecular weight (Mn1) | 30000 | 30000 | 30000 | 30000 |
| | Styrene content in polymer (mass %) | 60 | 76 | 68 | 68 |
| | Styrene content (RS1) in random structure (mass %) | 50 | 70 | 60 | 60 |
| | Block styrene molecular weight (MnS1) | 6100 | 6200 | 6100 | 6100 |
| | Hydrogenation rate of double bond (%) | 98 | 98 | 25 | 50 |
| Physical properties of hydrogenated copolymer (B) | Number-average molecular weight (Mn2) | 200000 | 200000 | 200000 | 200000 |
| | Styrene content in polymer (mass %) | 55 | 70 | 68 | 68 |
| | Styrene content (RS2) in random structure (mass %) | 50 | 67 | 60 | 60 |
| | Block styrene molecular weight (MnS2) | 10800 | 11000 | 21000 | 21000 |
| | Degree of branching (f) | 2 | 2 | 2 | 2 |
| | Hydrogenation rate of double bond (%) | 98 | 98 | 25 | 50 |

TABLE 7-continued

| | | | | | |
|---|---|---|---|---|---|
| Physical properties of hydrogenated copolymer (X) | Content of hydrogenated copolymer (A) (mass %) | 40 | 40 | 40 | 40 |
| | Mn1/Mn2 | 0.15 | 0.15 | 0.15 | 0.15 |
| | RS1/RS2 | 1.00 | 1.04 | 1.00 | 1.00 |
| | MnS1/MnS2 | 0.5648 | 0.5636 | 0.2905 | 0.2905 |
| | Tanδ peak temperature (° C.) | 0 | 35 | 10 | 13 |
| Characteristics of hydrogenated copolymer (X) | 10-s hardness | ○ | Δ | ○ | ○ |
| | Shear viscosity | ○ | ○ | ○ | ○ |
| | Pellet blocking resistance | ◎ | ◎ | ○ | ◎ |
| Characteristics of resin composition | Moldability | ◎ | ◎ | ○ | ◎ |
| | Tensile strength | ○ | ◎ | ○ | ○ |
| | Abrasion resistance (change in gloss after 1000 times) | ◎ | ◎ | ◎ | ◎ |
| | Abrasion resistance (transfer to cloth after 2500 times) | ◎ | ◎ | ○ | ◎ |
| | Abrasion resistance (10000 times) | ◎ | ◎ | ○ | ◎ |

TABLE 8

| | | Example 37 | Example 38 | Example 39 | Example 40 | Example 41 |
|---|---|---|---|---|---|---|
| | Polymer No. | X48 | X49 | X50 | X51 | X52 |
| Physical properties of hydrogenated copolymer (A) | Number-average molecular weight (Mn1) | 30000 | 27000 | 7000 | 13000 | 37000 |
| | Styrene content in polymer (mass %) | 68 | 68 | 68 | 68 | 68 |
| | Styrene content (RS1) in random structure (mass %) | 60 | 60 | 60 | 60 | 60 |
| | Block styrene molecular weight (MnS1) | 6100 | 5500 | 1400 | 2700 | 7700 |
| | Hydrogenation rate of double bond (%) | 98 | 98 | 98 | 98 | 98 |
| Physical properties of hydrogenated copolymer (B) | Number-average molecular weight (Mn2) | 200000 | 110000 | 200000 | 200000 | 200000 |
| | Styrene content in polymer (mass %) | 68 | 68 | 68 | 68 | 68 |
| | Styrene content (RS2) in random structure (mass %) | 60 | 60 | 60 | 60 | 60 |
| | Block styrene molecular weight (MnS2) | 21000 | 11500 | 21000 | 21000 | 21000 |
| | Degree of branching (f) | 2 | 2 | 2 | 2 | 2 |
| | Hydrogenation rate of double bond (%) | 98 | 98 | 98 | 98 | 98 |
| Physical properties of hydrogenated copolymer (X) | Content of hydrogenated copolymer (A) (mass %) | 40 | 40 | 40 | 40 | 40 |
| | Mn1/Mn2 | 0.15 | 0.25 | 0.04 | 0.07 | 0.19 |
| | RS1/RS2 | 1.00 | 1.00 | 1.00 | 1.00 | 1.00 |
| | MnS1/MnS2 | 0.2905 | 0.4783 | 0.0667 | 0.1286 | 0.3667 |
| | Tanδ peak temperature (° C.) | 15 | 15 | 15 | 15 | 15 |
| Characteristics of hydrogenated copolymer (X) | 10-s hardness | ○ | ○ | ◎ | ◎ | Δ |
| | Shear viscosity | ○ | ◎ | ◎ | ◎ | Δ |
| | Pellet blocking resistance | ◎ | ◎ | ○ | ◎ | ◎ |
| Characteristics of resin composition | Moldability | ◎ | ○ | ○ | ◎ | ○ |
| | Tensile strength | ◎ | ○ | ○ | ○ | ◎ |
| | Abrasion resistance (change in gloss after 1000 times) | ◎ | ◎ | ◎ | ◎ | ◎ |
| | Abrasion resistance (transfer to cloth after 2500 times) | ◎ | ○ | ○ | ◎ | ◎ |
| | Abrasion resistance (10000 times) | ◎ | ○ | ○ | ◎ | ◎ |

| | | Example 42 | Example 43 | Example 44 | Example 45 |
|---|---|---|---|---|---|
| | Polymer No. | X53 | X54 | X55 | X56 |
| Physical properties of hydrogenated copolymer (A) | Number-average molecular weight (Mn1) | 30000 | 30000 | 30000 | 30000 |
| | Styrene content in polymer (mass %) | 56 | 60 | 76 | 80 |
| | Styrene content (RS1) in random structure (mass %) | 45 | 50 | 70 | 75 |
| | Block styrene molecular weight (MnS1) | 6100 | 6100 | 6200 | 6200 |
| | Hydrogenation rate of double bond (%) | 98 | 98 | 98 | 98 |
| Physical properties of hydrogenated copolymer (B) | Number-average molecular weight (Mn2) | 200000 | 200000 | 200000 | 200000 |
| | Styrene content in polymer (mass %) | 68 | 68 | 68 | 68 |
| | Styrene content (RS2) in random structure (mass %) | 60 | 60 | 60 | 60 |
| | Block styrene molecular weight (MnS2) | 21000 | 21000 | 21000 | 21000 |
| | Degree of branching (f) | 2 | 2 | 2 | 2 |
| | Hydrogenation rate of double bond (%) | 98 | 98 | 98 | 98 |
| Physical properties of hydrogenated copolymer (X) | Content of hydrogenated copolymer (A) (mass %) | 40 | 40 | 40 | 40 |
| | Mn1/Mn2 | 0.15 | 0.15 | 0.15 | 0.15 |
| | RS1/RS2 | 0.75 | 0.83 | 1.17 | 1.25 |
| | MnS1/MnS2 | 0.2905 | 0.2905 | 0.2952 | 0.2952 |
| | Tanδ peak temperature (° C.) | 5 | 10 | 20 | 27 |
| Characteristics of hydrogenated copolymer (X) | 10-s hardness | ○ | ○ | Δ | Δ |
| | Shear viscosity | ○ | ○ | ○ | ○ |
| | Pellet blocking resistance | ○ | ◎ | ◎ | ○ |
| Characteristics of resin composition | Moldability | ○ | ◎ | ◎ | ○ |
| | Tensile strength | ○ | ○ | ◎ | ◎ |
| | Abrasion resistance (change in gloss after 1000 times) | ◎ | ◎ | ◎ | ◎ |
| | Abrasion resistance (transfer to cloth after 2500 times) | ○ | ◎ | ◎ | ○ |
| | Abrasion resistance (10000 times) | ○ | ◎ | ◎ | ○ |

TABLE 9

|  |  | Example 46 | Example 47 | Example 48 |
|---|---|---|---|---|
|  | Polymer No. | X57 | X58 | X59 |
| Physical properties of hydrogenated copolymer (A) | Number-average molecular weight (Mn1) | 15000 | 5000 | 30000 |
|  | Styrene content in polymer (mass %) | 68 | 68 | 68 |
|  | Styrene content (RS1) in random structure (mass %) | 60 | 60 | 60 |
|  | Block styrene molecular weight (MnS1) | 3100 | 1000 | 6100 |
|  | Hydrogenation rate of double bond (%) | 98 | 98 | 98 |
| Physical properties of hydrogenated copolymer (B) | Number-average molecular weight (Mn2) | 150000 | 900000 | 240000 |
|  | Styrene content in polymer (mass %) | 68 | 60 | 44 |
|  | Styrene content (RS2) in random structure (mass %) | 60 | 60 | 60 |
|  | Block styrene molecular weight (MnS2) | 21000 | 3800 | 24100 |
|  | Degree of branching (f) | 2 | 2 | 2 |
|  | Hydrogenation rate of double bond (%) | 98 | 98 | 98 |
| Physical properties of hydrogenated copolymer (X) | Content of hydrogenated copolymer (A) (mass %) | 30 | 40 | 50 |
|  | Mn1/Mn2 | 0.10 | 0.01 | 0.13 |
|  | RS1/RS2 | 1.00 | 1.00 | 1.00 |
|  | MnS1/MnS2 | 0.1476 | 0.2632 | 0.2531 |
|  | Tanδ peak temperature (° C.) | 12 | 15 | 15 |
| Characteristics of hydrogenated copolymer (X) | 10-s hardness | ◎ | Δ | ○ |
|  | Shear viscosity | ◎ | Δ | ○ |
|  | Pellet blocking resistance | ◎ | ◎ | ◎ |
| Characteristics of resin composition | Moldability | ◎ | ○ | ◎ |
|  | Tensile strength | ○ | Δ | ○ |
|  | Abrasion resistance (change in gloss after 1000 times) | ◎ | ◎ | ◎ |
|  | Abrasion resistance (transfer to cloth after 2500 times) | ◎ | ○ | ◎ |
|  | Abrasion resistance (10000 times) | ◎ | ○ | ◎ |

|  |  | Example 49 | Example 50 | Example 51 |
|---|---|---|---|---|
|  | Polymer No. | X60 | X61 | X62 |
| Physical properties of hydrogenated copolymer (A) | Number-average molecular weight (Mn1) | 20000 | 25000 | 27000 |
|  | Styrene content in polymer (mass %) | 68 | 68 | 60 |
|  | Styrene content (RS1) in random structure (mass %) | 60 | 60 | 60 |
|  | Block styrene molecular weight (MnS1) | 4100 | 5100 | 0 |
|  | Hydrogenation rate of double bond (%) | 98 | 98 | 98 |
| Physical properties of hydrogenated copolymer (B) | Number-average molecular weight (Mn2) | 200000 | 200000 | 110000 |
|  | Styrene content in polymer (mass %) | 68 | 68 | 68 |
|  | Styrene content (RS2) in random structure (mass %) | 60 | 60 | 60 |
|  | Block styrene molecular weight (MnS2) | 21000 | 5100 | 11500 |
|  | Degree of branching (f) | 2 | 8 | 2 |
|  | Hydrogenation rate of double bond (%) | 98 | 98 | 98 |
| Physical properties of hydrogenated copolymer (X) | Content of hydrogenated copolymer (A) (mass %) | 40 | 40 | 40 |
|  | Mn1/Mn2 | 0.10 | 0.13 | 0.25 |
|  | RS1/RS2 | 1.00 | 1.00 | 1.00 |
|  | MnS1/MnS2 | 0.1952 | 1.0000 | 0.0000 |
|  | Tanδ peak temperature (° C.) | 15 | 15 | 15 |
| Characteristics of hydrogenated copolymer (X) | 10-s hardness | ○ | ○ | ◎ |
|  | Shear viscosity | ◎ | ○ | ◎ |
|  | Pellet blocking resistance | ◎ | ○ | Δ |
| Characteristics of resin composition | Moldability | ◎ | ◎ | Δ |
|  | Tensile strength | ◎ | Δ | Δ |
|  | Abrasion resistance (change in gloss after 1000 times) | ◎ | Δ | Δ |
|  | Abrasion resistance (transfer to cloth after 2500 times) | ◎ | Δ | Δ |
|  | Abrasion resistance (10000 times) | ◎ | Δ | Δ |

TABLE 10

|  |  | Comparative Example 1 | Comparative Example 2 | Comparative Example 3 |
|---|---|---|---|---|
|  | Polymer No. | X28 | X29 | X30 |
| Physical properties of hydrogenated copolymer (A) | Number-average molecular weight (Mn1) | — | 7000 | 45000 |
|  | Styrene content in polymer (mass %) | — | 60 | 60 |
|  | Styrene content (RS1) in random structure (mass %) | — | 60 | 60 |
|  | Block styrene molecular weight (MnS1) | — | 0 | 0 |
|  | Hydrogenation rate of double bond (%) | — | 98 | 98 |
| Physical properties of hydrogenated copolymer (B) | Number-average molecular weight (Mn2) | 200000 | 200000 | 200000 |
|  | Styrene content in polymer (mass %) | 68 | 68 | 68 |
|  | Styrene content (RS2) in random structure (mass %) | 60 | 60 | 60 |
|  | Block styrene molecular weight (MnS2) | 21000 | 21000 | 21000 |
|  | Degree of branching (f) | 2 | 2 | 2 |
|  | Hydrogenation rate of double bond (%) | 98 | 98 | 98 |

TABLE 10-continued

| | | | | |
|---|---|---|---|---|
| Physical | Content of hydrogenated copolymer (A) (mass %) | 0 | 60 | 40 |
| properties of | Mn1/Mn2 | — | 0.04 | 0.23 |
| hydrogenated | RS1/RS2 | — | 1.00 | 1.00 |
| copolymer (X) | MnS1/MnS2 | — | 0.0000 | 0.0000 |
| | Tanδ peak temperature (° C.) | 15 | 15 | 15 |
| Characteristics | 10-s hardness | Δ | ⊚ | Δ |
| of hydrogenated | Shear viscosity | X | ⊚ | X |
| copolymer (X) | Pellet blocking resistance | ⊚ | X | ⊚ |
| Characteristics | Moldability | X | X | X |
| of resin | Tensile strength | ⊚ | X | ⊚ |
| composition | Abrasion resistance (change in gloss after 1000 times) | ○ | X | X |
| | Abrasion resistance (transfer to cloth after 2500 times) | ○ | X | Δ |
| | Abrasion resistance (10000 times) | ⊚ | X | Δ |

| | | Comparative Example 4 | Reference Example 5 | Comparative Example 6 |
|---|---|---|---|---|
| | Polymer No. | X31 | X32 | X33 |
| Physical | Number-average molecular weight (Mn1) | 90000 | 30000 | 30000 |
| properties of | Styrene content in polymer (mass %) | 68 | 20 | 85 |
| hydrogenated | Styrene content (RS1) in random structure (mass %) | 60 | 20 | 85 |
| copolymer (A) | Block styrene molecular weight (MnS1) | 19300 | 0 | 0 |
| | Hydrogenation rate of double bond (%) | 98 | 98 | 98 |
| Physical | Number-average molecular weight (Mn2) | 270000 | 200000 | 200000 |
| properties of | Styrene content in polymer (mass %) | 68 | 68 | 68 |
| hydrogenated | Styrene content (RS2) in random structure (mass %) | 60 | 60 | 60 |
| copolymer (B) | Block styrene molecular weight (MnS2) | 19300 | 21000 | 21000 |
| | Degree of branching (f) | 3 | 2 | 2 |
| | Hydrogenation rate of double bond (%) | 98 | 98 | 98 |
| Physical | Content of hydrogenated copolymer (A) (mass %) | 50 | 20 | 20 |
| properties of | Mn1/Mn2 | 0.33 | 0.15 | 0.15 |
| hydrogenated | RS1/RS2 | 1.00 | 0.33 | 1.42 |
| copolymer (X) | MnS1/MnS2 | 1.0000 | 0.0000 | 0.0000 |
| | Tanδ peak temperature (° C.) | 15 | 5 | 25 |
| Characteristics | 10-s hardness | X | ⊚ | X |
| of hydrogenated | Shear viscosity | X | ○ | ○ |
| copolymer (X) | Pellet blocking resistance | ⊚ | X | X |
| Characteristics | Moldability | X | X | X |
| of resin | Tensile strength | ⊚ | X | ⊚ |
| composition | Abrasion resistance (change in gloss after 1000 times) | ⊚ | X | X |
| | Abrasion resistance (transfer to cloth after 2500 times) | ○ | X | X |
| | Abrasion resistance (10000 times) | ⊚ | X | X |

TABLE 11

| | | Comparative Example 7 | Comparative Example 8 | Comparative Example 9 |
|---|---|---|---|---|
| | Polymer No. | X34 | X35 | X36 |
| Physical | Number-average molecular weight (Mn1) | 30000 | 30000 | 30000 |
| properties of | Styrene content in polymer (mass %) | 60 | 60 | 0 |
| hydrogenated | Styrene content (RS1) in random structure (mass %) | 60 | 60 | 0 |
| copolymer (A) | Block styrene molecular weight (MnS1) | 0 | 0 | 0 |
| | Hydrogenation rate of double bond (%) | 98 | 98 | 98 |
| Physical | Number-average molecular weight (Mn2) | 200000 | 200000 | 200000 |
| properties of | Styrene content in polymer (mass %) | 25 | 85 | 30 |
| hydrogenated | Styrene content (RS2) in random structure (mass %) | 17 | 79 | 0 |
| copolymer (B) | Block styrene molecular weight (MnS2) | 10200 | 31500 | 30000 |
| | Degree of branching (f) | 2 | 2 | 2 |
| | Hydrogenation rate of double bond (%) | 98 | 98 | 98 |
| Physical | Content of hydrogenated copolymer (A) (mass %) | 20 | 20 | 40 |
| properties of | Mn1/Mn2 | 0.15 | 0.15 | 0.15 |
| hydrogenated | RS1/RS2 | 3.53 | 0.76 | — |
| copolymer (X) | MnS1/MnS2 | 0.0000 | 0.0000 | 0.0000 |
| | Tanδ peak temperature (° C.) | −28 | 45 | −40 |
| Characteristics | 10-s hardness | Δ | X | Δ |
| of hydrogenated | Shear viscosity | ○ | ○ | X |
| copolymer (X) | Pellet blocking resistance | X | X | X |
| Characteristics | Moldability | X | X | X |
| of resin | Tensile strength | X | ⊚ | X |
| composition | Abrasion resistance (change in gloss after 1000 times) | X | X | X |
| | Abrasion resistance (transfer to cloth after 2500 times) | X | X | X |
| | Abrasion resistance (10000 times) | X | X | X |

TABLE 11-continued

|  |  | Comparative Example 10 | Comparative Example 11 | Comparative Example 12 |
|---|---|---|---|---|
|  | Polymer No. | X37 | X38 | X63 |
| Physical | Number-average molecular weight (Mn1) | 30000 | 34000 | 7000 |
| properties of | Styrene content in polymer (mass %) | 60 | 60 | 0 |
| hydrogenated | Styrene content (RS1) in random structure (mass %) | 60 | 60 | 0 |
| copolymer (A) | Block styrene molecular weight (MnS1) | 0 | 0 | 0 |
|  | Hydrogenation rate of double bond (%) | 0 | 98 | 98 |
| Physical | Number-average molecular weight (Mn2) | 200000 | 125000 | 150000 |
| properties of | Styrene content in polymer (mass %) | 68 | 68 | 20 |
| hydrogenated | Styrene content (RS2) in random structure (mass %) | 60 | 60 | 0 |
| copolymer (B) | Block styrene molecular weight (MnS2) | 21000 | 12800 | 15000 |
|  | Degree of branching (f) | 2 | 2 | 2 |
|  | Hydrogenation rate of double bond (%) | 0 | 98 | 98 |
| Physical | Content of hydrogenated copolymer (A) (mass %) | 40 | 40 | 50 |
| properties of | Mn1/Mn2 | 0.15 | 0.27 | 0.05 |
| hydrogenated | RS1/RS2 | 1.00 | 1.00 | 100.00 |
| copolymer (X) | MnS1/MnS2 | 0.0000 | 0.0000 | 0.0000 |
|  | Tanδ peak temperature (° C.) | 8 | 15 | −40 |
| Characteristics | 10-s hardness | ◎ | ◎ | ◎ |
| of hydrogenated | Shear viscosity | ○ | ◎ | ◎ |
| copolymer (X) | Pellet blocking resistance | X | X | Δ |
| Characteristics | Moldability | Δ | Δ | Δ |
| of resin | Tensile strength | Δ | ○ | ○ |
| composition | Abrasion resistance (change in gloss after 1000 times) | X | X | X |
|  | Abrasion resistance (transfer to cloth after 2500 times) | X | X | X |
|  | Abrasion resistance (10000 times) | X | X | X |

Examples 1 to 51 show results of evaluating the hydrogenated copolymer (X) that satisfies the required components of the present invention, and Comparative Examples 1 to 4 and 6 to 12 show results of evaluating the hydrogenated copolymer (X) that does not satisfy the required components of the present invention.

Examples were free of "x" in any of the four evaluation items. On the other hand, Comparative Examples had "x" in one or more of the evaluation items. As is evident therefrom, Comparative Examples were inferior to Examples.

Reference Example 5 had a lower styrene content in the hydrogenated copolymer (A), and this sample was found to be capable of exerting favorable performance as a material for an adhesion agent constituting an adhesive film, but to be inferior in characteristics as a material for a molded article.

[Production of Adhesive Film]

Polyethylene (HDPE, manufactured by Asahi Kasei Chemicals Corp., trade name "Creolex T5070L", MFR (190° C., 2.16 kg load)=7.0 g/10 min) to constitute a base material layer, and dry blends of the hydrogenated copolymers (X64) to (X74), (X33), (B24), (B25), and (B24) and an adhesive to constitute an adhesive layer were blended at the ratios shown in Examples 52 to 62 and Comparative Examples 13 to 18, and each blend was supplied to an extruder.

Both the layers were integrally coextruded by coextrusion molding under conditions involving an extrusion temperature of 200° C. and a die temperature of 220° C. using a multi-layer T-die extruder (manufactured by PLABOR Research Laboratory of Plastics Technology Co., Ltd.) to produce an adhesive film having a base material layer thickness of 40 μm and an adhesive layer thickness of 10 μm.

The dry blend refers to a blend of the moieties (hydrogenated copolymer and adhesive) to constitute the adhesive layer.

The adhesive used was YS Polystar HU (hydrogenated terpene phenol resin manufactured by Yasuhara Chemical Co., Ltd.).

In order to evaluate the performance of the adhesive films obtained in Examples 52 to 62 and Comparative Examples 13 to 18, initial adhesion, low increase in adhesive, and feedability were measured and evaluated.

The obtained results are shown in Tables 12 to 14.

[Adhesion Characteristics of Film]

A universal tensile and compression tester "Technograph TGE-500N; manufactured by MinebeaMitsumi Inc." was used as a measurement apparatus.

(Evaluation of Initial Adhesion)

In Examples 52 to 62 and Comparative Examples 13 to 18, the prepared adhesive film having a width of 25 mm was placed on each of a PMMA plate (arithmetic average roughness of surface: 0.1 μm) and a SUS304HL plate, affixed thereto by the rolling of a rubber roll (diameter: 10 cm) having a weight of 2 kg, left at a temperature of 23° C. and a relative humidity of 50% for 30 minutes, and then peeled off by an angle of 180 degrees at a peeling rate of 300 mm/min. Initial adhesion was measured in accordance with JIS K6854-2 and evaluated according to the following criteria.

"PMMA Plate"

◎: 250 (g/25 mm) or more

○: 150 (g/25 mm) or more and less than 250 (g/25 mm)

Δ: 100 (g/25 mm) or more and less than 150 (g/25 mm)

x: Less than 100 (g/25 mm)

"SUS Plate"

◎: 150 (g/25 mm) or more

○: 70 (g/25 mm) or more and less than 150 (g/25 mm)

Δ: 35 (g/25 mm) or more and less than 70 (g/25 mm)

x: Less than 35 (g/25 mm)

(Evaluation of Low Increase in Adhesive)

In Examples 52 to 62 and Comparative Examples 13 to 18, the prepared adhesive film having a width of 25 mm was placed on a SUS304HL plate and further affixed thereto by the rolling of a rubber roll (diameter: 10 cm) having a weight of 2 kg.

Then, the sample was stored for 1 hour in an oven having a temperature of 80° C., then further left at a temperature of 23° C. and a relative humidity of 50% for 30 minutes, and then peeled off by 180 degrees at a peeling rate of 300 mm/min. Adhesion was measured in accordance with JIS K6854-2.

Low increase in adhesive were evaluated according to the following expression.

$$\text{Low increase in adhesive} = \frac{\text{(Adhesion after heating at } 80^\circ \text{ C. for 1 hour)}}{\text{(Initial adhesion)}}$$

A smaller value of the low increase in adhesive was determined as being better, and evaluation was made according to the following criteria.

⊚: 1.5 or less
○: More than 1.5 and 2 or less
Δ: More than 2 and 3 or less
x: More than 3

[Evaluation of Feedability]

In Examples 52 to 62 and Comparative Examples 13 to 18, the prepared adhesive film having a width of 25 mm was placed on a HDPE plate, affixed thereto by the rolling of a rubber roll (diameter: 10 cm) having a weight of 2 kg, left at a temperature of 23° C. and a relative humidity of 50% for 30 minutes, and then peeled off by 180 degrees at a peeling rate of 300 mm/min. Initial adhesion was measured in accordance with JIS K6854-2 and evaluated according to the criteria given below.

A smaller value of the feedability was determined as being better, and evaluation was made according to the following criteria.

⊚: Less than 12 (g/25 mm)
○: 12 (g/25 mm) or more and less than 18 (g/25 mm)
Δ: 18 (g/25 mm) or more and less than 26 (g/25 mm)
x: Less than 26 (g/25 mm)

[Results of Evaluating Hydrogenated Copolymer (X)]

Results of evaluating Examples 52 to 62 and Comparative Examples 13 to 18 are summarized in [Tables 12 to 14] given below.

Evaluation criteria abided by the methods for measuring the characteristics of the adhesive film.

TABLE 12

|  |  | Example 52 | Example 53 | Example 54 | Example 55 | Example 56 | Example 57 |
|---|---|---|---|---|---|---|---|
| Hydrogenated copolymer (A) | Polymer No. (A) | A20 | A2 | A14 | A42 | A14 | A14 |
|  | Number-average molecular weight (Mn1) | 30000 | 30000 | 30000 | 16000 | 30000 | 30000 |
|  | Styrene content in polymer (mass %) | 20 | 35 | 45 | 60 | 45 | 45 |
|  | Styrene content (RS1) in random structure (mass %) | 20 | 35 | 45 | 43 | 45 | 45 |
|  | Block styrene molecular weight (MnS1) | 0 | 0 | 0 | 4800 | 0 | 0 |
| Hydrogenated copolymer (B) | Polymer No. (B) | B24 | B24 | B24 | B24 | B25 | B25 |
|  | Number-average molecular weight (Mn2) | 150000 | 150000 | 150000 | 150000 | 150000 | 150000 |
|  | Styrene content in polymer (mass %) | 35 | 35 | 35 | 35 | 50 | 50 |
|  | Styrene content (RS2) in random structure (mass %) | 24 | 24 | 24 | 24 | 41 | 41 |
|  | Block styrene molecular weight (MnS2) | 11300 | 11300 | 11300 | 11300 | 11300 | 11300 |
| Hydrogenated copolymer (X) | Content of hydrogenated copolymer (A) in (X) (mass %) | 10 | 10 | 20 | 20 | 10 | 20 |
|  | Mn1/Mn2 | 0.20 | 0.20 | 0.20 | 0.11 | 0.20 | 0.20 |
| Tacky layer composition 10 μm | Polymer No. X or B | X64 | X65 | X66 | X67 | X68 | X69 |
|  | Tackifier: YS Polystar HU added amount (parts by mass; per 100 parts by mass of polymer) | 0 | 0 | 0 | 0 | 0 | 0 |
| Tacky film evaluation | Initial tack strength (vs PMMA 23° C. 30 min) | ⊚ | ⊚ | ⊚ | ⊚ | Δ | ○ |
| Base material layer 40 μm | Initial tack strength (vs SUS 23° C. 30 min) | ⊚ | ⊚ | ⊚ | ⊚ | Δ | ○ |
| Tacky layer 10 μm | Tack increasing properties (vs SUS 80° C./23° C.) | ○ | ⊚ | ⊚ | ○ | Δ | ○ |
|  | Feedability (vs PE) | Δ | ○ | Δ | Δ | ⊚ | ⊚ |

TABLE 13

|  |  | Example 58 | Example 59 | Example 60 | Example 61 | Example 62 |
|---|---|---|---|---|---|---|
| Hydrogenated copolymer (A) | Polymer No. (A) | A42 | A42 | A42 | A43 | A27 |
|  | Number-average molecular weight (Mn1) | 16000 | 16000 | 16000 | 30000 | 30000 |
|  | Styrene content in polymer (mass %) | 60 | 60 | 60 | 15 | 60 |
|  | Styrene content (RS1) in random structure (mass %) | 43 | 43 | 43 | 25 | 50 |
|  | Block styrene molecular weight (MnS1) | 4800 | 4800 | 4800 | 0 | 6100 |
| Hydrogenated copolymer (B) | Polymer No. (B) | B25 | B25 | B25 | B25 | B23 |
|  | Number-average molecular weight (Mn2) | 150000 | 150000 | 150000 | 150000 | 200000 |
|  | Styrene content in polymer (mass %) | 50 | 50 | 50 | 50 | 20 |
|  | Styrene content (RS2) in random structure (mass %) | 41 | 41 | 41 | 41 | 11 |
|  | Block styrene molecular weight (MnS2) | 11300 | 11300 | 11300 | 11300 | 10000 |
| Hydrogenated copolymer (X) | Content of hydrogenated copolymer (A) in (X) (mass %) | 10 | 20 | 30 | 20 | 45 |
|  | Mn1/Mn2 | 0.11 | 0.11 | 0.11 | 0.20 | 0.15 |
| Tacky layer composition 10 μm | Polymer No. X or B | X70 | X71 | X72 | X73 | X74 |
|  | Tackifier: YS Polystar HU added amount (parts by mass; per 100 parts by mass of polymer) | 0 | 0 | 0 | 0 | 0 |

TABLE 13-continued

|  |  | Example 58 | Example 59 | Example 60 | Example 61 | Example 62 |
|---|---|---|---|---|---|---|
| Tacky film evaluation Base material layer 40 μm Tacky layer 10 μm | Initial tack strength (vs PMMA 23° C. 30 min) | ○ | ○ | ○ | ◉ | ◉ |
|  | Initial tack strength (vs SUS 23° C. 30 min) | Δ | Δ | ○ | ◉ | ◉ |
|  | Tack increasing properties (vs SUS 80° C./23° C.) | ○ | ○ | ○ | Δ | Δ |
|  | Feedability (vs PE) | ○ | ○ | ○ | Δ | Δ |

TABLE 14

|  |  | Comparative Example 13 | Comparative Example 14 | Comparative Example 15 | Comparative Example 16 | Comparative Example 17 | Comparative Example 18 |
|---|---|---|---|---|---|---|---|
| Hydrogenated copolymer (A) | Polymer No. (A) | A21 |  |  |  |  |  |
|  | Number-average molecular weight (Mn1) | 30000 |  |  |  |  |  |
|  | Styrene content in polymer (mass %) | 85 |  |  |  |  |  |
|  | Styrene content (RS1) in random structure (mass %) | 85 |  |  |  |  |  |
|  | Block styrene molecular weight (MnS1) | 0 |  |  |  |  |  |
| Hydrogenated copolymer (B) | Polymer No. (B) | B1 | B24 | B25 | B24 | B24 | B24 |
|  | Number-average molecular weight (Mn2) | 200000 | 150000 | 150000 | 150000 | 150000 | 150000 |
|  | Styrene content in polymer (mass %) | 68 | 35 | 50 | 35 | 35 | 35 |
|  | Styrene content (RS2) in random structure (mass %) | 60 | 24 | 41 | 24 | 24 | 24 |
|  | Block styrene molecular weight (MnS2) | 21000 | 11300 | 11300 | 11300 | 11300 | 11300 |
| Hydrogenated copolymer (X) | Content of hydrogenated copolymer (A) in (X) (mass %) | 20 | 0 | 0 | 0 | 0 | 0 |
|  | Mn1/Mn2 | 0.15 | 0.00 | 0.00 | 0.00 | 0.00 | 0.00 |
| Tacky layer composition 10 μm | Polymer No. X or B | X33 | B24 | B25 | B24 | B24 | B24 |
|  | Tackifier: YS Polystar HU added amount (parts by mass; per 100 parts by mass of polymer) | 0 | 0 | 0 | 10 | 20 | 30 |
| Tacky film evaluation Base material layer 40 μm Tacky layer 10 μm | Initial tack strength (vs PMMA 23° C. 30 min) | X | ○ | X | ○ | ◉ | ◉ |
|  | Initial tack strength (vs SUS 23° C. 30 min) | X | ○ | X | ◉ | ◉ | ○ |
|  | Tack increasing properties (vs SUS 80° C./23° C.) | Δ | X | X | ○ | Δ | X |
|  | Feedability (vs PE) | ◉ | Δ | ◉ | X | X | Δ |

Examples 52 to 62 show results of evaluating the hydrogenated copolymer (X) that satisfies the required components of the present invention, and Comparative Examples 13 to 18 show results of evaluating the hydrogenated copolymer that does not satisfy the required components of the present invention.

Examples were free of "x" in any of the four evaluation items. On the other hand, Comparative Examples had "x" in one or more of the evaluation items. As is evident therefrom, Comparative Examples were inferior to Examples.

The present application is based on the Japanese patent application filed in the Japan Patent Office on Jun. 22, 2020 (Japanese Patent Application No. 2020-107264), the contents of which are incorporated herein by reference.

INDUSTRIAL APPLICABILITY

The hydrogenated copolymer and the hydrogenated copolymer composition of the present invention have industrial applicability in fields such as reinforcing filler blends, cross-linked products, foams, molded products such as multi-layer films and multi-layer sheets, building materials, damping and soundproof materials, electric wire covering materials, high-frequency fusion compositions, slush molding material, adhesive compositions, asphalt compositions, automobile interior materials, automobile exterior materials, medical appliance materials, various containers such as food packaging containers, home appliances, industrial parts, and toys and games.

The invention claimed is:

1. A hydrogenated copolymer (X) comprising:

a hydrogenated copolymer (A) which is a hydrogenated copolymer of a vinyl aromatic monomer unit and a conjugated diene monomer unit; and a hydrogenated copolymer (B) which is a hydrogenated copolymer of a vinyl aromatic monomer unit and a conjugated diene monomer unit, the hydrogenated copolymer (B) has at least one polymer block mainly comprising a vinyl aromatic monomer unit, wherein the hydrogenated copolymer (X) satisfies the following requirements (1) to (4):

(1): the hydrogenated copolymer (A) has a random copolymer structure comprising a conjugated diene monomer unit and a vinyl aromatic monomer unit, and a content of the vinyl aromatic monomer unit in the hydrogenated copolymer (A) is 10 mass % or more and 80 mass % or less;

(2): the hydrogenated copolymer (B) has a random copolymer structure comprising a conjugated diene monomer unit and a vinyl aromatic monomer unit, and a content of the vinyl aromatic monomer unit in the hydrogenated copolymer (B) is 10 mass % or more and 80 mass % or less;

(3): a ratio (Mn1/Mn2) of a number-average molecular weight (Mn1) of the hydrogenated copolymer (A) to a number-average molecular weight (Mn2) of the hydrogenated copolymer (B) is less than 0.25, and 1000≤Mn1≤40000; and (4): a mass ratio (A)/(B) of a content of the hydrogenated copolymer (A) to a content of the hydrogenated copolymer (B) is 5/95 to 50/50.

2. The hydrogenated copolymer (X) according to claim 1, wherein the hydrogenated copolymer (A) has at least one polymer block mainly comprising a vinyl aromatic monomer unit.

3. The hydrogenated copolymer (X) according to claim 1, wherein the number-average molecular weight (Mn2) of the hydrogenated copolymer (B) is 120,000 or more.

4. The hydrogenated copolymer (X) according to claim 1, wherein a hydrogenation rate of double bonds derived from the conjugated diene monomer unit in each of the hydrogenated copolymer (A) and the hydrogenated copolymer (B) is 40% or more.

5. The hydrogenated copolymer (X) according to claim 1, wherein at least one tan δ peak is present in a range of −20° C. or higher and 40° C. or lower in a viscoelasticity measurement (1 Hz) chart.

6. The hydrogenated copolymer (X) according to claim 1, wherein a ratio (RS1/RS2) of a vinyl aromatic monomer unit content (RS1) in the random copolymer structure of the hydrogenated copolymer (A) to a vinyl aromatic monomer unit content (RS2) in the random copolymer structure of the hydrogenated copolymer (B) is 0.8 to 1.2.

7. The hydrogenated copolymer (X) according to claim 1, wherein a ratio (Mw2/Mn2) of a weight-average molecular weight (Mw2) to the number-average molecular weight (Mn2) of the hydrogenated copolymer (B) is less than 1.15.

8. The hydrogenated copolymer (X) according to claim 1, wherein the ratio (Mn1/Mn2) of the number-average molecular weight (Mn1) of the hydrogenated copolymer (A) to the number-average molecular weight (Mn2) of the hydrogenated copolymer (B) is less than 0.12.

9. The hydrogenated copolymer (X) according to claim 1, wherein the hydrogenated copolymer (A) has a polymer block mainly comprising a vinyl aromatic monomer unit, and a ratio (MnS1/MnS2) of a molecular weight (MnS1) of the polymer block mainly comprising a vinyl aromatic monomer unit in the hydrogenated copolymer (A) to a molecular weight (MnS2) of a polymer block mainly comprising a vinyl aromatic monomer unit in the hydrogenated copolymer (B)

is 0.9 or less, wherein

MnS1 and MnS2 are calculated by the following method:

$$MnS1 = Mn1 \times BS1, \text{ and}$$

$$MnS2 = Mn2 \times BS2/f$$

BS1: a content of the polymer block mainly comprising a vinyl aromatic monomer unit in the hydrogenated copolymer (A) determined by proton nuclear magnetic resonance ($^1$H-NMR);

BS2: a content of the polymer block mainly comprising a vinyl aromatic monomer unit in the hydrogenated copolymer (B) determined by proton nuclear magnetic resonance ($^1$H-NMR);

f: a degree of branching of the hydrogenated copolymer (B) determined by a GPC-light scattering measurement method with a viscosity detector;

Mn1: the number-average molecular weight of the hydrogenated copolymer (A); and

Mn2: the number-average molecular weight of the hydrogenated copolymer (B).

10. A resin composition comprising:

the hydrogenated copolymer (X) according to claim 1, wherein a content of the vinyl aromatic monomer unit in each of the hydrogenated copolymers (A) and (B) is 30 mass % or more and 80 mass % or less; and a thermoplastic resin other than the hydrogenated copolymer (X) and/or a rubber-like polymer other than the hydrogenated copolymer (X).

11. A molded article of the resin composition according to claim 10.

12. An adhesive film having a base material layer and an adhesive layer on the base material layer, wherein the adhesive layer contains the hydrogenated copolymer (X) according to claim 1, wherein a content of the vinyl aromatic monomer unit in each of the hydrogenated copolymers (A) and (B) constituting the hydrogenated copolymer (X) is 10 mass % or more and 60 mass % or less.

* * * * *